(12) United States Patent
Wynalda, Jr. et al.

(10) Patent No.: US 10,473,151 B2
(45) Date of Patent: Nov. 12, 2019

(54) UTILITY MOUNT WITH REMOVABLE ADJUSTABLE BALL JOINT AND DEVICE MOUNT

(71) Applicant: Fourth Arrow, LLC, Comstock Park, MI (US)

(72) Inventors: Robert M. Wynalda, Jr., Comstock Park, MI (US); David Wynalda, Belmont, MI (US)

(73) Assignee: Fourth Arrow, LLC, Comstock Park, MI (US)

( * ) Notice: Subject to any disclaimer, the term of this patent is extended or adjusted under 35 U.S.C. 154(b) by 0 days.

(21) Appl. No.: 16/243,352

(22) Filed: Jan. 9, 2019

(65) Prior Publication Data

US 2019/0219095 A1    Jul. 18, 2019

Related U.S. Application Data

(63) Continuation-in-part of application No. 15/359,437, filed on Nov. 22, 2016.

(60) Provisional application No. 62/275,028, filed on Jan. 5, 2016, provisional application No. 62/280,068, filed on Jan. 18, 2016, provisional application No. 62/281,559, filed on Jan. 21, 2016, provisional application No. 62/286,102, filed on Jan. 22, 2016, provisional application No. 62/259,562, filed on Nov. 24, 2015.

(51) Int. Cl.
*A01M 31/00* (2006.01)
*F16C 11/06* (2006.01)
*A01M 31/02* (2006.01)

(52) U.S. Cl.
CPC ........ *F16C 11/0695* (2013.01); *A01M 31/00* (2013.01); *A01M 31/025* (2013.01); *F16C 11/0604* (2013.01)

(58) Field of Classification Search
None
See application file for complete search history.

(56) References Cited

U.S. PATENT DOCUMENTS

| | | | | |
|---|---|---|---|---|
| 394,856 A | * | 12/1888 | Hendrick | A47B 23/042 248/448 |
| 3,799,488 A | * | 3/1974 | Sena | A47B 97/08 248/452 |

(Continued)

*Primary Examiner* — Monica E Millner
(74) *Attorney, Agent, or Firm* — Zollinger & Burleson Ltd.

(57) ABSTRACT

An adjustable mount for holding equipment or an equipment-holding arm at, for example, a hunting location such as a deer blind or a tree stand includes a base mounting bracket and an adjustable ball joint removably secured to the mounting bracket. The base mounting bracket is secured to something and can be left in place during the hunting season. The ball joint can be removed and taken with the user. In some configurations, the ball joint can be locked in a desired orientation which is maintained when the ball joint is removed from the base mounting bracket so that the desired orientation is reestablished when the user replaces the ball joint in the base mounting bracket. One version of the ball joint includes a bearing block assembly that supports a down post. A configuration of the base mounting bracket can be readily assembled from a collapsed flat configuration. An articulating equipment holding arm with first and second arms provides an adjustable mount for holding equipment.

22 Claims, 59 Drawing Sheets

(56) References Cited

U.S. PATENT DOCUMENTS

| | | | | |
|---|---|---|---|---|
| 3,944,279 A * | 3/1976 | Blackstock | ............ | A01M 31/02 |
| | | | | 182/187 |
| 5,351,923 A * | 10/1994 | Booth, Jr. | .............. | F16M 13/02 |
| | | | | 211/107 |
| 5,947,849 A * | 9/1999 | Ellenbaum | ........... | A63B 63/083 |
| | | | | 473/483 |
| 6,220,556 B1 * | 4/2001 | Sohrt | .................... | F16C 11/106 |
| | | | | 248/278.1 |
| 7,975,973 B1 * | 7/2011 | Weeden | ................. | F16M 11/14 |
| | | | | 248/216.1 |
| 8,683,909 B1 * | 4/2014 | Copus | .................... | F41A 23/16 |
| | | | | 182/127 |
| 9,743,774 B1 * | 8/2017 | Hauser | ..................... | A47C 9/10 |
| 9,759,411 B2 * | 9/2017 | Kim | ........................ | F21V 21/14 |
| 2003/0038218 A1 * | 2/2003 | Eppard | ............... | A01M 31/025 |
| | | | | 248/219.4 |
| 2003/0196855 A1 * | 10/2003 | Kvam | ...................... | E06C 7/14 |
| | | | | 182/129 |
| 2009/0194367 A1 * | 8/2009 | Smith | .................... | F41A 23/16 |
| | | | | 182/129 |
| 2011/0308887 A1 * | 12/2011 | Johnson | ................ | A01M 31/02 |
| | | | | 182/187 |
| 2017/0205023 A1 * | 7/2017 | Wynalda, Jr. | ....... | F16C 11/0695 |

\* cited by examiner

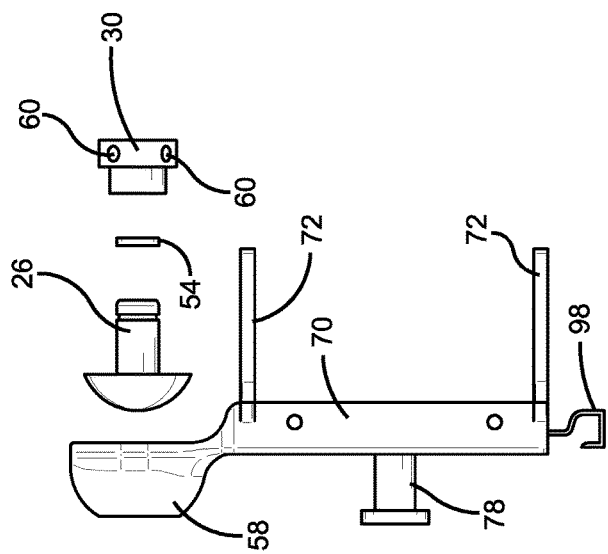
FIG. 1
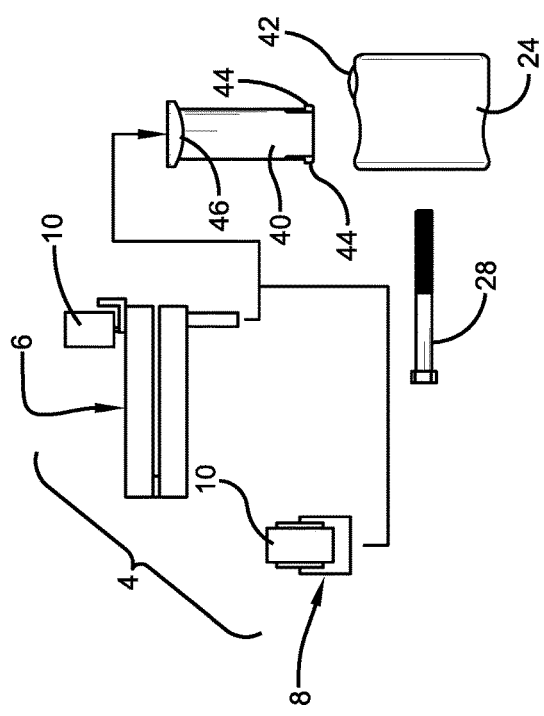
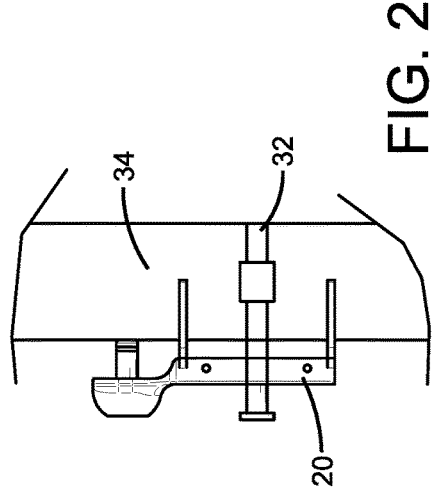
FIG. 2

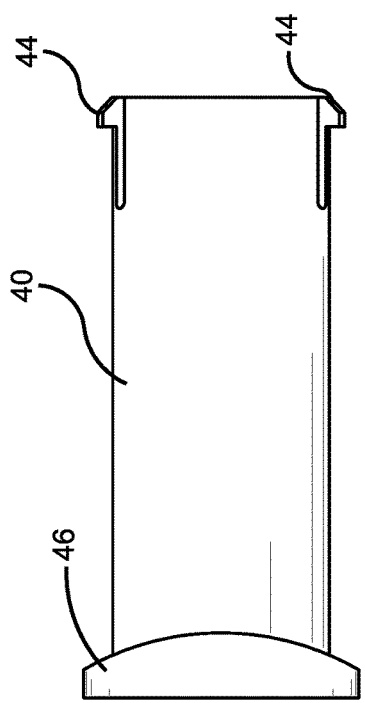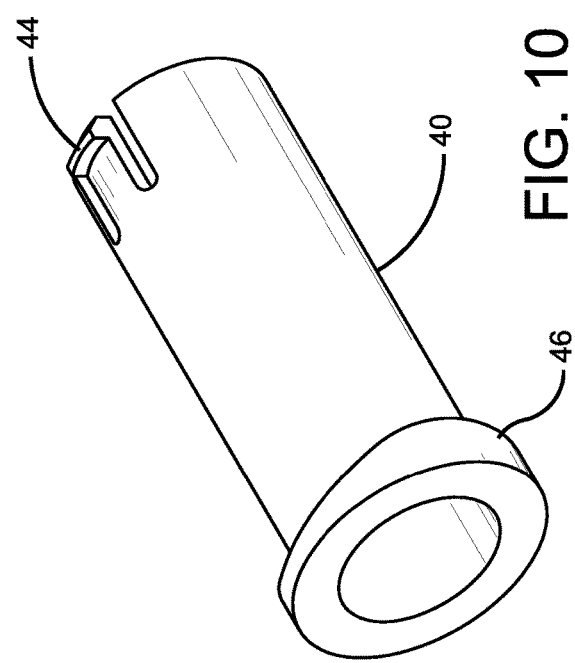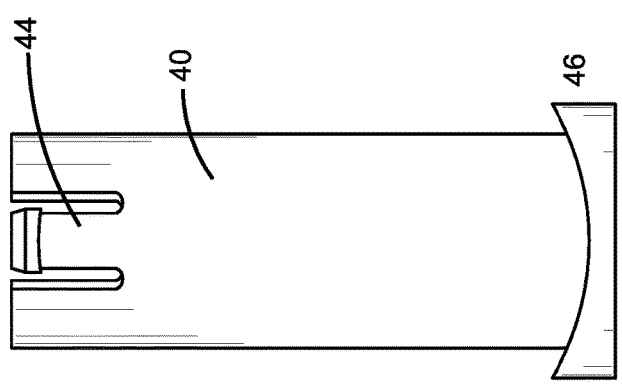

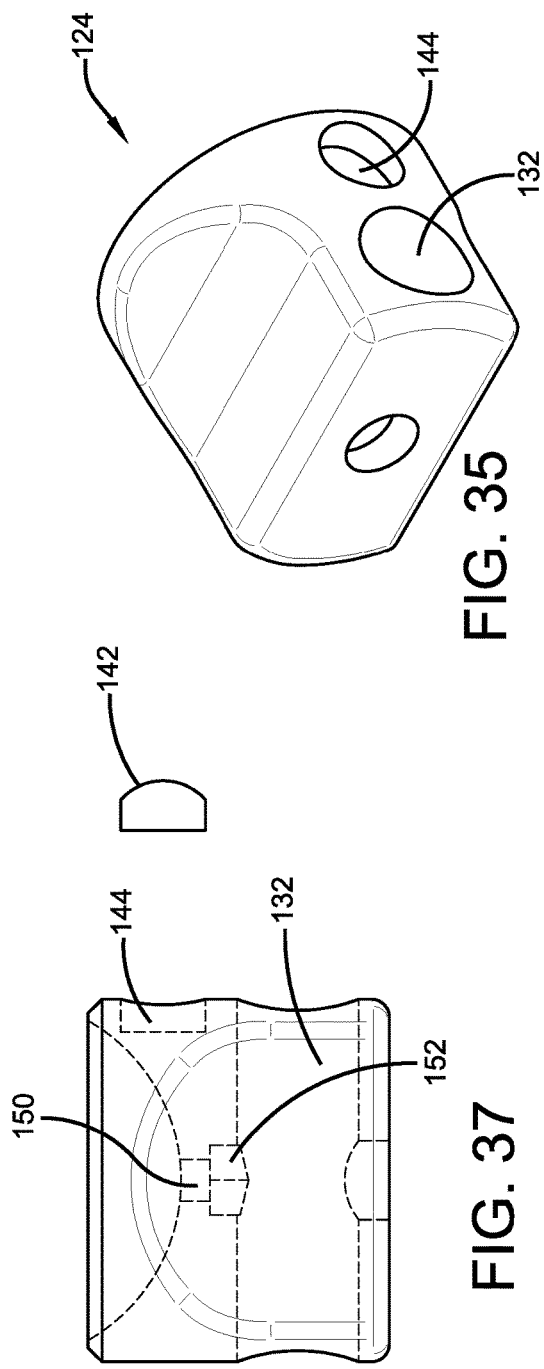

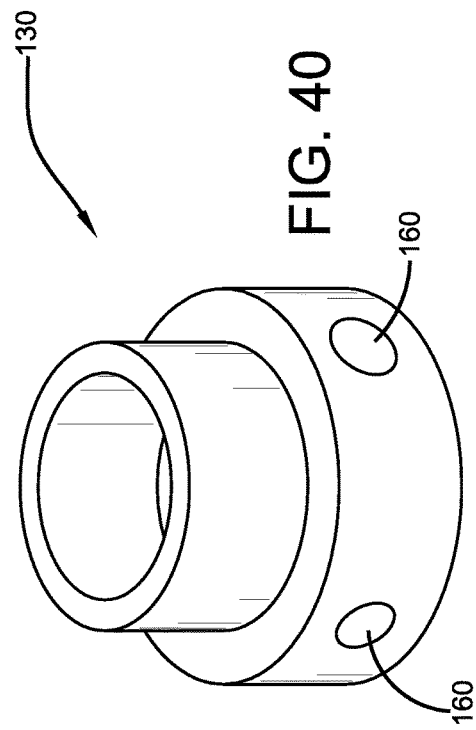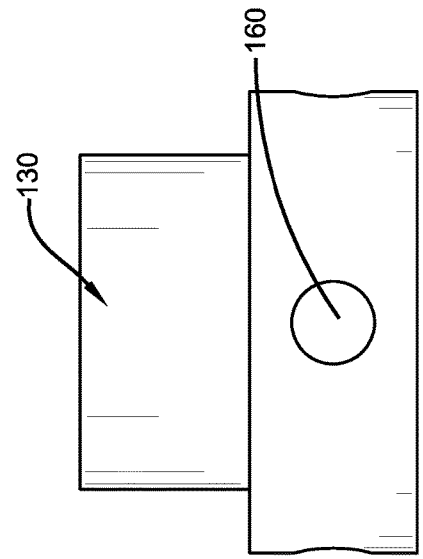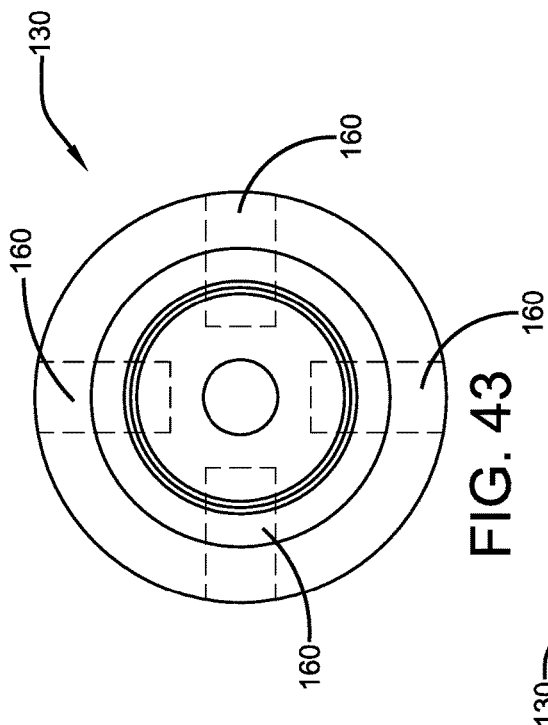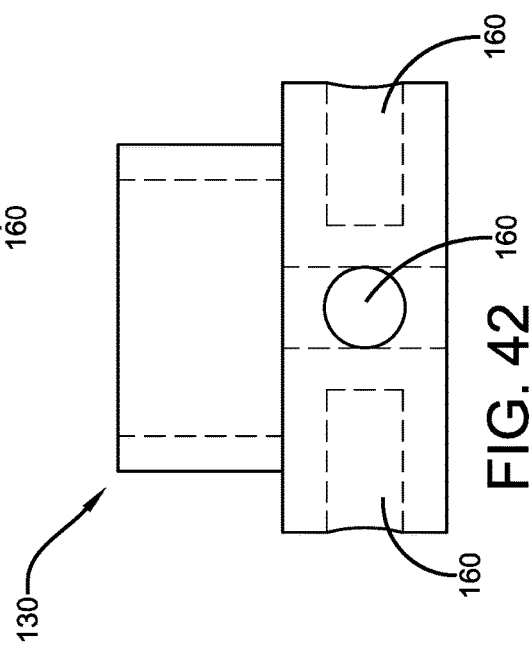

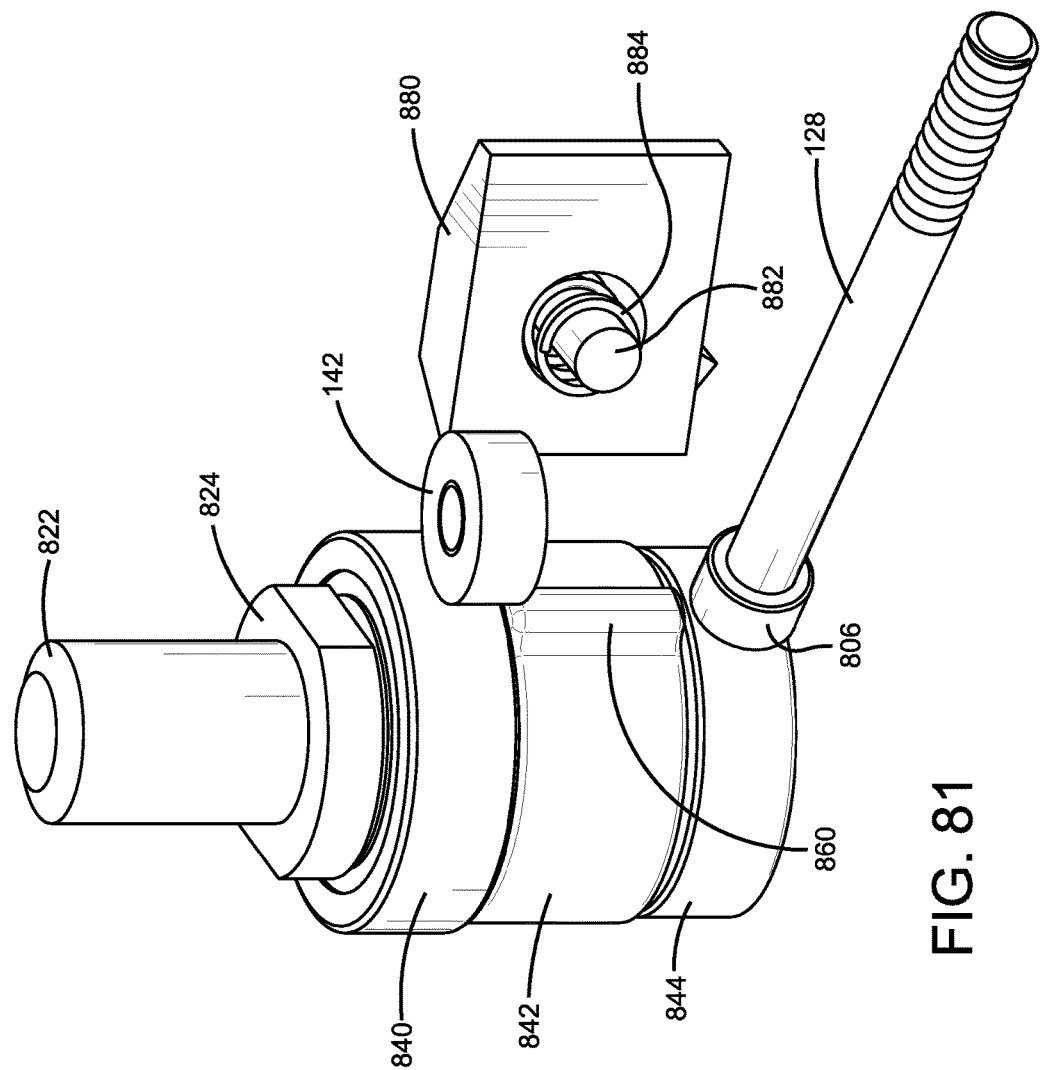

UTILITY MOUNT WITH REMOVABLE ADJUSTABLE BALL JOINT AND DEVICE MOUNT

CROSS REFERENCE TO RELATED APPLICATIONS

This application is a continuation-in-part application claiming priority to U.S. patent application Ser. No. 15/359,437 filed Nov. 22, 2016, which application claims the benefit of U.S. Provisional Patent Applications 62/259,562 filed Nov. 24, 2015, 62/275,028 filed Jan. 5, 2016, 62/280,068 filed Jan. 18, 2016, 62/281,559 filed Jan. 21, 2016, and 62/286,102 filed Jan. 22, 2016; the disclosures of each are incorporated herein by reference.

BACKGROUND OF THE DISCLOSURE

1. Technical Field

The present disclosure generally relates to an adjustable utility mount for mounting or supporting items and device mounts used with the utility mount. The adjustable utility mount includes a base mounting bracket that is separable from the adjustable components of the adjustable utility mount so the user can place a plurality of base mounting brackets at different hunting locations. The disclosure also relates to mounting devices, such as articulating arms, for small electronic devices such as cameras, motion sensors, and lights.

2. Background Information

Mounting a camera or other electronic device in a desirable orientation in an area to be hunted is not an easy task. Traditional tripods placed on the ground are subject to being knocked over by wild game and can spook some game. Cameras can be used to capture images of wild game during the hunt, capture images of what game is on a game trail at different times during the day, or capture images or video of the hunter in action. Motion sensors can provide warnings to a hunter that there is movement along a trail in an area that cannot be directly viewed by the hunter.

Many electronic devices and most cameras that are not built into mobile phones include a threaded opening for mounting the device with a tripod mount screw. When the devices include the threaded opening, a threaded support screw such as a tripod mount screw can be threaded into the opening to secure the device to a mount such as a tripod or a base mounting bracket. New devices built from mobile phones often do not include the threaded openings. These devices are typically held by clamping mounting devices that grasp opposite side of the device.

A hunter often arrives at a tree stand early in the morning before there is enough daylight to accomplish tasks and may have to use a headlamp or flashlight to set up mounts and other items. A hunter thus desires an easy way to mount a camera in a desired location without taking excessive time, without requiring much light, and without making noise. The hunter desires to settle himself in a tree stand with minimal effort and noise to minimize the risk that that game will be warned of his presence by scent, sound, or light. Although a camera mount can be set up and left in a desired location prior to a hunt, the mounts are expensive and subject to theft risk.

The hunter may also wish to use the mount for items other than cameras or in additional to cameras. The utility mount should thus be rugged and substantial enough to support a camouflage draping, to function as a gun rest or a bow rest, or to hold miscellaneous gear. An arm used with the utility mount allows the electronic device to be positioned at an extended position away from the utility mount. Such arms also should be light, quiet, and rugged and capable of supporting items in addition to the electronic device.

SUMMARY OF THE DISCLOSURE

The disclosure provides an adjustable utility mount that allows an electronic device such as a camera to be mounted to another member such as a tree. The adjustable utility mount allows the position of the device to be adjusted through a wide variety of positions to accommodate for mounting locations that are not perfectly level or vertical. In one configuration, a ball joint is provided that allows for 360 degree range of adjustment about one reference axis and significant swivel ranges of adjustment about the other two reference axes. All of the adjustments can be made by loosening a clamp member.

The disclosure also provides a device mount configuration that mounts an electronic device to the adjustable utility mount. The device mount is provided in the form of an extension arm and an articulating extension arm with multiple arm sections.

In one configuration, the disclosure provides an extension arm that uses hollow carbon fiber arm tubes with rigid joint members The disclosure provides an adjustable utility mount that is provided in separable components so that a user can secure an inexpensive tree or base mounting bracket in a desired location and leave the base mounting bracket at the location throughout the hunting season or for a time before it is going to be used during a hunt. The inexpensive base mounting bracket will not be a desirable theft target because it does not include the adjustable components of the mount. The mount is configured to allow the hunter to take the adjustable components with him when he leaves the site. The hunter can place a plurality of base mounting brackets at different locations which allows the hunter to readily move a camera from location to location while readily mounting the camera quickly and easily once the hunter arrives at the new location. This also allows the hunter to mount a camera without using a relatively loud ratchet strap upon arriving at the hunt location.

The components of the mount can be fabricated from a metal such as aluminum, steel, or stainless steel; carbon fiber; ceramic; and/or plastic.

In one configuration, the disclosure provides a mount for an electronic device. The mount has a base mounting bracket having a plurality of feet that allow the base mounting bracket to be seated against an uneven surface such as a tree trunk or a tree branch. The base mounting bracket includes a cleat that receives the two ends of a ratchet strap that is used to tightly strap the base mounting bracket to a tree trunk, a tree branch, a ground pole, or another stable structure that will support the utility mount. The base mounting bracket does not carry any of the active adjustment components of the utility mount. The active adjustment components include inner and outer portions of a ball joint that are selectively positioned and clamped in place with respect to the base mounting bracket. A portion of the ball joint is adapted to receive electronic device mount such as an arm, a clamp, or a stick on which the electronic device is carried. An insert can be used to allow the ball joint to be used with different device mounts.

The disclosure provides an adjustable utility mount in one configuration wherein the base mounting bracket defines a ball joint cup about which inner and outer portions of a ball joint can be adjusted and then clamped. The user can remove the inner and outer portions of the ball joint from the base mounting bracket without removing the base mounting bracket from its mounted location. This allows the user to take the ball joint portions with him to prevent theft and to allow the user to install these portions of the ball joint on another base mounting bracket at a different location.

The disclosure also provides an adjustable mount in another configuration wherein the base mounting bracket removably receives a ball joint cup about which inner and outer portions of a ball joint can be adjusted and then clamped. The user can remove the ball joint cup and the inner and outer portions of the ball joint from the base mounting bracket without removing the base mounting bracket from its mounted location. This allows the user to take the entire ball joint with him to prevent theft and to allow the user to install the ball joint on another base mounting bracket at a different location. This configuration also includes a simplified configuration for the base mounting bracket.

The disclosure also provides an outer portion of the ball joint that includes a removable bearing block that is used to mount a device mount. The removable bearing block is readily slid into place and then clamped to provide a stable support for the device mount. The bearings of the bearing block provide smooth rotational movement. A brake is provided to slow or lock the flow of the rotational movement.

The disclosure also provides a base mounting bracket configuration that can be shipped in a disassembled configuration and assembled by the user. The base mounting bracket is formed from inexpensive items to encourage users to mount a plurality of base mounting brackets for use with the ball joint.

The disclosure provides an outer portion of a ball joint that holds the head of the clamping bolt so the clamping bolt does not rotate with respect to the outer portion of the ball joint when the handle is tightened.

The disclosure provides an inner portion of a ball joint that is secured to a handle so they can be removed as a unit.

The disclosure provides a base mounting bracket with a hook that allows gear to be hung from the base mounting bracket.

The disclosure provides a mounting arm configured to hold an electronic device such as a camera. In one configuration, a pair of arm sections are pivotably held together to define an articulating arm.

The preceding non-limiting aspects, as well as others, are more particularly described below. A more complete understanding of the processes and equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 1 is an exploded view of a first configuration of an adjustable utility mount with the device mount arm being depicted schematically.

FIG. 2 depicts the base mounting bracket secured to a tree trunk.

FIG. 10 is a perspective view of a first configuration of an insert that receives the device mount.

FIG. 11 is a front view of FIG. 10.

FIG. 12 is a side view of FIG. 10.

FIG. 35 is a perspective view of a second configuration of the outer portion of the ball joint.

FIG. 36 is a top plan view of FIG. 35.

FIG. 37 is a side view of FIG. 35.

FIG. 38 is a front view of FIG. 35.

FIG. 40 is a perspective view of a second configuration of the handle used to tighten the locking bolt shown in FIG. 24.

FIG. 41 is a side view of FIG. 40.

FIG. 42 is another side view of FIG. 40.

FIG. 43 is a top plan of FIG. 40.

FIG. 81 a perspective view of the down post, ball bearing rings, and brake with the body of the bearing block assembly and the outer portion removed.

Similar numbers refer to similar parts throughout the specification.

DETAILED DESCRIPTION OF THE DISCLOSURE

Figure 4:
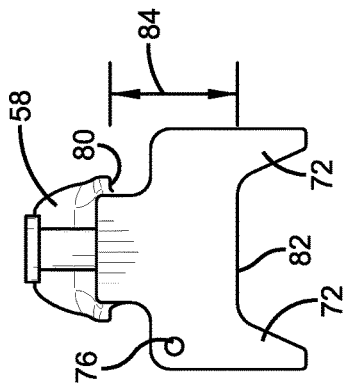
FIG. 4 is an end view of FIG. 3.
Figure 3:
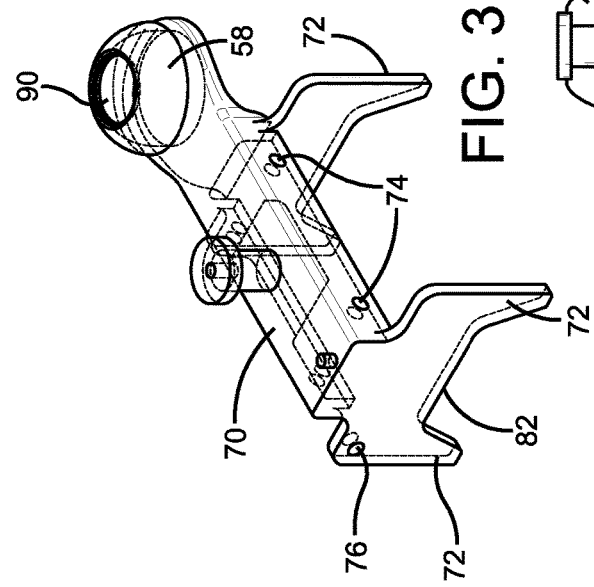
FIG. 3 is a perspective view of a first configuration of a base mounting bracket.
Figure 5:
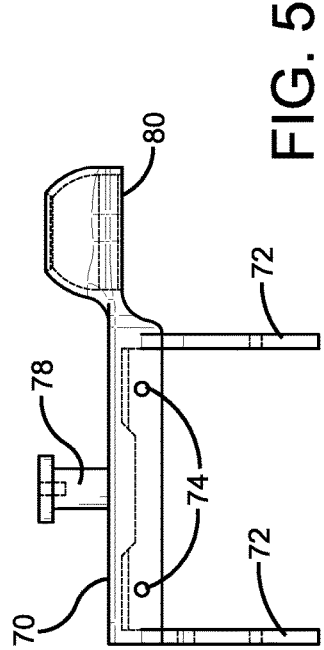
FIG. 5 is a side view of FIG. 3.
Figure 6:
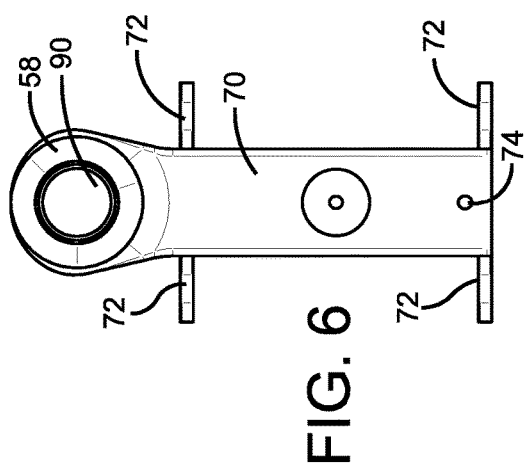
FIG. 6 is a front view of FIG. 3.
Figure 7:
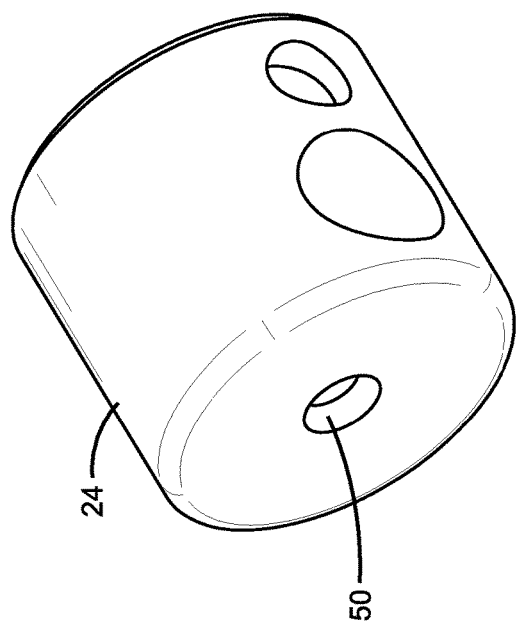
FIG. 7 is a perspective view of a first configuration of an outer portion of the ball joint.
Figure 8:
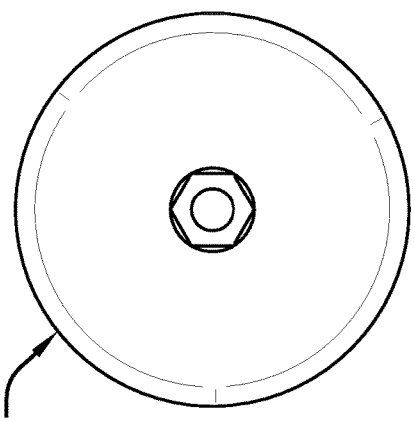
FIG. 8 is an end view of FIG. 7.
Figure 9:
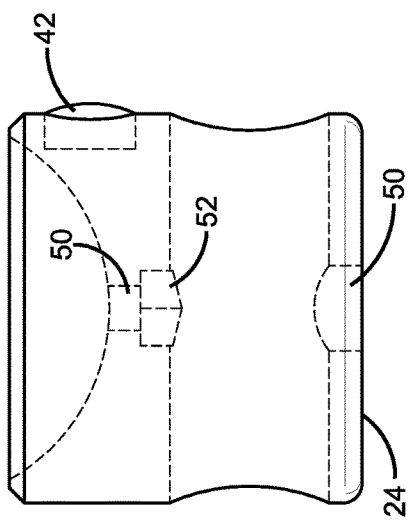
FIG. 9 is a side view of FIG. 7.
Figure 13:
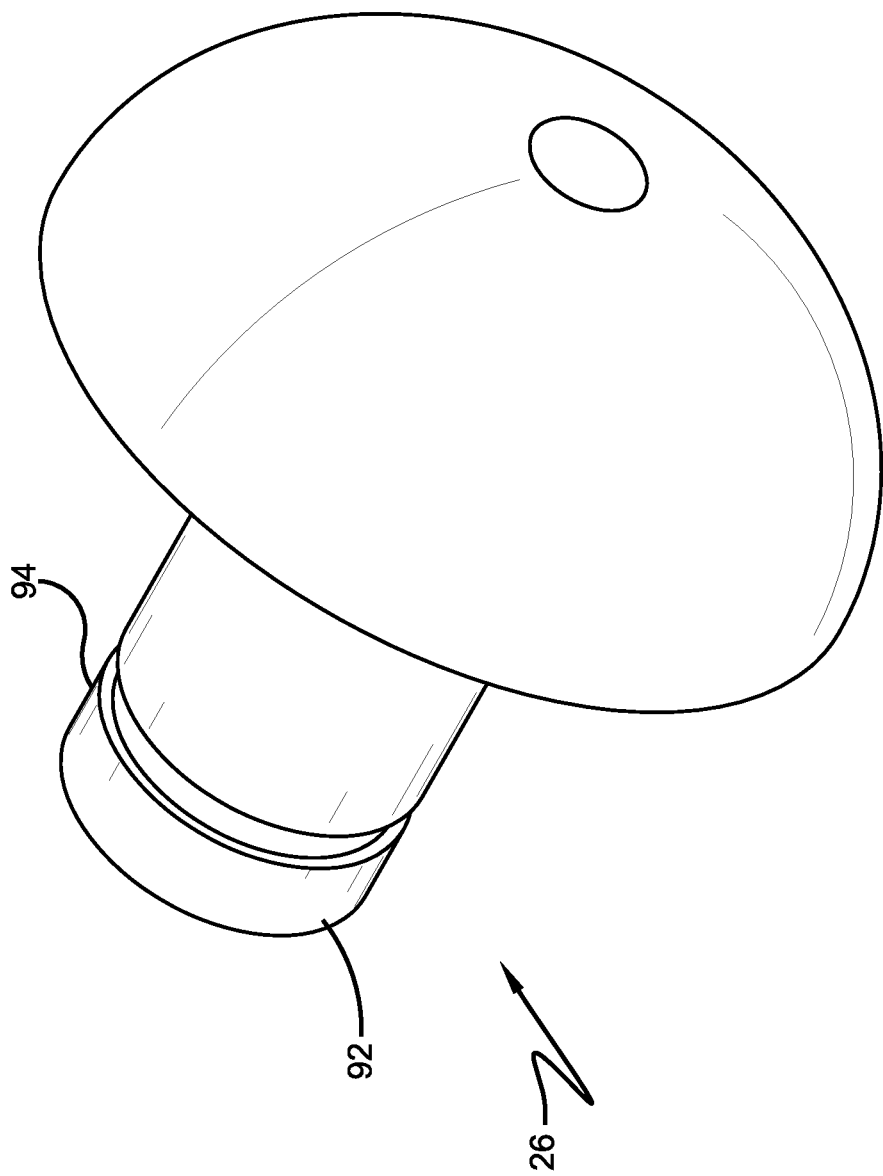
FIG. 13 is a perspective view of the first configuration of the inner portion of the ball joint.
Figure 14:
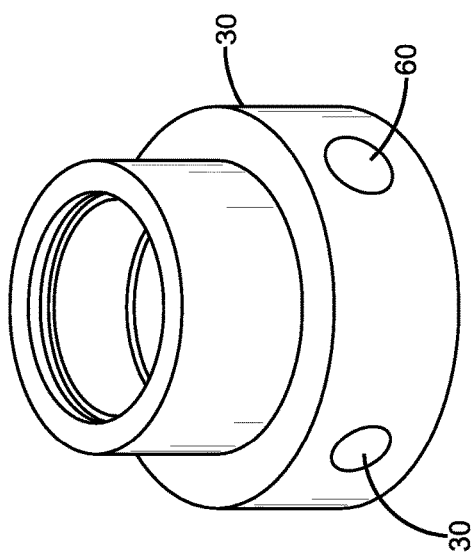
FIG. 14 is a perspective view of a first configuration of a handle used to tighten the locking bolt shown in FIG. 1.
Figure 15:
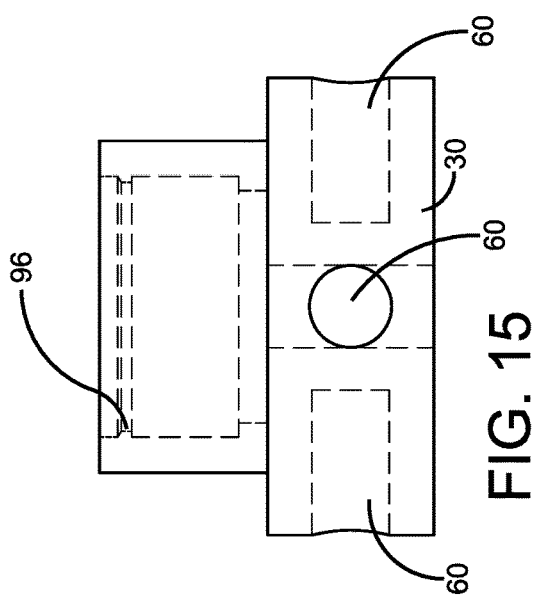
FIG. 15 is a side view of FIG. 14.
Figure 16:
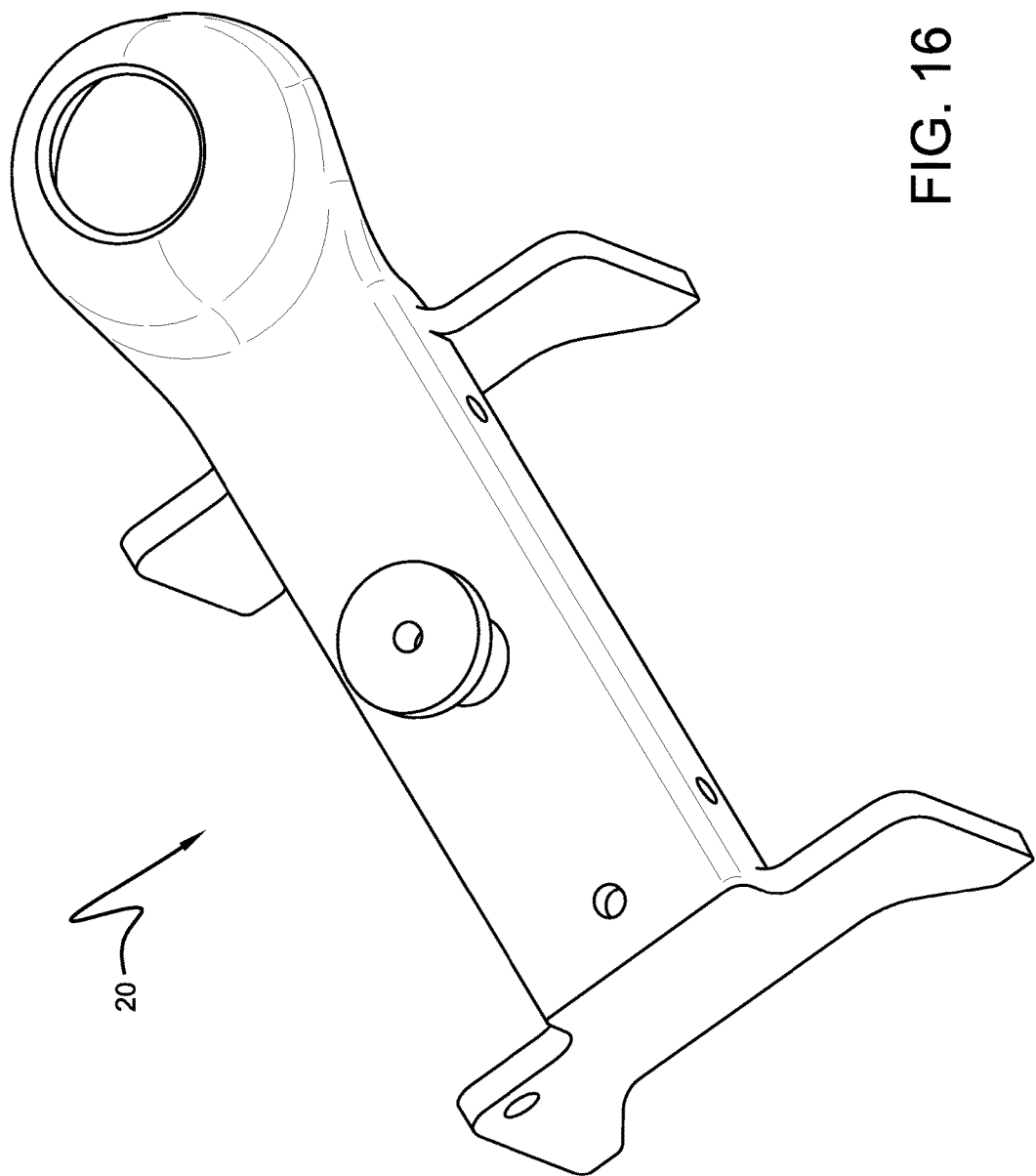
FIG. 16 is a perspective view of the first configuration of the base mounting bracket.
Figure 17:
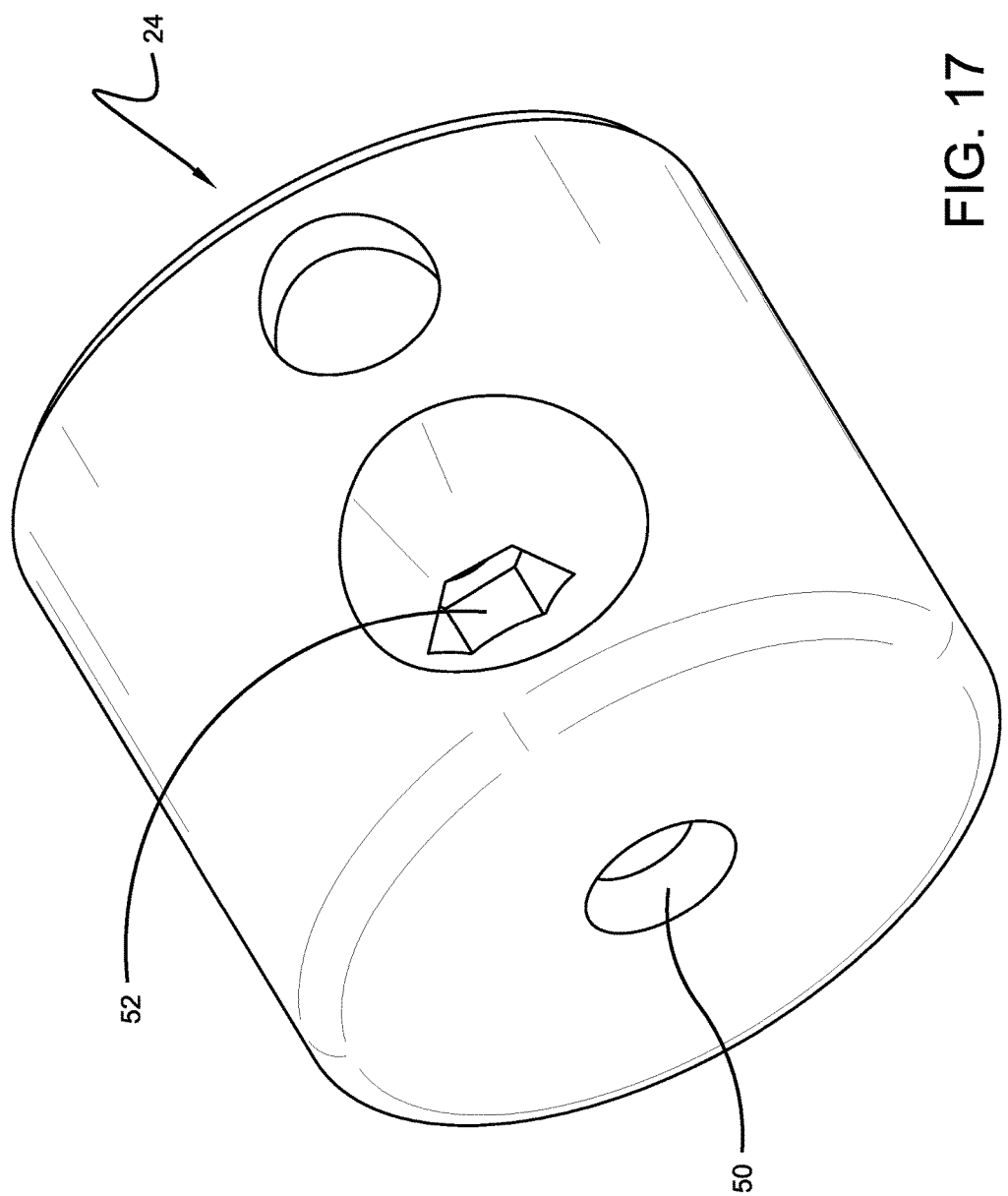
FIG. 17 is a first perspective view of the first configuration of the outer portion of the ball joint.
Figure 18:
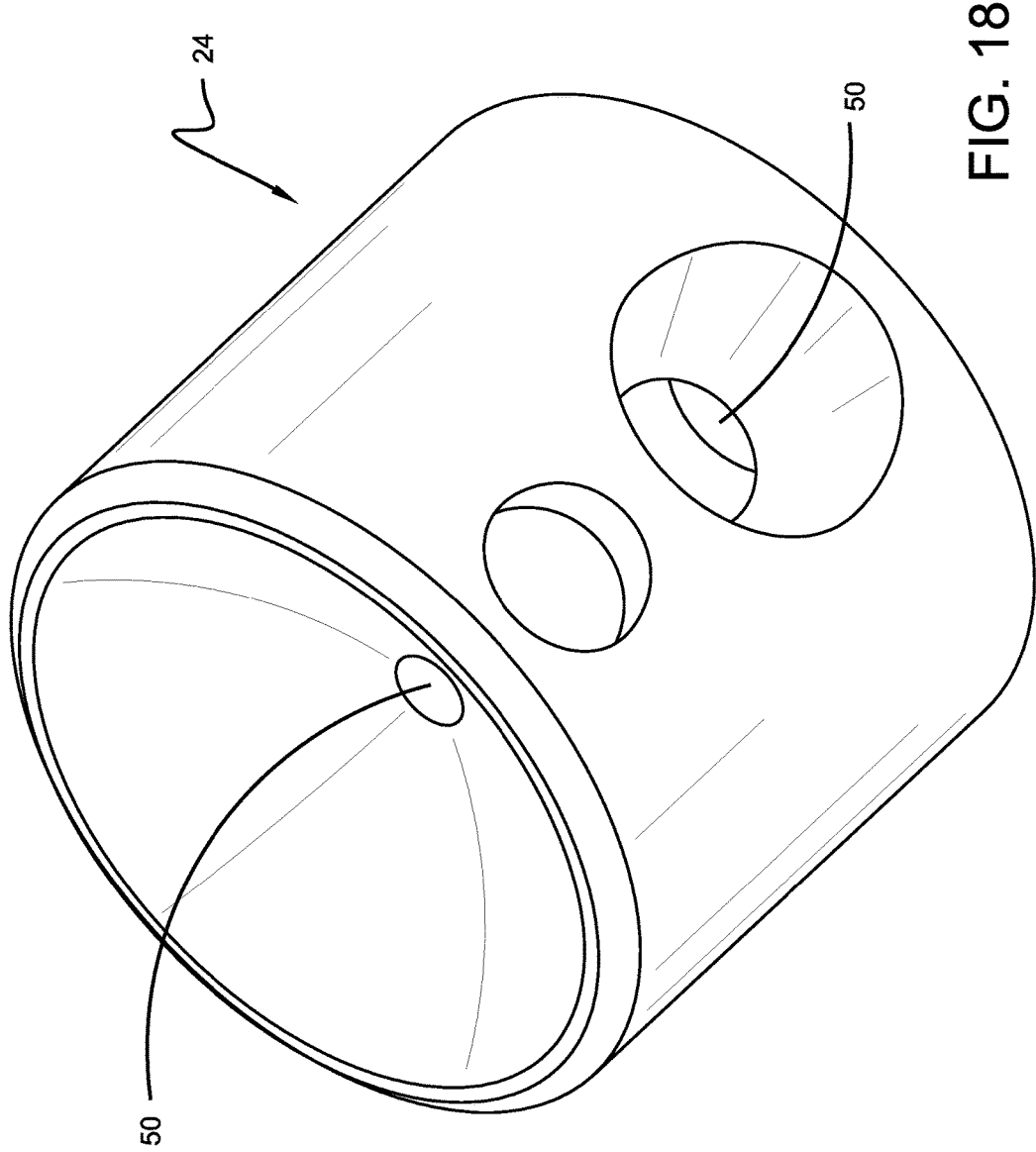
FIG. 18 is second perspective view of the first configuration of the outer portion of the ball joint.
Figure 19:
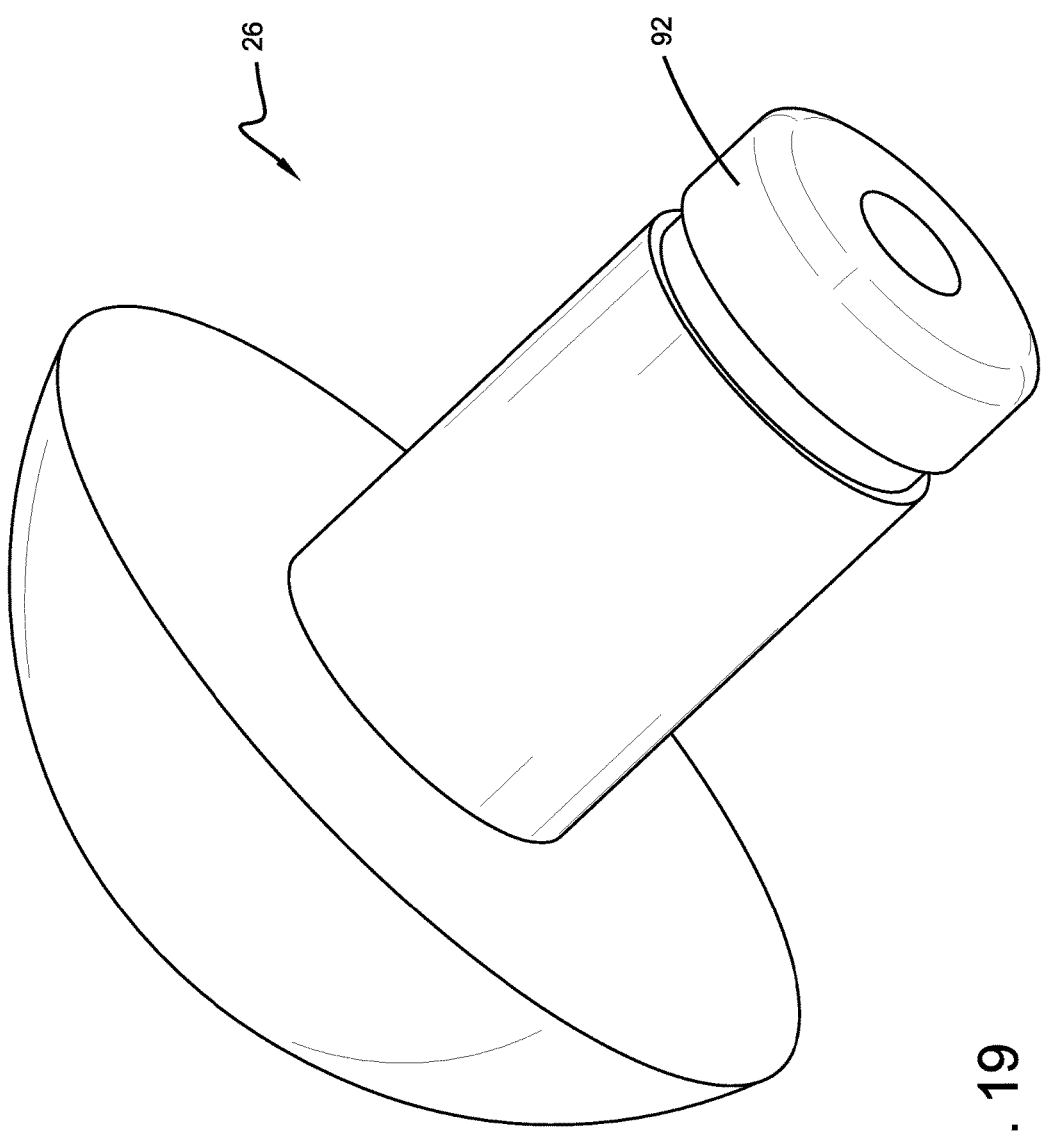
FIG. 19 is a perspective view of the first configuration of the inner portion of the ball joint.
Figure 20:
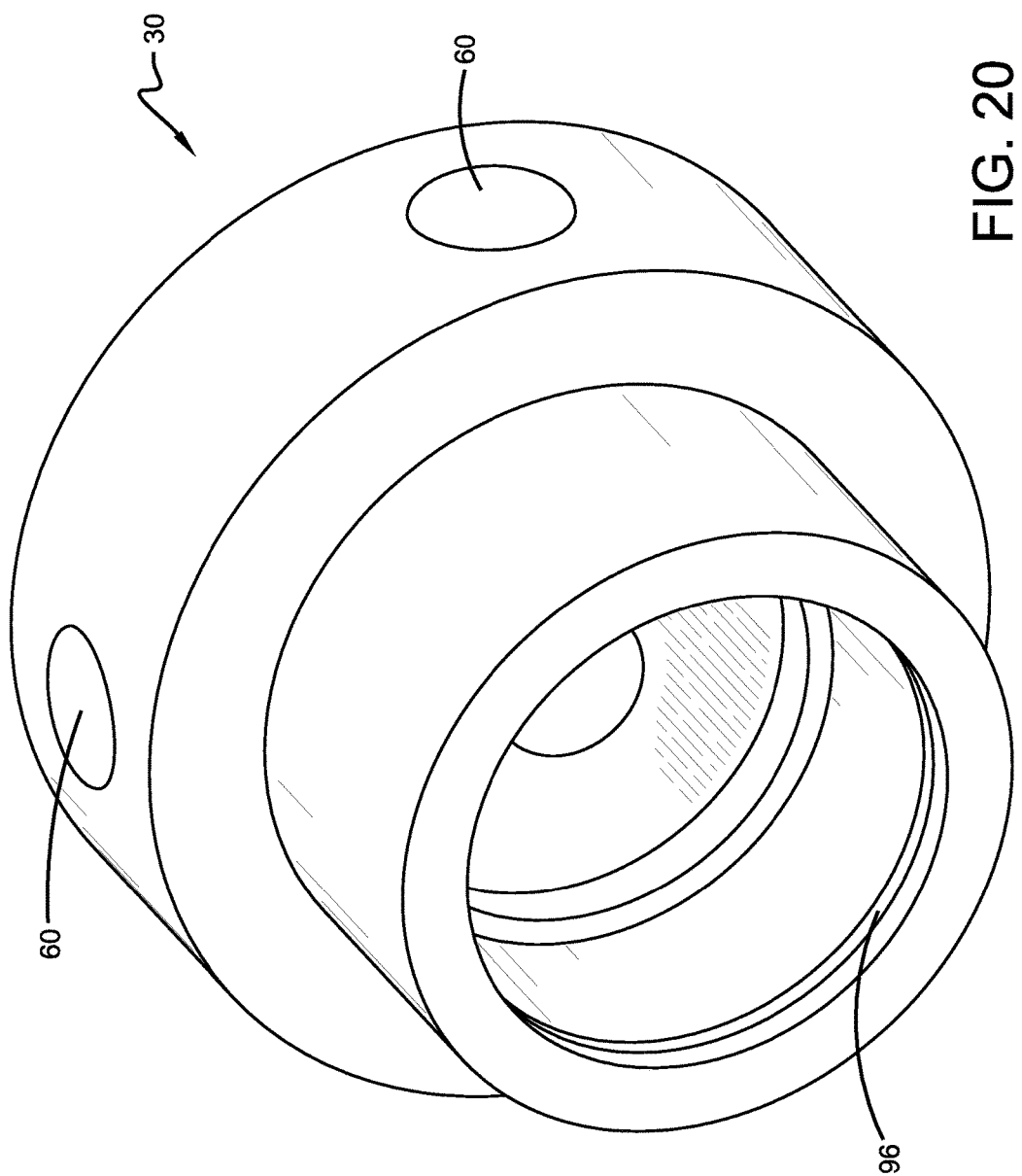
FIG. 20 is a perspective view of the first configuration of the handle.
Figure 21:
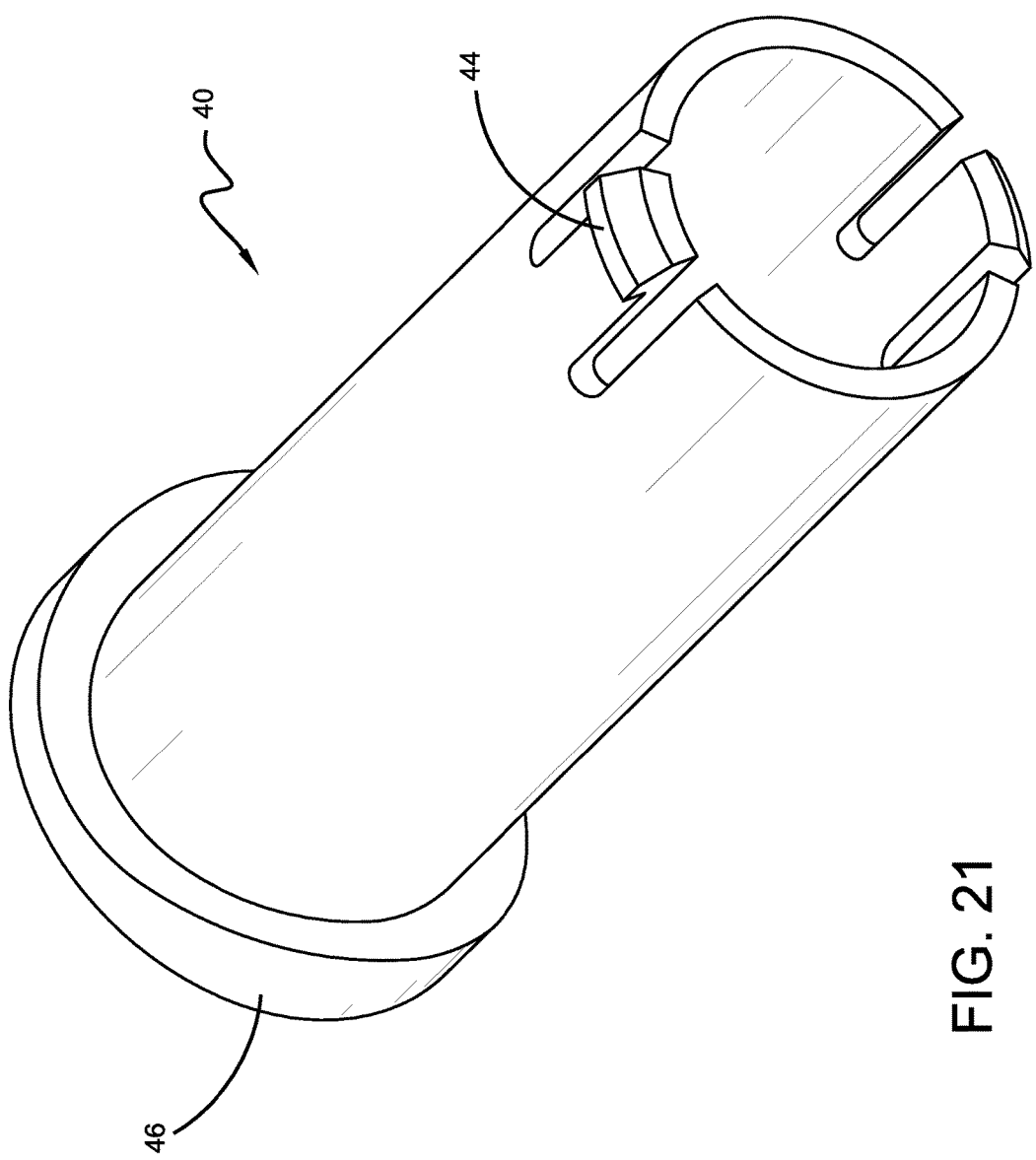
FIG. 21 is a perspective view of the first configuration of the insert.
Figure 22:
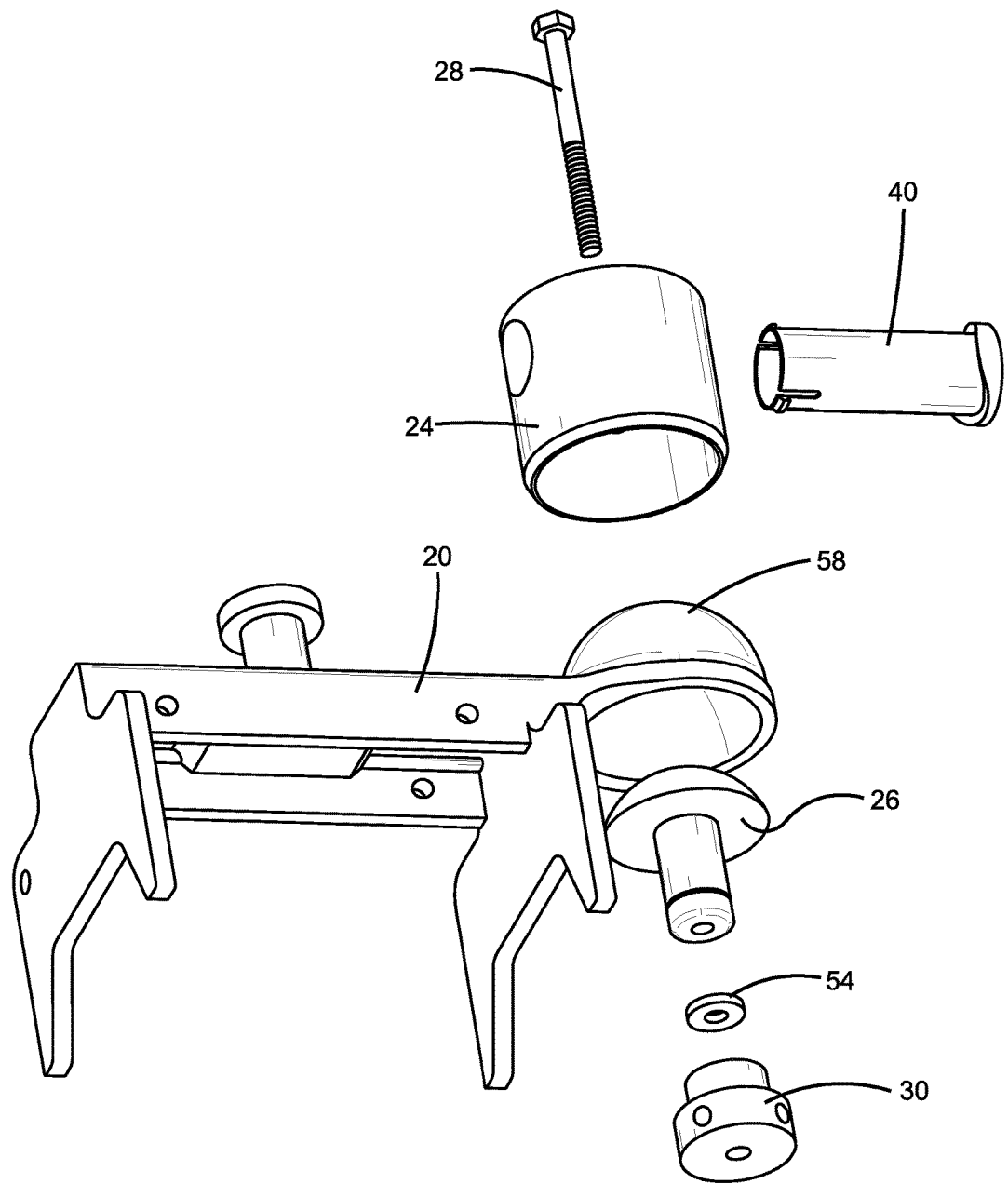
FIG. 22 is an exploded perspective view of the first configuration of the utility mount.

FIG. 1 depicts a first exemplary configuration for the adjustable utility mount which is indicated generally by the reference numeral 2. Adjustable mount 2 is used with a device mount 4 such as an articulating arm 6, a clamping holder 8 (or combination of both), a stick, or an arm that carries a device 10 such as a camera, a motion detector, or a light that is being mounted with adjustable utility mount 2. Adjustable utility mount 2 can also be used to support camouflage, used as a gun rest, used as a bow rest, or to support other gear. Adjustable utility mount 2 generally includes a base mounting bracket 20, a ball joint having an outer portion 24 and an inner portion 26. A clamp member 28 extends through outer portion 24 of the ball joint, base mounting bracket 20, and inner portion 26 of the ball joint. In the exemplary configuration, clamp member 28 is a threaded member or bolt that threadedly engages a handle 30 that is used to tighten the ball joint against base mounting bracket 20. Rotating clamp member 28 until the ball joint is secured in place is when the clamp member 28 is in a clamped condition. Rotating clamp member 28 until ball joint is loose and can be adjusted is when the clamp member is in the unclamped condition. An option includes an inner ball joint portion that integrally includes the handle. As an option, base mounting bracket 20 can include a ratchet strap 32 that is used to secure base mounting bracket 20 to a tree trunk 34, a tree branch, a ground mount, or another stable structure to which utility mount 2 is to be secured. Strap 32 also can be provided by the user as an independent item. The adjustability of the ball joint allows base mounting bracket 20 to be mounted a tree trunk or tree branch or other member that is disposed at essentially any angle and orientation to level because the combination of the ball joint and the manner in mounting base mounting bracket 20 provides a large degree of adjustability for the electronic device 10 that is being carried by mount 2.

In this exemplary configuration of mount 2, an insert 40 is carried by outer portion 24 of the ball joint in a releasable snap fit. Insert 40 is designed to receive the anchor of device mount 4. Insert 40 can be made from a hard plastic material such as polyoxymethylene. Insert 40 also can be used to prevent clamping bolt 28 from falling out of outer portion 24 of the ball joint when the user is disassembling ball joint. A bubble level 42 is carried by outer portion 24 of the ball joint to allow the user to position insert in a vertical arrangement.

Insert 40 includes flexible locking feet 44 that snap fit over the bottom edge of outer portion 24 of the ball joint when insert is fully inserted. The top of insert 40 is a flange 46 having a curved bottom surface that matches the curved surface of outer portion 24 of the ball joint to lock the position of insert 40 with respect to outer portion 24 of the ball joint when insert 40 is fully inserted. Insert 40 defines a through hole that receives the anchor of device mount 4 in a 360 degree rotation arrangement and a thumb screw or friction may be used to hold the position of the anchor with respect to insert 40. Alternatively, the inner surfaces of locking feet 44 may be configured to grip the anchor to limit such rotation.

Outer portion 24 of the ball joint defines a bolt hole 50 that receives clamping bolt 28. Outer portion 24 defines a pocket 52 that receives the head of clamping bolt 28 to prevent clamping bolt 28 from rotating when the head of clamping bolt 28 is received in pocket 52.

Clamping bolt 28 extending through inner portion 26 of the ball joint, through a washer 54, and threadedly engages handle 30 which is used to clamp inner 26 and outer 24 portions of the ball joint against a ball joint cup 58 defined by base mounting bracket 20. Handle 30 defines openings 60 that allow the user to insert a wrench to apply torque to handle 30 as needed to tighten the ball joint. The wrench can be a standard Allen key or a lever arm that, once inserted into an opening 60, allows considerable torque to be applied to handle 30. Optionally, handle 30 defines a threaded opening for a set screw that locks clamping bolt 28 in place.

An advantage of the mounts described herein are that the main adjustable components of the ball joint are readily removable from the base mounting bracket. This allows the user to take ball joint with him when he leaves the hunting stand and makes the base mounting bracket which can be left behind for use on another day less of a theft target. This configuration and the other configurations described below also allow the hunter to quickly and quietly set up equipment upon reaching a hunt location. Mounting a camera with these systems can be accomplished with a single connection that can be locked quietly. The hunter does not need to use a loud ratcheting belt to mount the assembly to a tree because this step of the process has been performed earlier. These configurations also allows the user to purchase multiple relatively inexpensive base mounting brackets and place them at different locations where camera mounts are desired. Base mounting brackets can be sold relatively inexpensively because it does not carry the adjustment components of the mount. An advantage of the mount configurations described below wherein the entire ball joint is removed for the base mounting bracket is also that the hunter can lock in the position of the ball joint to a desired location and then take the ball joint with him in the locked position. When the hunter returns to the hunt site for the hunt, the ball joint is put into the base mounting bracket and it is already in the desired configuration.

Base mounting bracket 20 includes a base 70 with four legs 72. Each leg 72 has triangular portions define a tapered pocket to receive a rounded portion of a tree trunk or tree branch. Legs 72 are the same length so that base mounting bracket 20 can be mounted to a flat surface as well. Body 70 defines a plurality of threaded openings 74 that allow accessories to be mounted to body 70. Body 70 also defines a through hole 76 in a lower leg 72 that can hold the torque wrench used to tighten handle 30. Body 70 also includes a cleat 78 used to receive strap 32 that secured base mounting bracket 20 to the tree trunk or branch. Cleat 78 can include a flange to help prevent the strap from slipping off of base mounting bracket 20.

As described above, base mounting bracket 20 includes ball joint cup 58. The rear surface 80 of the ball joint cup 58 is spaced from the inner surfaces 82 of feet 72 a distance 84 sufficient to allow handle 30 and inner portion 26 of the ball joint to be operated and removed from base mounting bracket 20 without removing base mounting bracket 20 from its mounted condition. Distance 84 is thus longer than the combined length of handle 30 and inner portion 26 when assembled. Ball joint cup 58 has an inner surface that matches the rounded front surface of inner portion 26 of the ball joint. Ball joint cup 58 has an outer surface that matches the inner curved surface of outer portion 24 of the ball joint. Ball joint cup 58 defines a large opening 90 that allows clamping bolt 28 and ball joint portions 24 and 26 to swivel with respect to ball joint cup 58. Outer portion also can rotate 360 degrees about the axis of bolt 28 (the longitudinal axis of the ball joint) when it is in any of its possible swivel positions. The swivel movement can be combined with the rotation to allow the position of outer portion 24 to be fully adjustable.

Inner portion 26 of the ball joint includes a stem 92 that receives handle 30. Handle 30 defines a threaded bore that threadedly engages the threaded end of clamping bolt 28. Rotation of handle 30 along clamping bolt 28 pulls outer portion 24 against ball joint cup 58 and pushes inner portion 26 into ball joint cup 58 to frictionally lock the ball joint. The end of stem 92 abuts washer 54 within handle 30. Stem 92 defines a recess 94 that receives a ridge 96 on handle 30 so that handle 30 can fully rotate about stem 92. Handle 30 can also be used to pull inner portion 26 away from clamping bolt 28 after handle 30 is rotated off of the threads of clamping bolt 28.

Base mounting bracket 20 can be provided in shapes other than the exemplary configuration depicted in the drawings. In one alternative configuration, base mounting bracket 20 is in the form a rectangular box 120 (FIG. 23) with cleat 178 formed from a portion of the front wall of the box. In other configurations, a hook 98 (FIG. 1) can be provided at the bottom of base mounting bracket 20 to allow the user to hang various items from base mounting bracket 20 as needed. Hook 98 can be formed from a portion of base mounting bracket 20, can be connected with fasteners or a weld, or can be a removable hook 98. Multiple hooks 98 can be provided at the bottom of base mounting bracket 20 in the same or different sizes.

Figure 23:
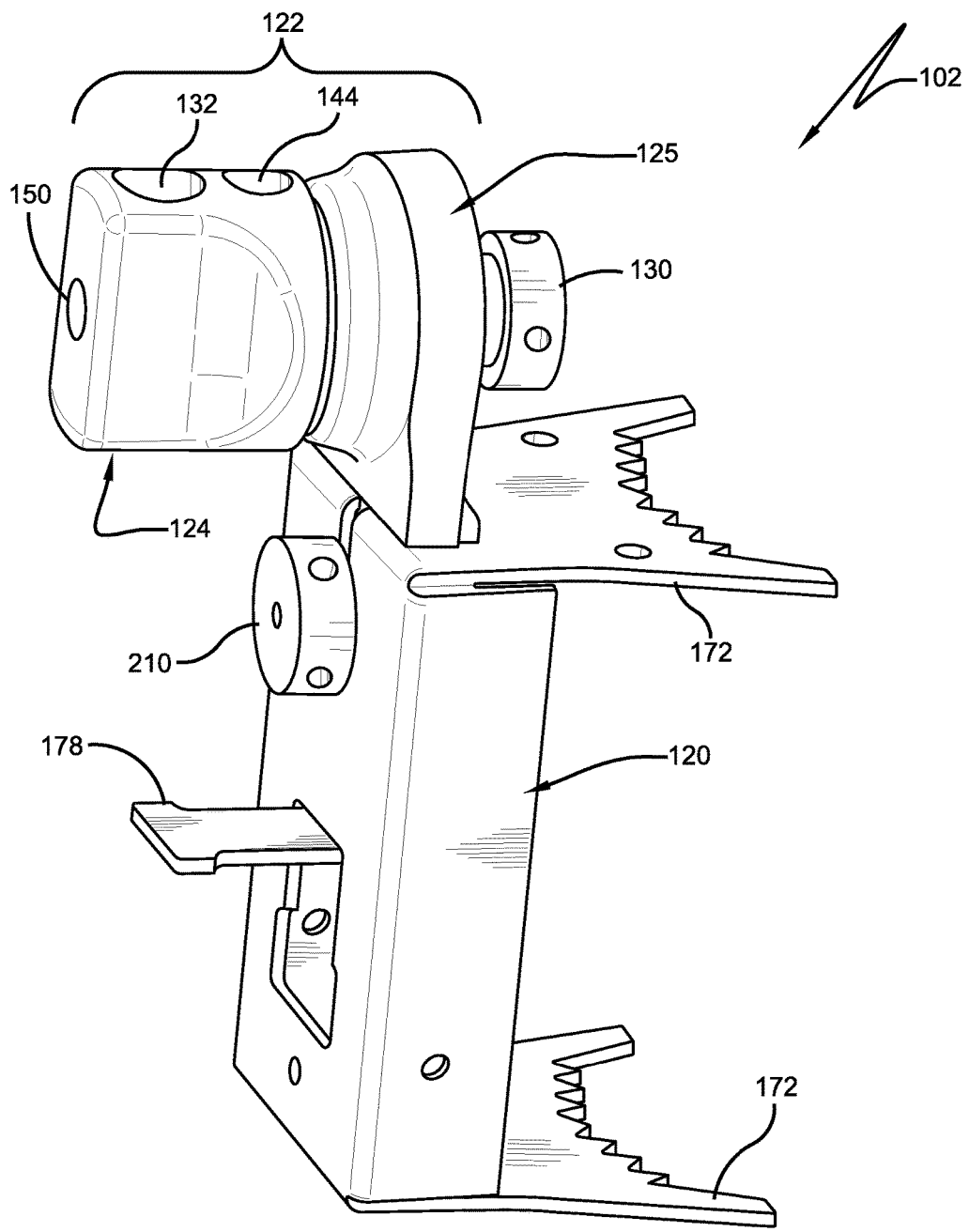
FIG. 23 is a perspective view of a second configuration of an adjustable utility mount.
Figure 24:
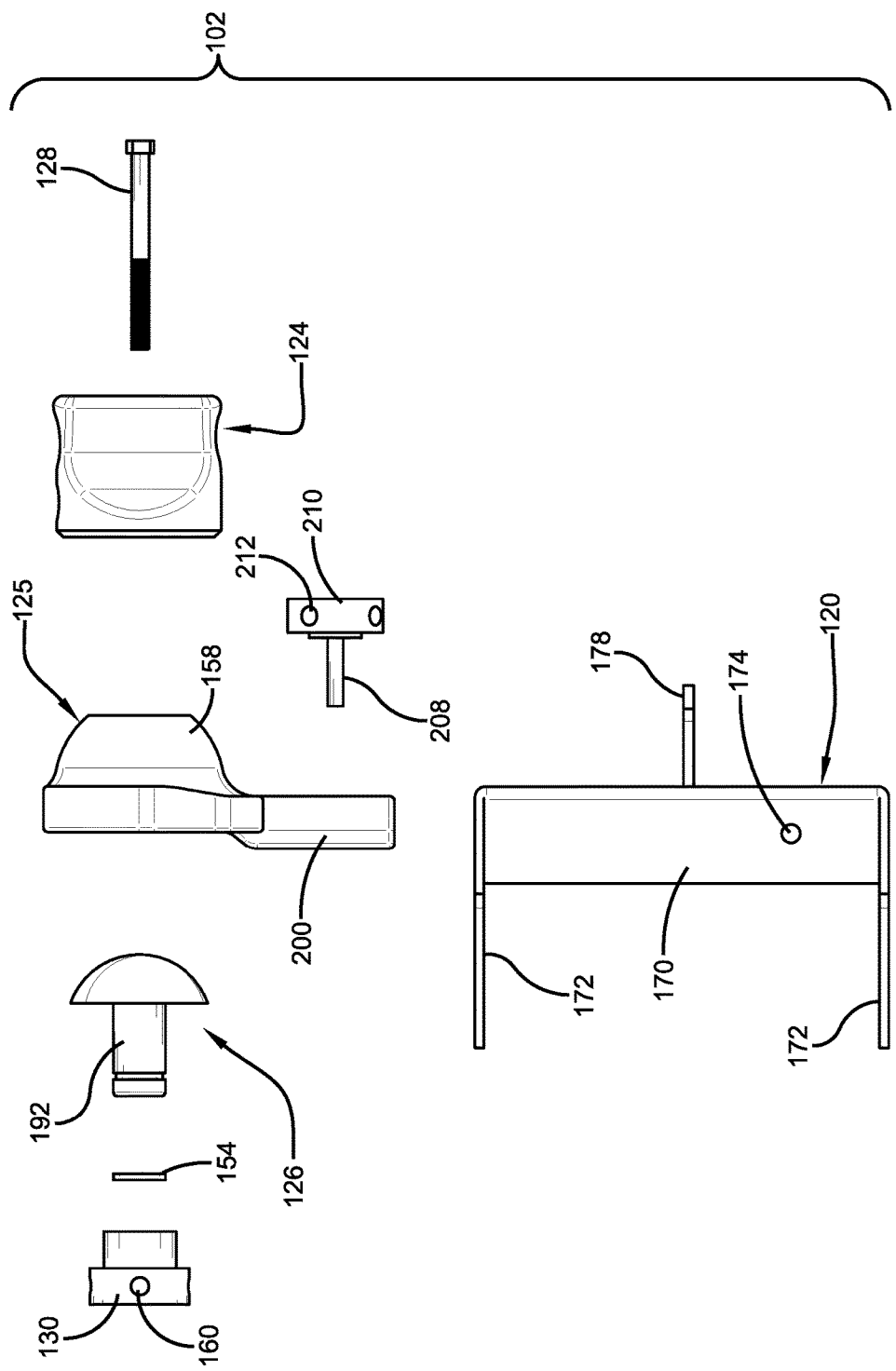
FIG. 24 is an exploded view of the second configuration of the adjustable utility mount.

FIG. 23 depicts a second exemplary configuration for the adjustable utility mount which is indicated generally by the reference numeral 102. Adjustable mount 102 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 102. Adjustable utility mount 102 can also be used to support camouflage, used as a gun rest, used as a bow rest, or to support other gear. Adjustable utility mount 102 generally includes a base mounting bracket 120, a ball joint 122 having an outer portion 124, a center portion or ball joint cup 125, and an inner portion 126. A clamp member 128 extends through outer portion 124, center portion 125, and inner portion 126. Clamp member 128 is a threaded member of bolt that threadedly engages a handle 130 that is used to tighten ball joint 122 to a clamped configuration. In this exemplary configuration, clamp member 128 is a threaded member or bolt that threadedly engages a handle 130 that is used to tighten ball joint 122. Rotating clamp member 128 until the ball joint is secured in place is when the clamp member 128 is in a clamped condition. Rotating clamp member 128 until ball joint is loose and can be adjusted is when the clamp member is in the unclamped condition. An option includes an inner ball joint portion that integrally includes the handle. Also as an option, base mounting bracket 120 can include a ratchet strap 32 (see FIG. 1) that is used to secure base mounting bracket 120 to a tree trunk 34, a tree branch, a ground mount, or another stable structure to which utility mount 2 is to be secured. This strap also can be provided by the user as an independent item. The adjustability of the ball joint 122 allows base mounting bracket 120 to be mounted to a tree trunk or tree branch or other member that is disposed at essentially any angle and orientation to level because the combination of the ball joint 122 and the manner in mounting base mounting bracket 120 provides a large degree of adjustability for the electronic device 10 that is being carried by mount 102.

In this second exemplary configuration of utility mount 102, outer portion 124 of the ball joint 122 defines an opening 132 configured to directly receive the anchor rod 134 of device mount 104 in a sliding and rotating configuration. Alternatively, outer portion 124 can be configured to receive insert 40 described above. A bubble level 142 can be carried in a recess 144 defined by outer portion 124 to allow the user to determine the position of outer portion 124 with respect to level.

Outer portion 124 of the ball joint 122 defines a bolt hole 150 that receives clamping bolt 128. Outer portion 124 defines a pocket 152 that receives the head of clamping bolt 128 to prevent clamping bolt 128 from rotating when the head of clamping bolt 128 is received in pocket 152.

Clamping bolt 128 extends through center portion 125, through inner portion 126 of the ball joint 122, through a washer 154, and threadedly engages handle 130 which is used to clamp inner 126 and outer 124 portions of the ball joint 122 against center portion 125 which defines a ball joint cup. Handle 130 defines openings 160 that allow the user to insert a wrench to apply torque to handle 130 as needed to tighten ball joint 122. The wrench can be a standard Allen key or a lever arm that, once inserted into an opening 160, allows considerable torque to be applied to handle 130. Optionally, handle 130 defines a threaded opening for a set screw that locks clamping bolt 128 in place.

An advantage of mount 102 is that the main adjustable components making up ball joint 122 are readily removable from base mounting bracket 120. This allows the user to take ball joint 122 with him when he leaves the hunting stand and makes base mounting bracket 120 less of a theft target. This configuration also allows the user to purchase multiple relatively inexpensive base mounting brackets 120 and place them at different locations where camera mounts are desired. Base mounting bracket 120 can be sold relatively inexpensively because it does not carry the adjustment components of mount 102.

Base mounting bracket 120 includes a base 170 with four legs 172. Each leg 172 has triangular portions define a tapered pocket to receive a rounded portion of a tree trunk or tree branch. Teeth can extend from legs 172 into this tapered pocket to provide grip for base mounting bracket 120. Legs 172 are the same length so that base mounting bracket 120 can be mounted to a flat surface as well. Body 170 defines a plurality of threaded openings 174 that allow accessories to be mounted to body 170. Body 170 also defines through holes 176 in a leg 172 that can hold the torque wrench used to tighten handle 130. Body 170 also includes a cleat 178 used to receive strap 32 that secured base mounting bracket 120 to the tree trunk or branch. Cleat 178 can include a flange to help prevent the strap from slipping off of base mounting bracket 120.

Figure 26:
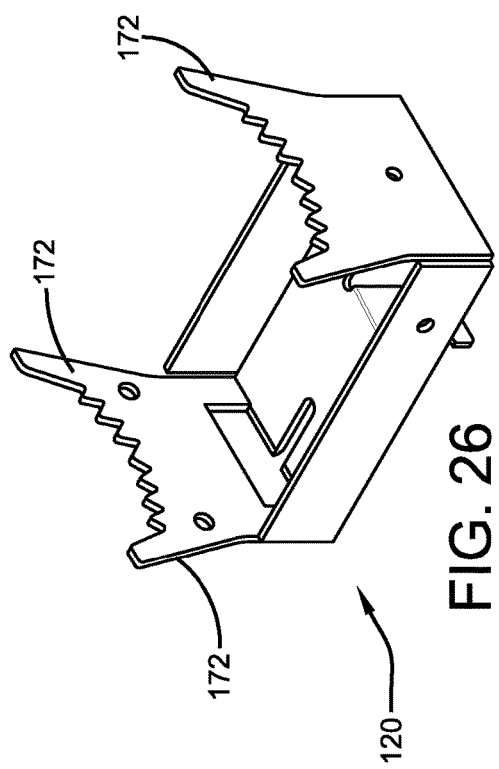
FIG. 26 is a rear perspective view of a second configuration of the base mounting bracket.
Figure 27:
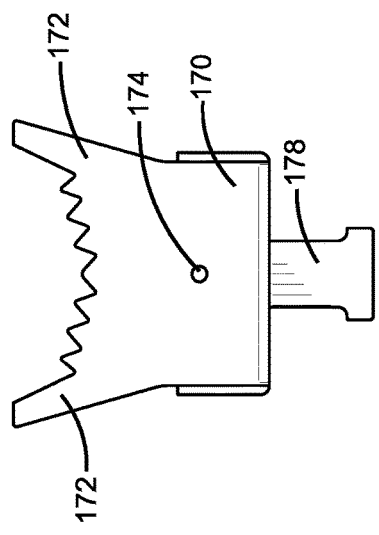
FIG. 27 is an end view of FIG. 26.
Figure 29:
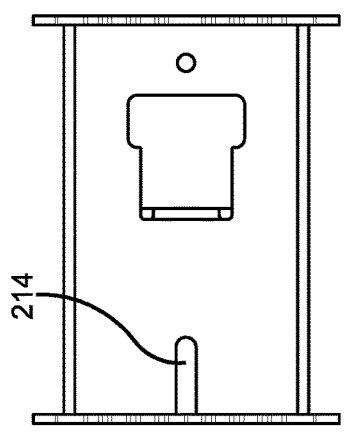
FIG. 29 is a rear view of FIG. 26.
Figure 28:
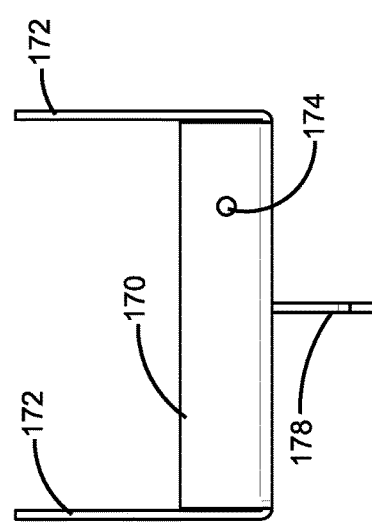
FIG. 28 is a side view of FIG. 26.
Figure 30:
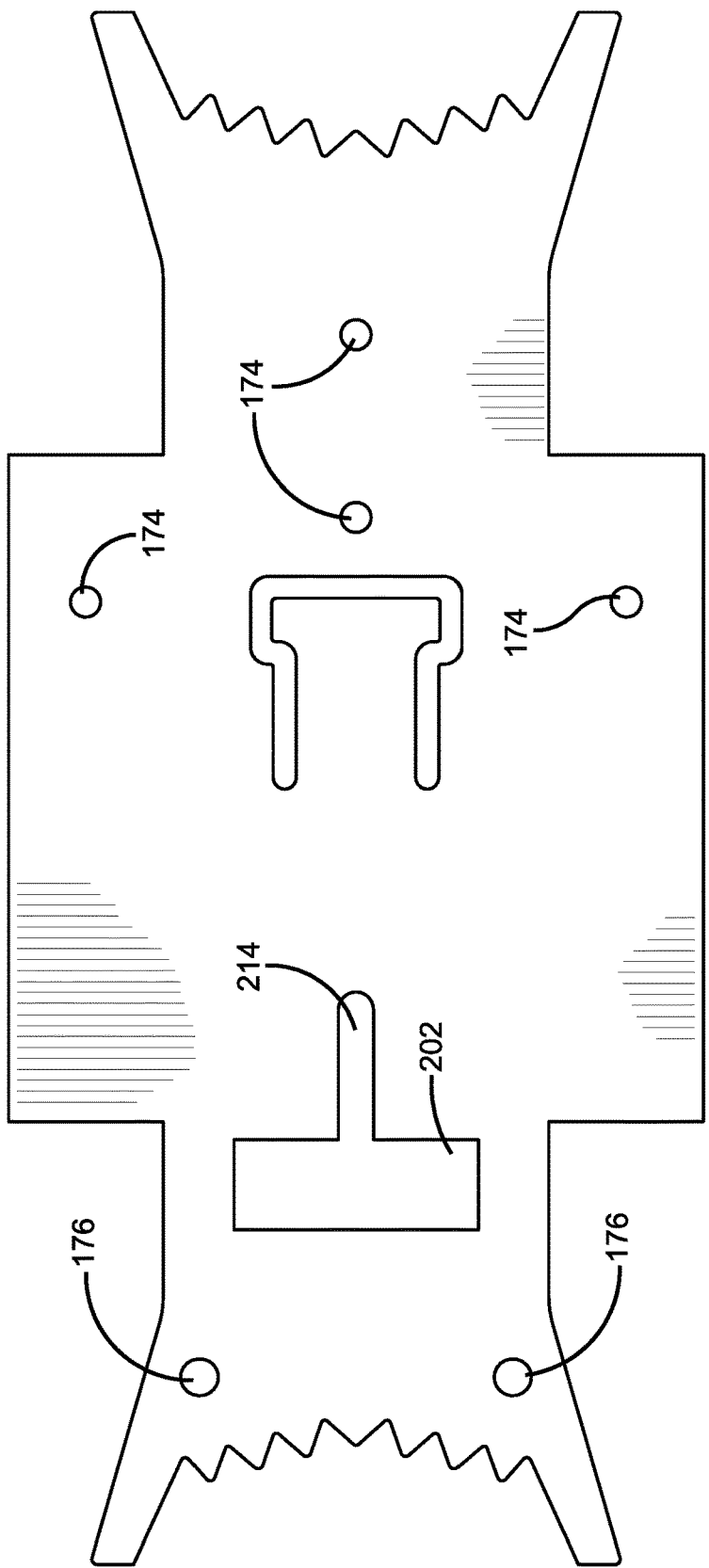
FIG. 30 is a top plan view of the second configuration of the cut blank used to form the second configuration of the base mounting bracket.

In the second configuration of utility mount 102, base mounting bracket 120 can be formed from a flat piece of material as shown in FIG. 30. The blank is cut from a flat piece of material such as steel and then bent into the configuration of FIG. 26. The corners can be welded if desired and the bracket 120 can be powder coated or otherwise finished to resist the elements. This configuration allows legs 172 and cleat 178 to be formed by folding material from the box-shaped body 170.

As described above, ball joint 122 includes a center portion 125 that defines a ball joint cup 158. Ball joint cup 158 has an inner surface that matches the rounded front surface of inner portion 126 of the ball joint. Ball joint cup 158 has an outer surface that matches the inner curved surface of outer portion 124 of the ball joint 122. Ball joint cup 158 defines a large opening 190 that allows clamping bolt 128 and ball joint portions 124 and 126 to swivel with respect to ball joint cup 158. Outer portion also can rotate 360 degrees about the axis of bolt 128 (the longitudinal axis of the ball joint) when it is in any of its possible swivel positions. The swivel movement can be combined with the rotation to allow the position of outer portion 124 to be fully adjustable.

Inner portion 126 of the ball joint 122 includes a stem 192 that receives handle 130. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the ball joint. The end of stem 192 abuts washer 154 within handle 130. Stem 192 defines a recess 194 that can receive a ridge 96 (as with the first configuration) on handle 130 so that handle 130 can fully rotate about stem 192.

Figure 31:
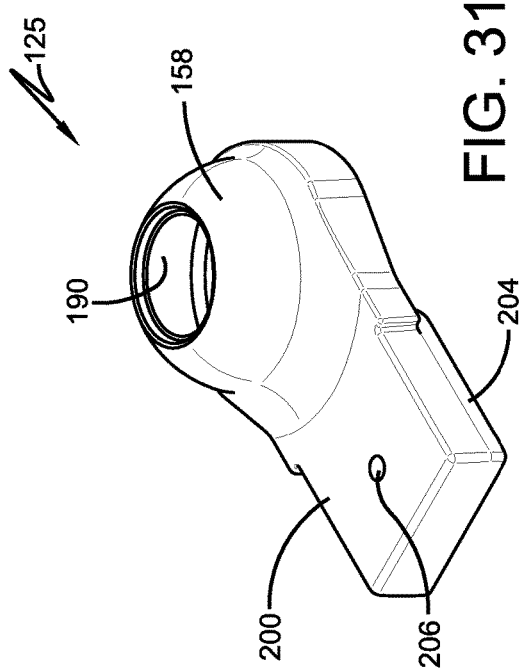
FIG. 31 is a perspective view of a second configuration of the ball joint cup that is removable from the base mounting bracket.
Figure 32:
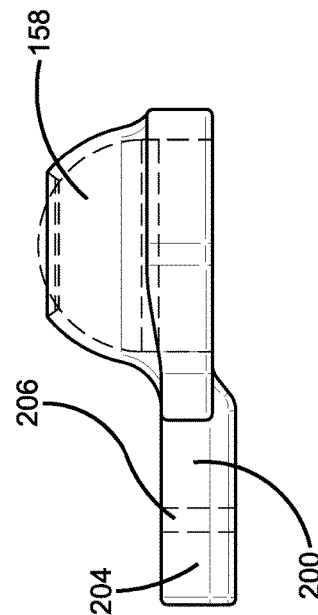
FIG. 32 is a side view of FIG. 31.
Figure 34:
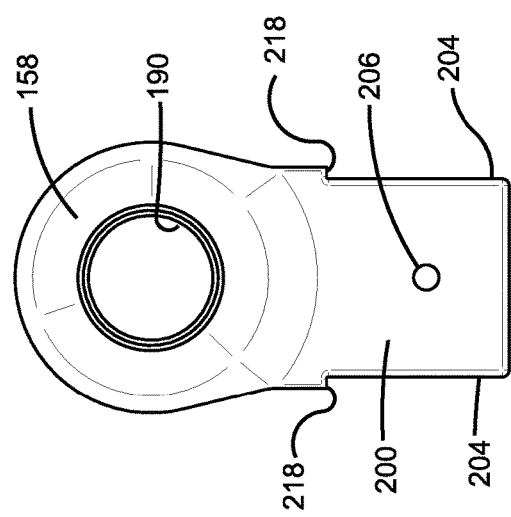
FIG. 34 is a front view of FIG. 31.
Figure 33:
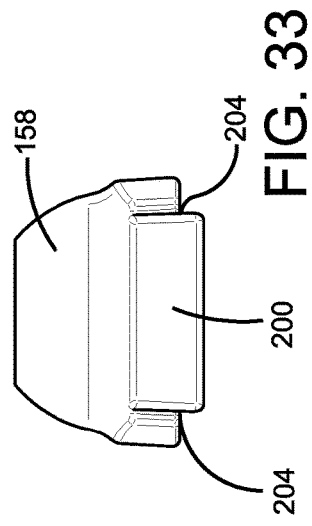
FIG. 33 is an end view of FIG. 31.
Figure 39:
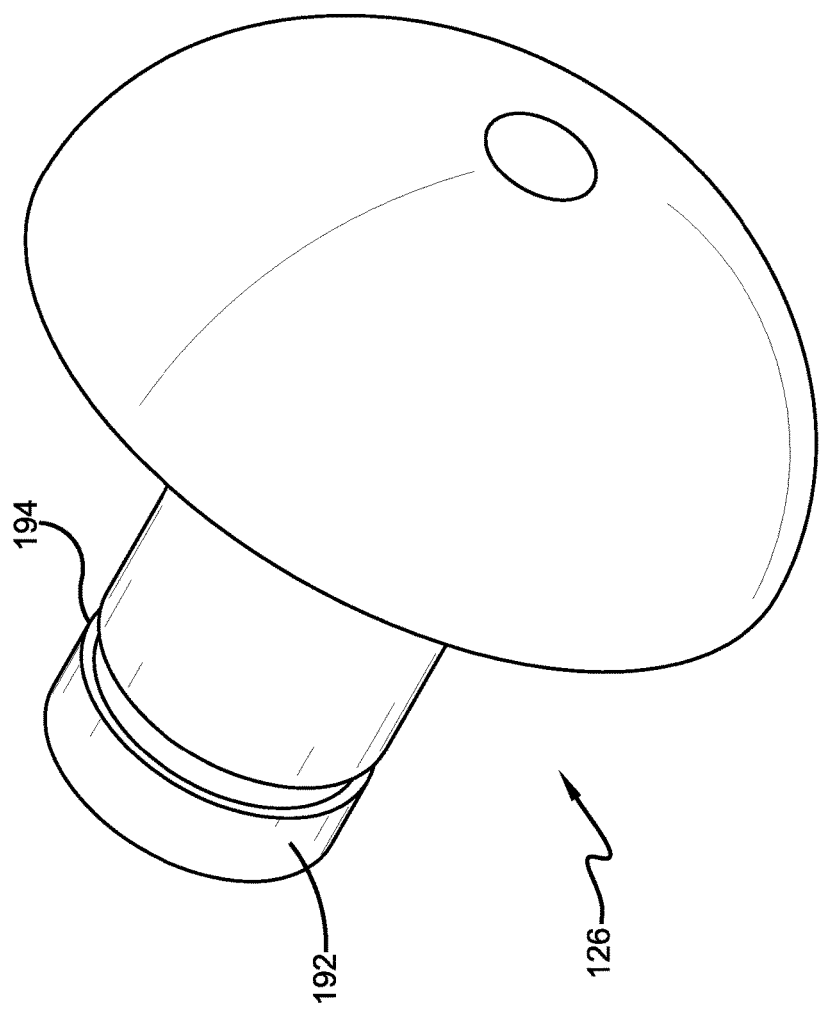
FIG. 39 is a perspective view of the second configuration of the inner portion of the ball joint.

Center portion 125 includes a neck 200 that extends down away from ball joint cup 158 to allow center portion to be removably and replaceably (selectively) mounted to base mounting bracket 120. To mount center portion 125, neck 200 is slid down through a corresponding opening 202 defined by the top portion of base mounting bracket 120. In this configuration, opening 202 is rectangular in shape to receive neck 200 which, as shown in FIG. 31, can include ribs 204 to frictionally engage base mounting bracket 120 as neck 200 is slid into opening 202. Neck 200 also defines a threaded opening 206 that receives the threaded rod 208 of a clamp 210. Opening 206 extends through neck 200. Clamp 210 defines a plurality of openings 212 similar to openings 160 on handle so the same wrench can be used to tighten and loosen clamp 210. After neck 200 is seated within base mounting bracket 120, the use rotates clamp 210 until clamp 210 and neck 200 are clamped against the front wall of base mounting bracket 120. The front wall of base mounting bracket 120 defines a slot 214 that allows clamp 210 and neck to be slid out of bracket 120 after clamp 210 is loosened so that clamp 210 can be moved to the next location with ball joint 122. In another configuration, opening 206 is not threaded and a threaded nut is used on the rear side of neck to receive threaded rod 208. In a further configuration, neck 200 can be held to base mounting bracket 120 with a snap fit tab that pivots between locked and unlocked configurations. The snap fit tab can be carried by neck 200.

Another configuration of base mounting bracket 120 is depicted in FIGS. 55-61 wherein base mounting bracket 120 is assembled by the user from components that can be shipped in a small flat container. In this configuration, base mounting bracket 120 includes upper 400 and lower 402 mounts that include legs 172. Mounts can be provided in a variety of shapes and configurations. In the exemplary configuration, mounts 400 and 402 are in the form of flat plates which allows base mounting bracket to be stored in a flat configuration and transported in a compact configuration. Base mounting bracket 120 also includes an intermediate plate 404 that is positioned between upper 400 and lower 402 end plates. Upper end plate 400 and intermediate plate 404 define aligned openings 202 that receive the neck 200 of the ball joint center portion 125.

Plates 400, 402, and 404 are assembled to form base mounting bracket 120 with a plurality of connectors 406 and tubes 408 and 410. Tubes 408 and 410 function as spacers for plates 400, 402, and 404 while connectors 406 are disposed through tubes 408 and 410 to clamp the plates against the tubes. Connectors 406 can be carriage bolt and nut combinations. In the exemplary configuration, four tubes are used to define base mounting bracket 120 with tubes 410 being shorter than tubes 408. For example, tubes 408 can each be half inch to nine long and tubes 410 can each be zero (not used) to six inches long. For example, each carriage bolt 406 can be four inches to ten inches long. Bolt 406 can be a half inch with 13 thread. Clamp 210 can engage tubes 410 or the outer ends of plates 400 and 404 directly or with a bridge member 412. This allows clamp 210 to hold neck 200 in place. Each tube 408 and 410 defines a through hole that receives the shank of the carriage bolt. Each plate 400, 402, and 404 defines holes 414 large enough for the carriage bolt shank and smaller than the outer diameter of the tubes 408 and 410 so that each tube 408 and 410 abuts the plates. Tightening connectors 406 to clamp the plates onto the tubes creates base mounting bracket 120.

End plates define toothed inset portions so that they can grip a tree trunk or branch. Lower plate 402 defines cleat 178 or one or a plurality of T-shaped hooks on which gear can be hung in a manner similar to hook 98.

This configuration allows the base mounting bracket 120 to be packaged and shipped in a flat configuration and allows it to be inexpensive so that the user can position multiple base mounting brackets 120 for use with ball joint center portion 122.

Figure 25:
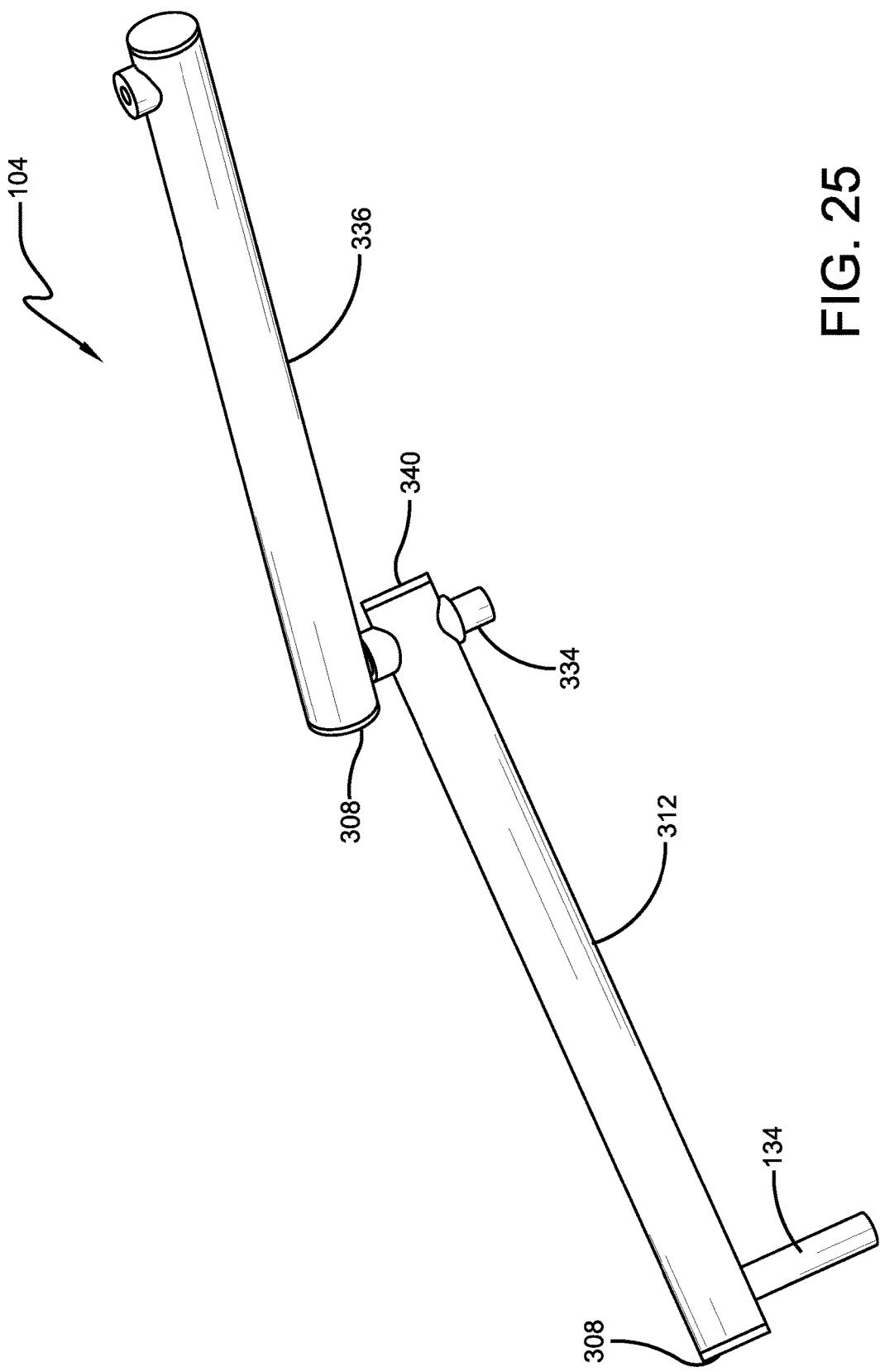
FIG. 25 is a perspective view of one configuration of a device mount in the form of an articulating arm.
Figure 44:
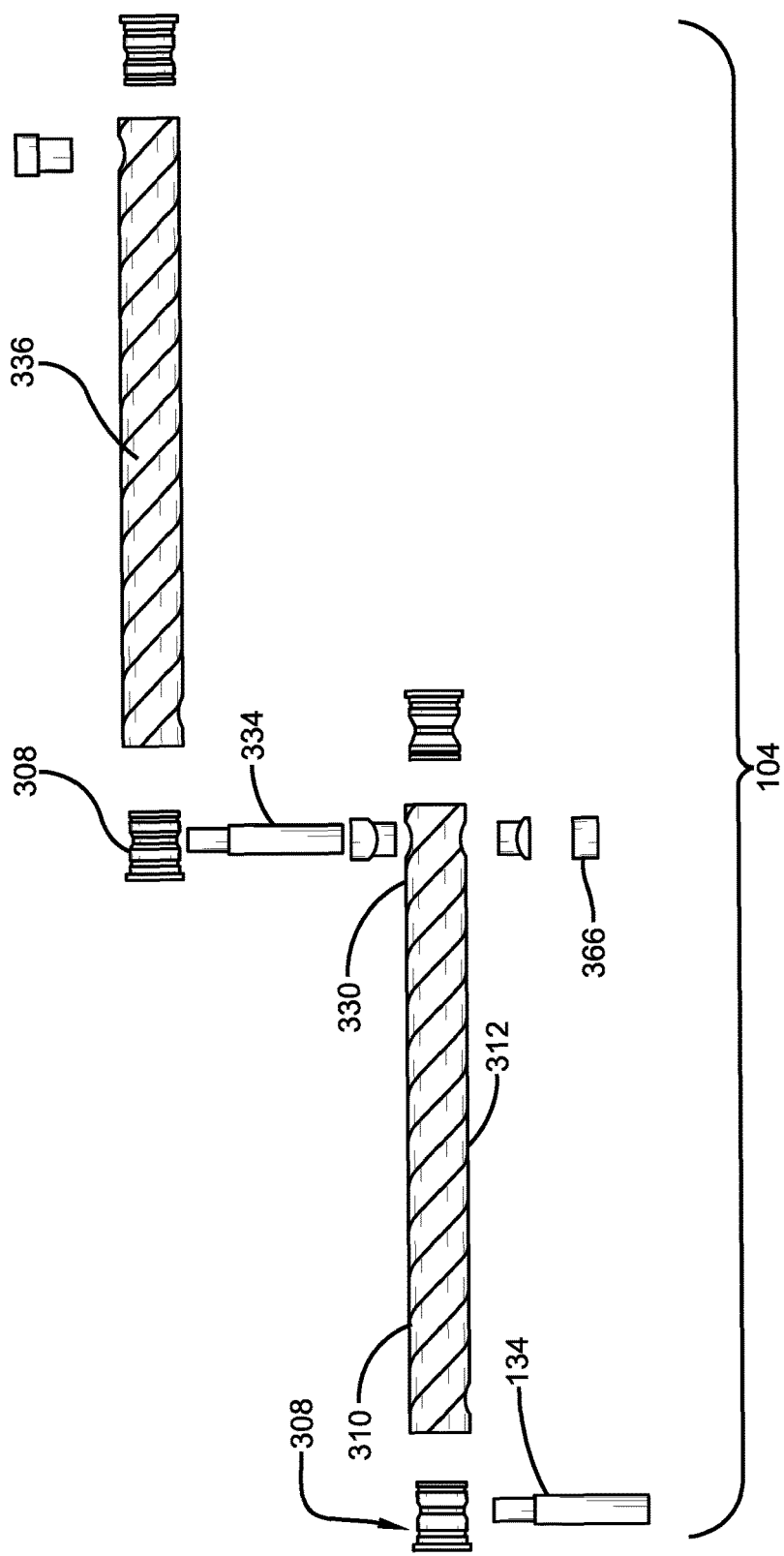
FIG. 44 is an exploded view of the device mount of FIG. 25.
Figure 45:
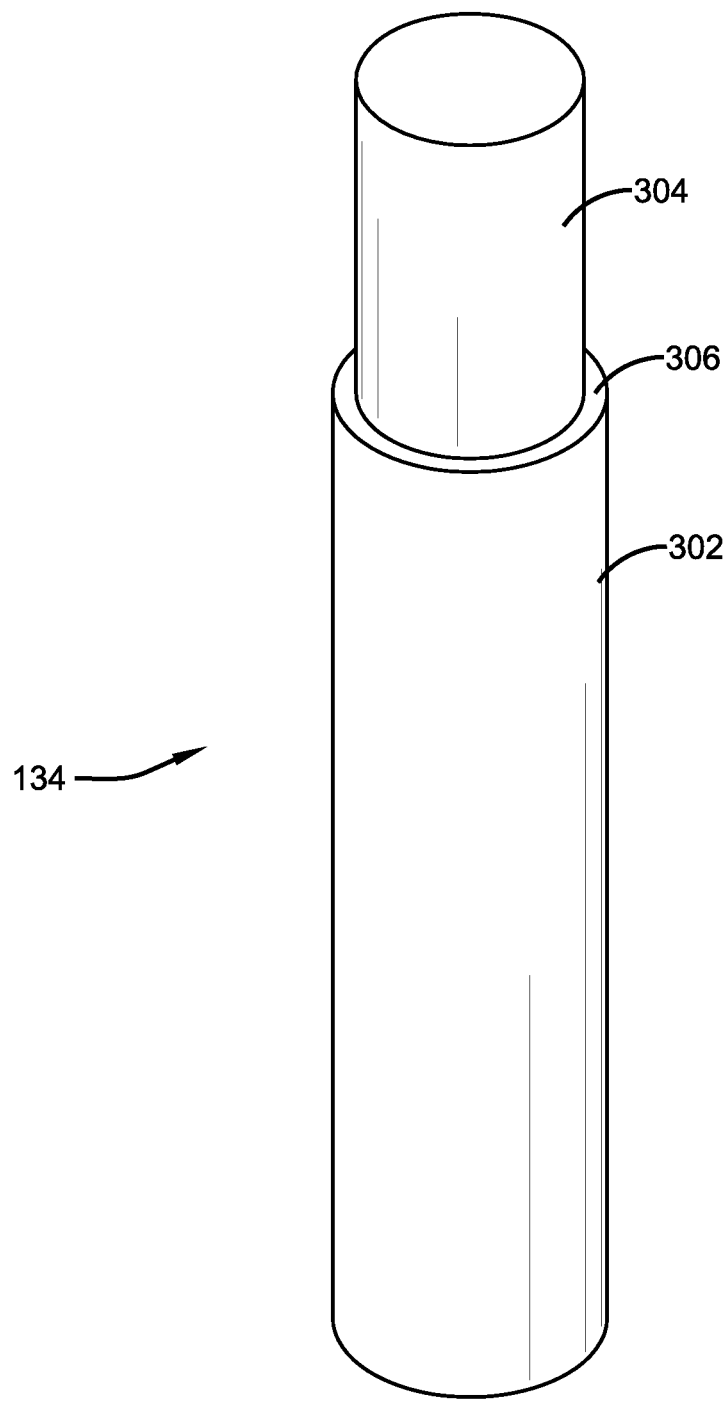
FIG. 45 is a plurality of views of the anchor rod for the device mount arm of FIGS. 23 and 44.

FIGS. 25 and 44 depict an exemplary device mount 104 in the form of a two section articulating arm. This exemplary configuration uses hollow tubes as the arm sections with rigid joint inserts carried at the ends of the hollow tubes to define the pivoting joints used to allow the arm sections to pivot with respect to each other. In one embodiment, the hollow arm tubes are made from a carbon fiber material and the inserts that fit into the ends of the tubes are made from aluminum. This configuration provides for assembly without welding which is an advantage because of the elimination of the preparation and finishing time and allows device mount 104 to be assembled in a room with regular ventilation and work tables. In the one exemplary configuration, the lack of welds is a feature of the device mount. In the exemplary configuration described below, the Applicant has included exemplary dimensions to help describe the relationships between elements. These dimensions are exemplary and can be changed to provide device mounts 104 designed for smaller or larger loads. The disclosure is not to be limited to the dimensions provided. As described above, the anchor rod 134 is the element of device mount 104 that is removably received by the ball joints described above. Anchor rod 134 can be made from aluminum, another metal, a hard polymer, another polymer, or another hard material that is dimensionally stable. The elements that form the joints described below can be made from aluminum, another metal, a polymer, or another hard material. The arm sections can be made from carbon fiber tubing or aluminum tubing. The cross sections of the tubing can be provided in various shapes including, for example, round, oval, square, rectangular. The arms sections also can be made from polymer.

Figure 46:
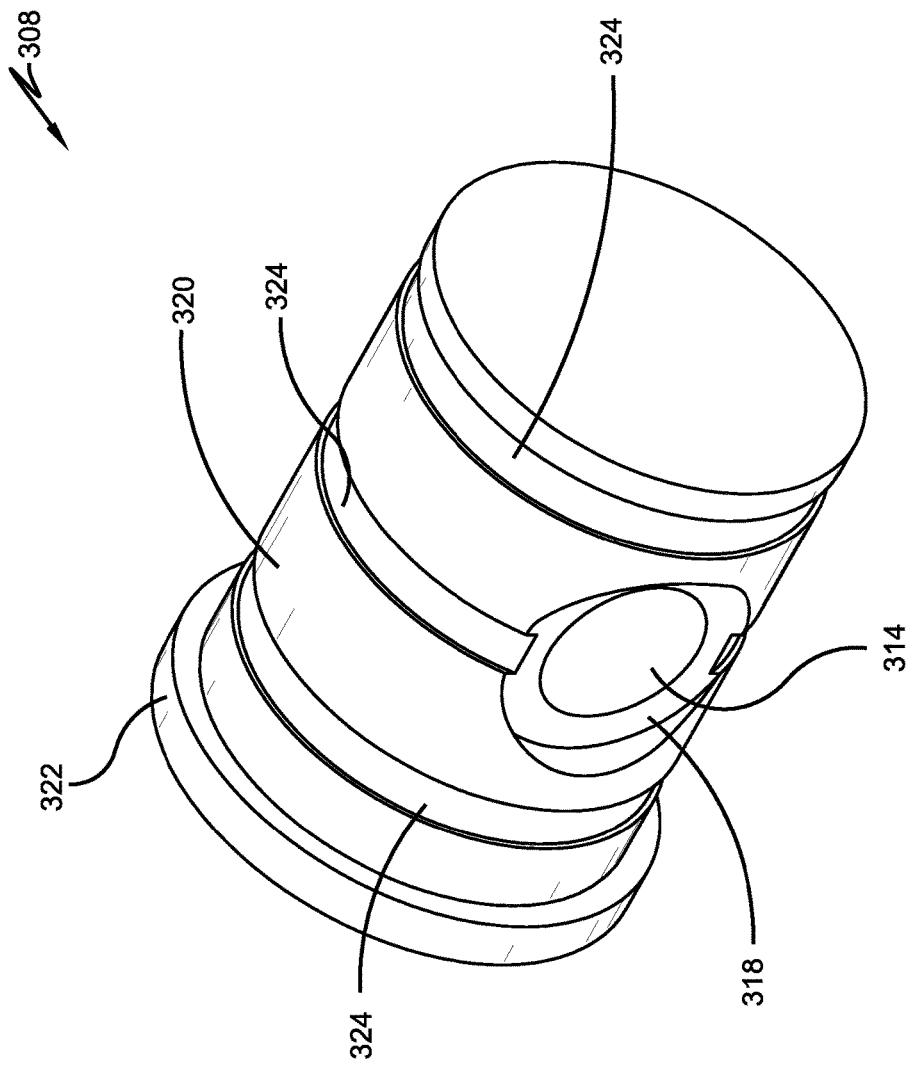
FIG. 46 is a plurality of views of an anchor insert for the end of one of the first arm sections to receive the threaded end of the anchor.
Figure 47:
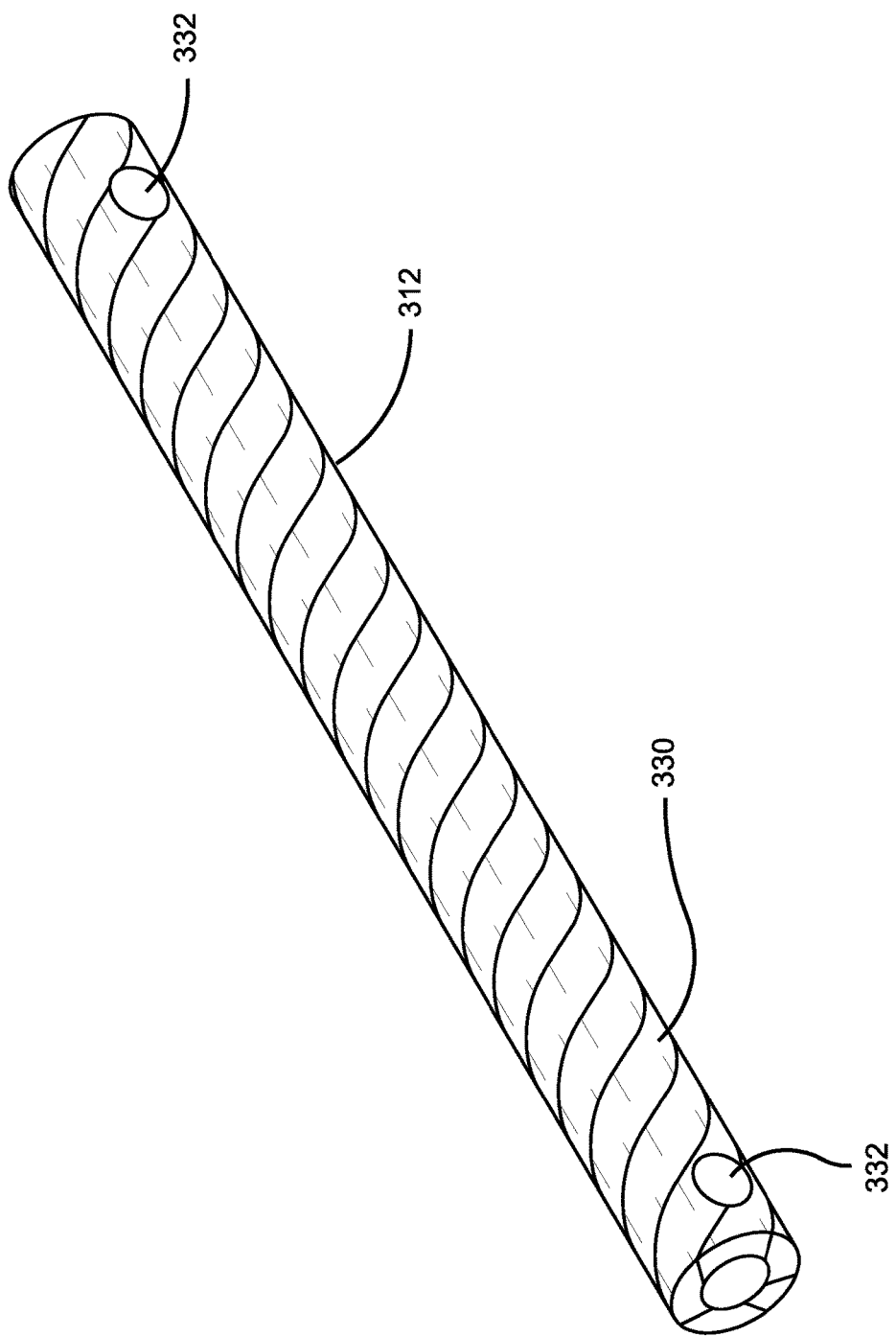
FIG. 47 is a plurality of views of a first arm section.
Figure 48:
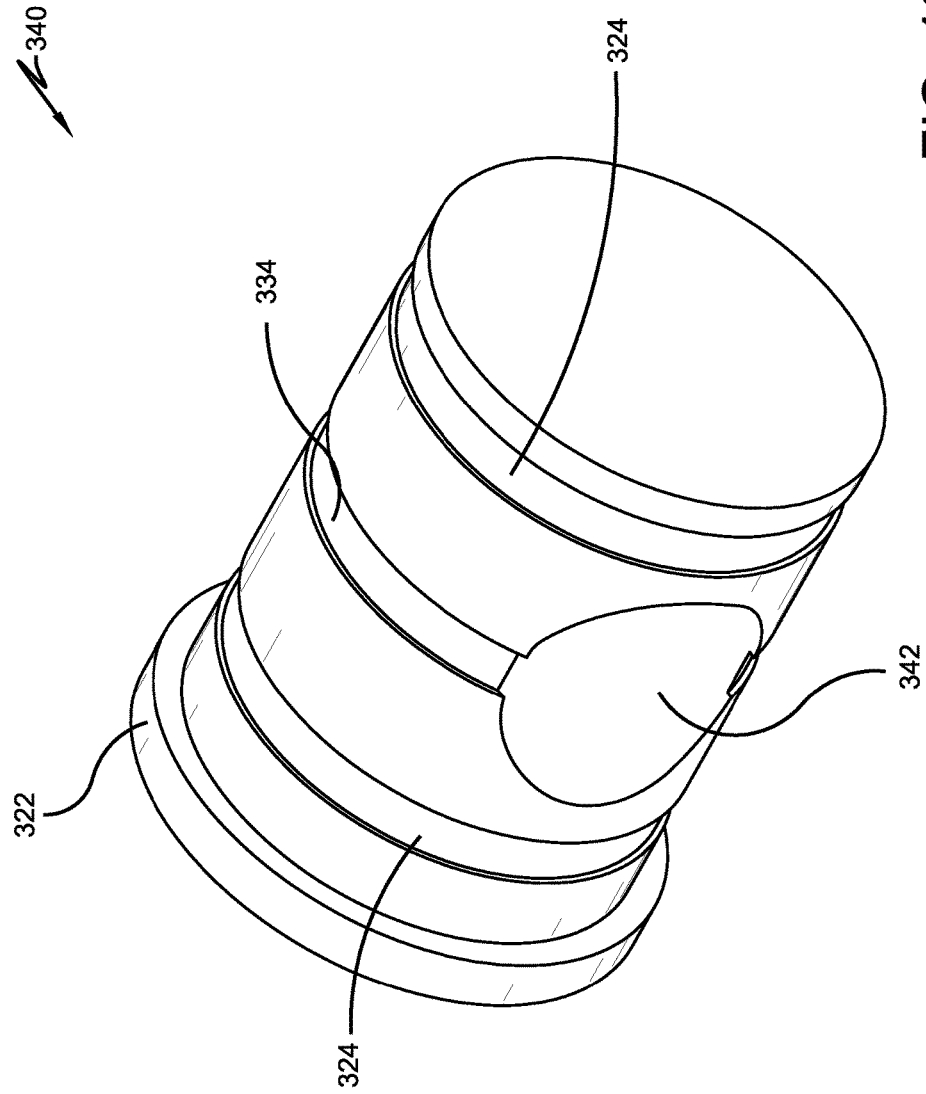
FIG. 48 is a plurality of views of a joint insert for the other end of the arm section.
Figure 49:
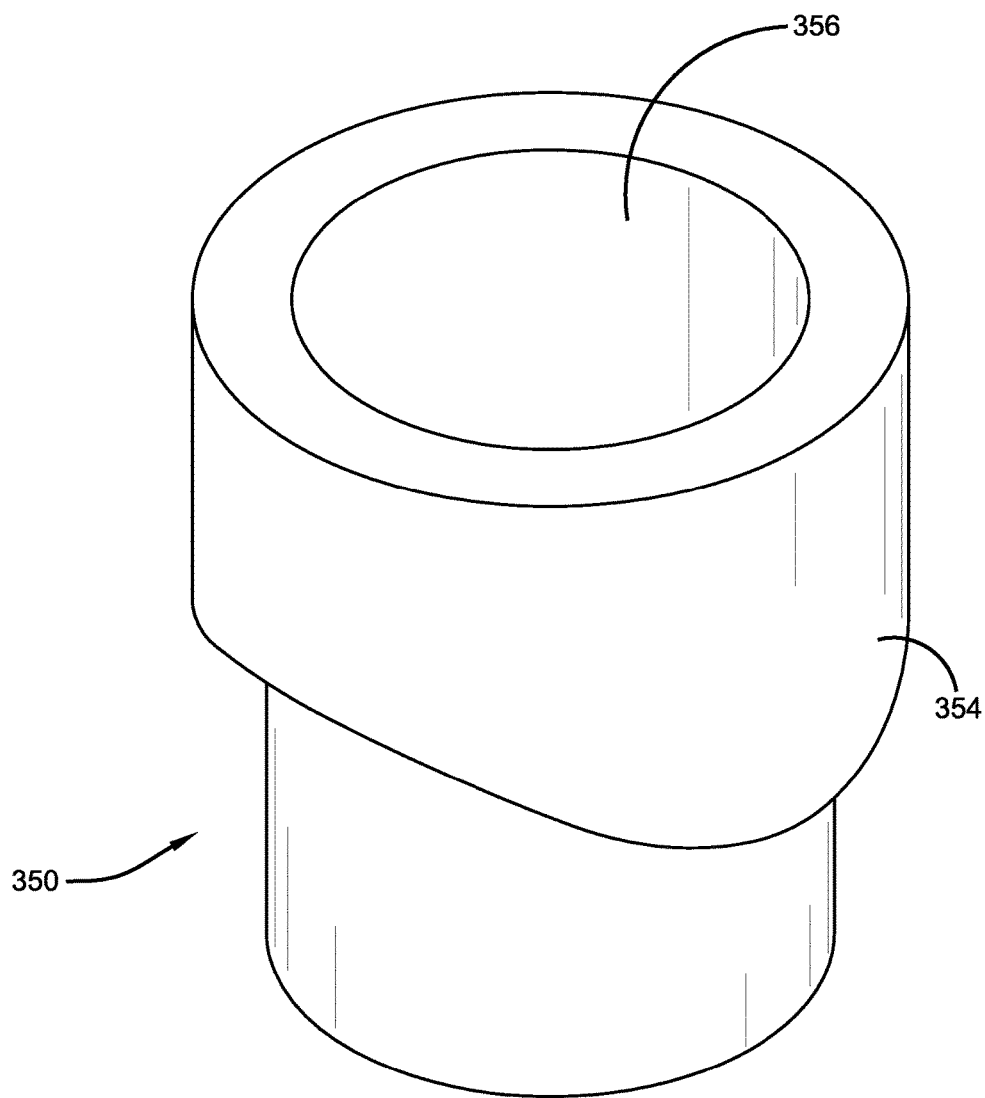
FIGS. 49 and 50 are views of the bushing inserts that are fit into the top and bottom of the joint insert.
Figure 50:
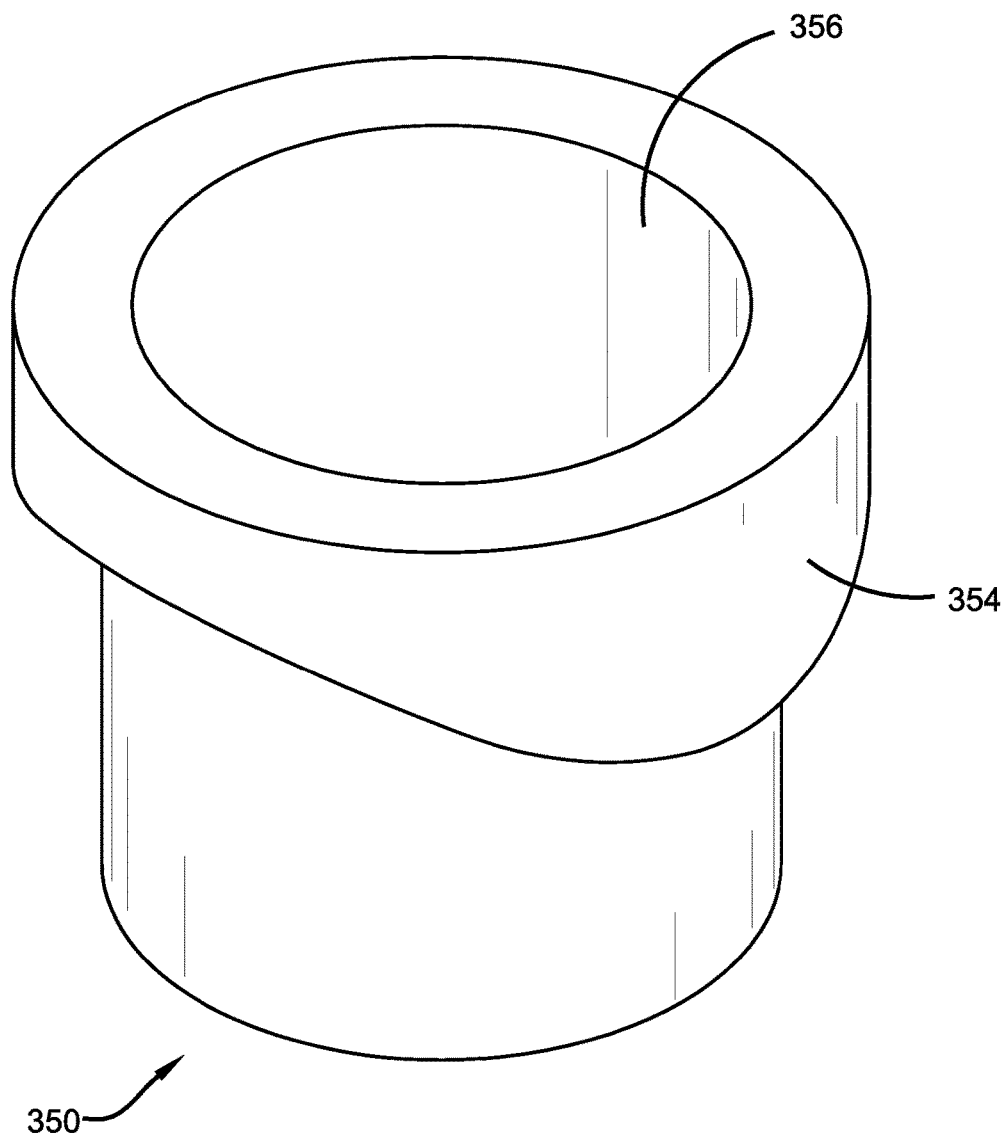
Figure 51:
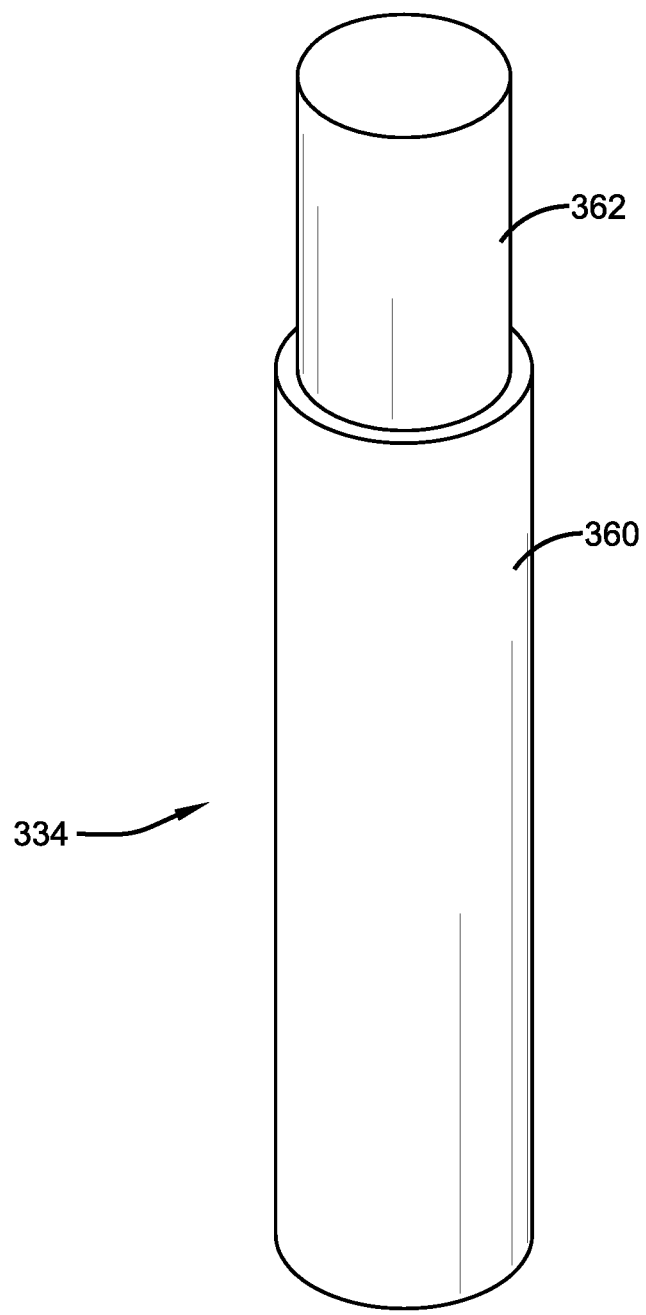
FIG. 51 is a plurality of views of the joint pin.
Figure 52:
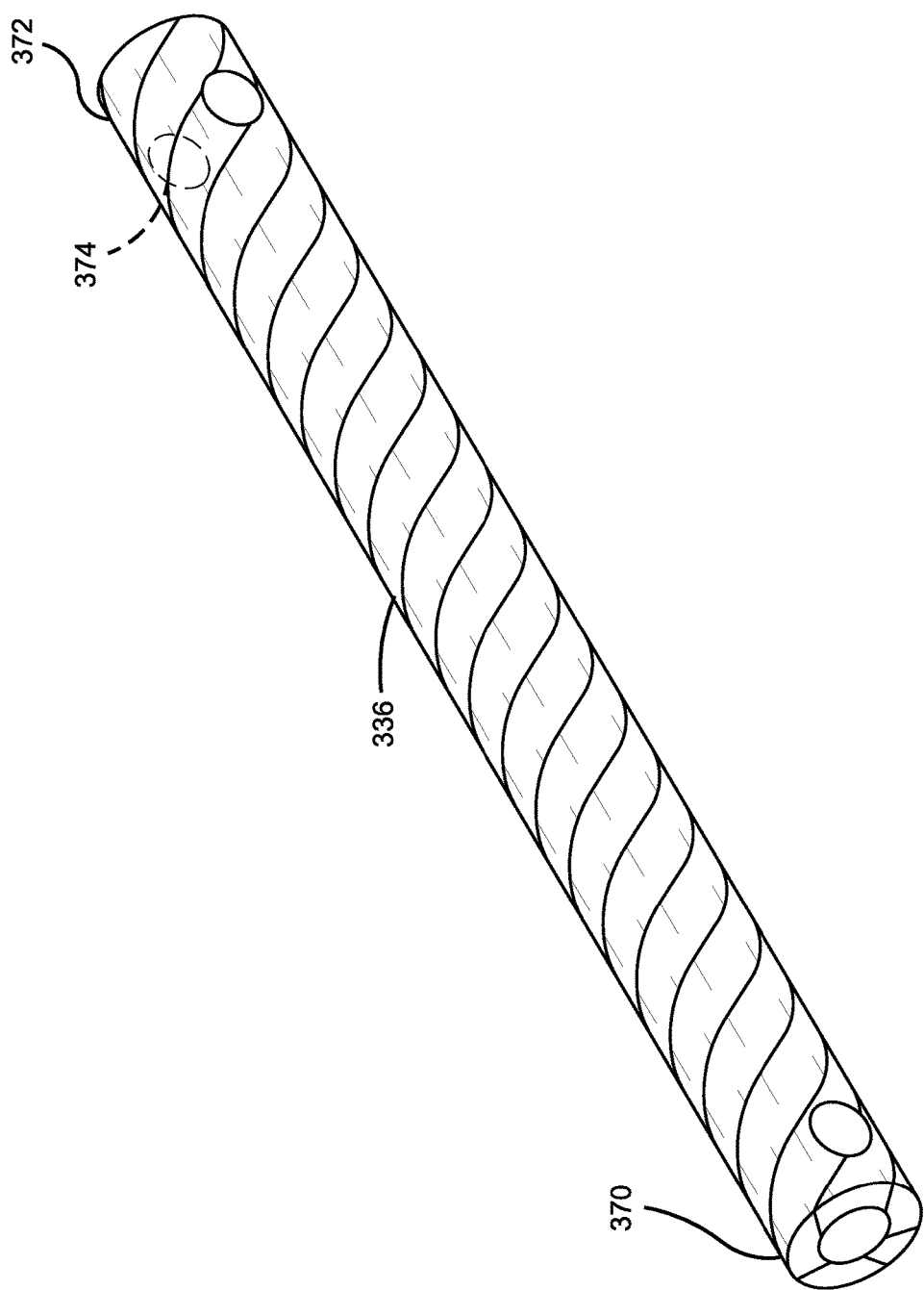
FIG. 52 is a plurality of views of a second arm section.
Figure 53:
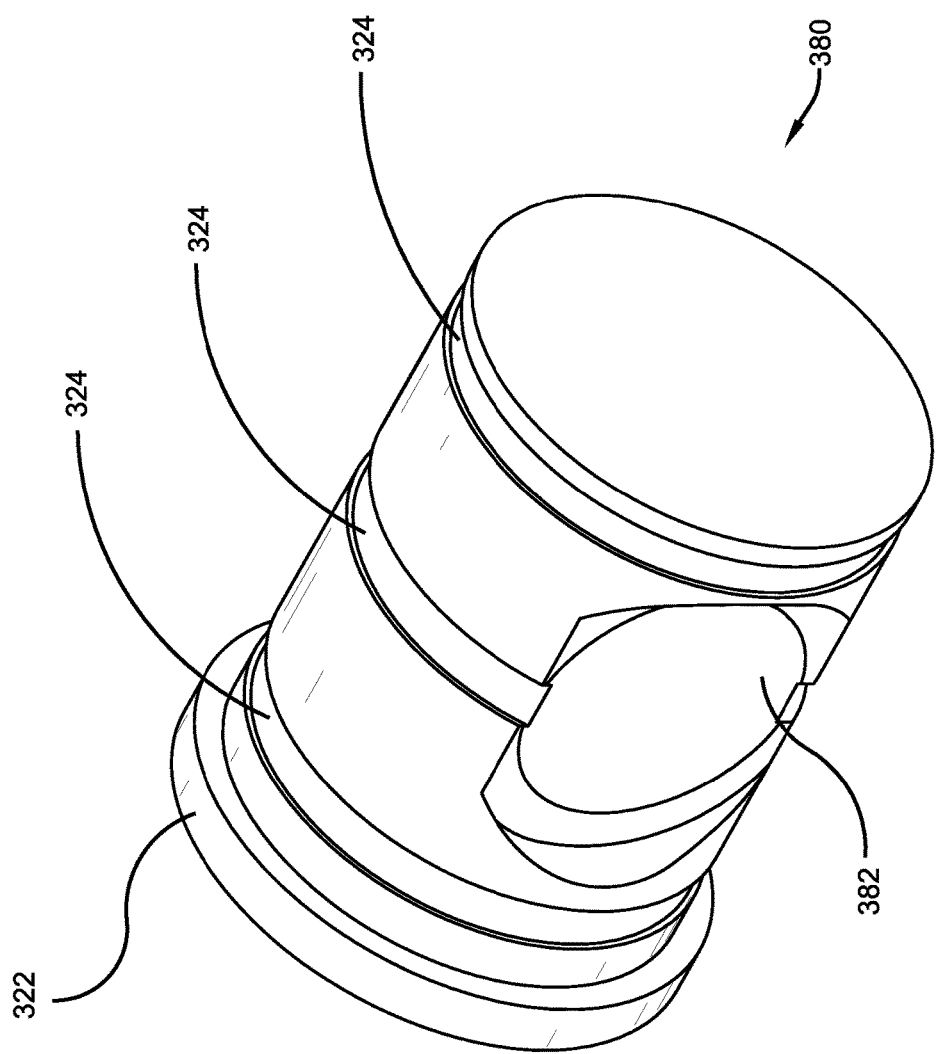
FIG. 53 is a plurality of views of a sleeve insert for the outer end of the second arm section.
Figure 54:
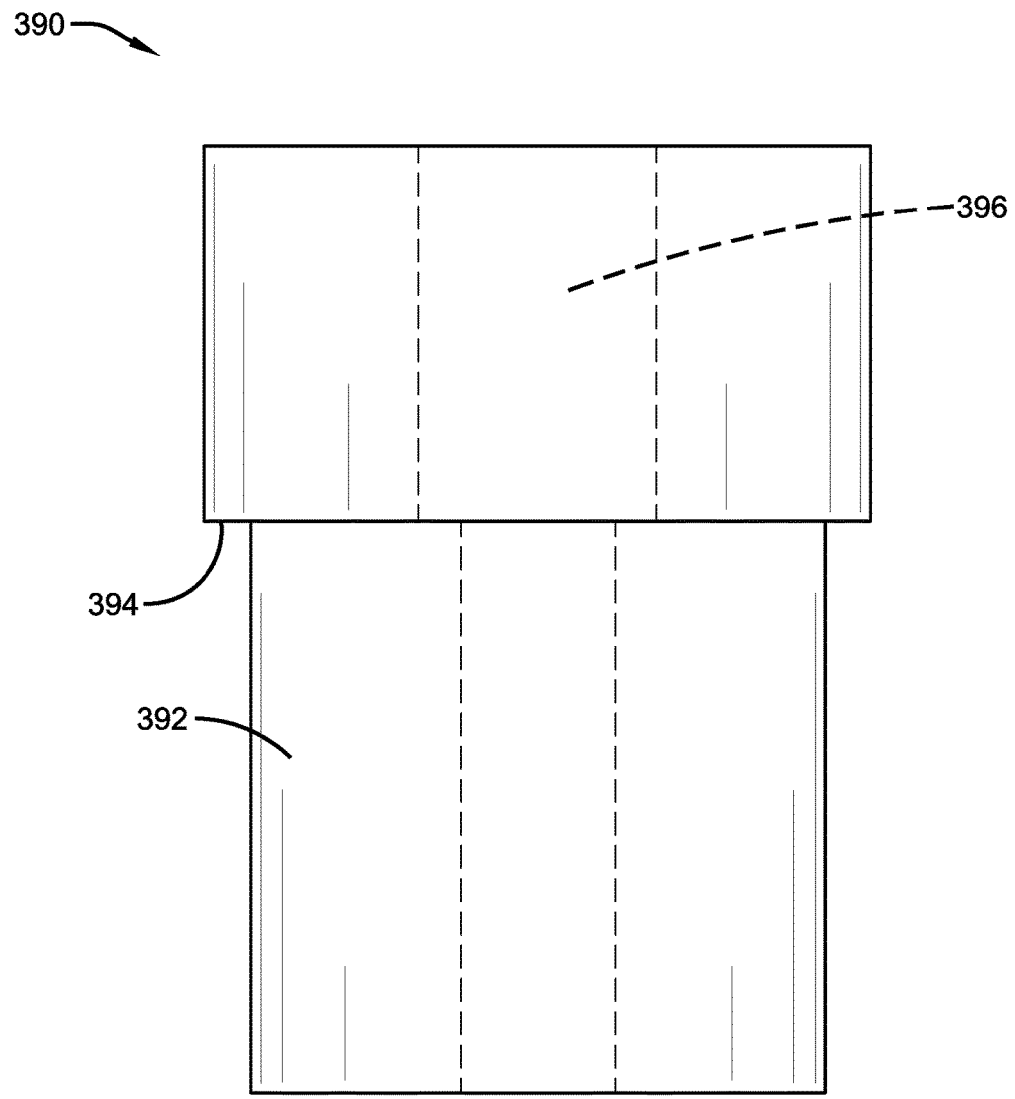
FIG. 54 is a plurality of views of the mount sleeve.
Figure 55:
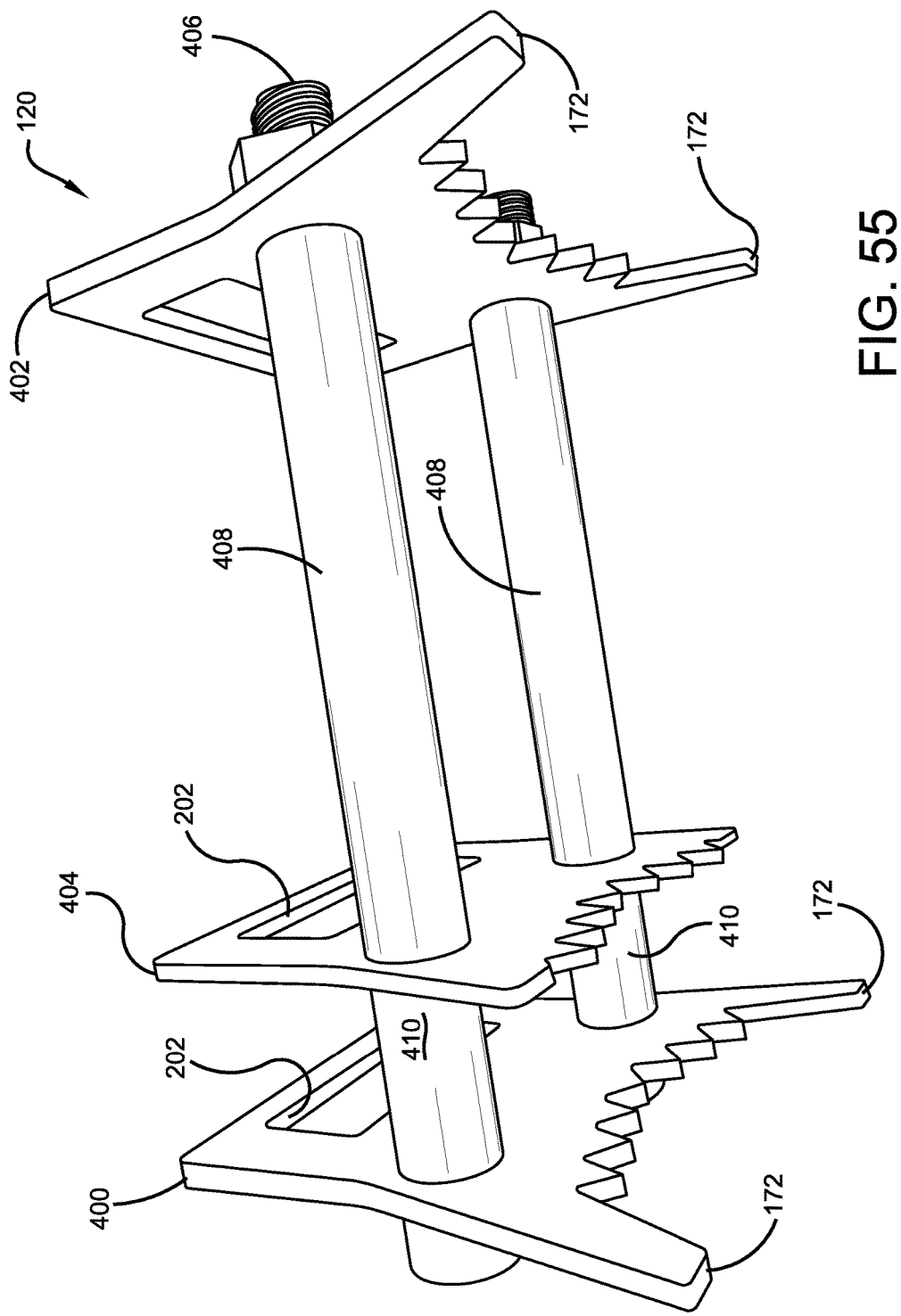
FIG. 55 is a perspective view of an alternative embodiment of the base mounting bracket.
Figure 56:
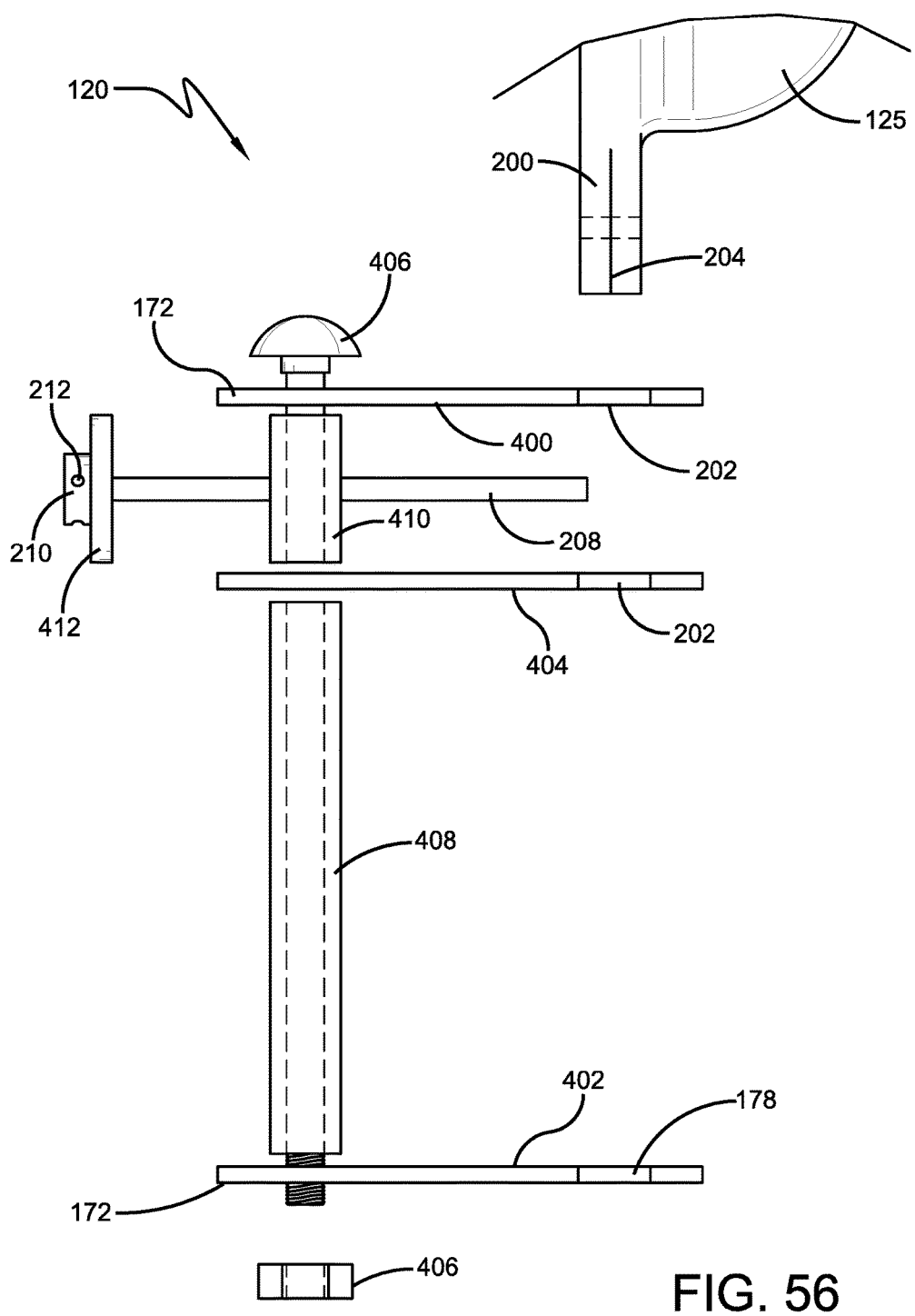
FIG. 56 is a side exploded view of the base mounting bracket of FIG. 55.
Figure 57:
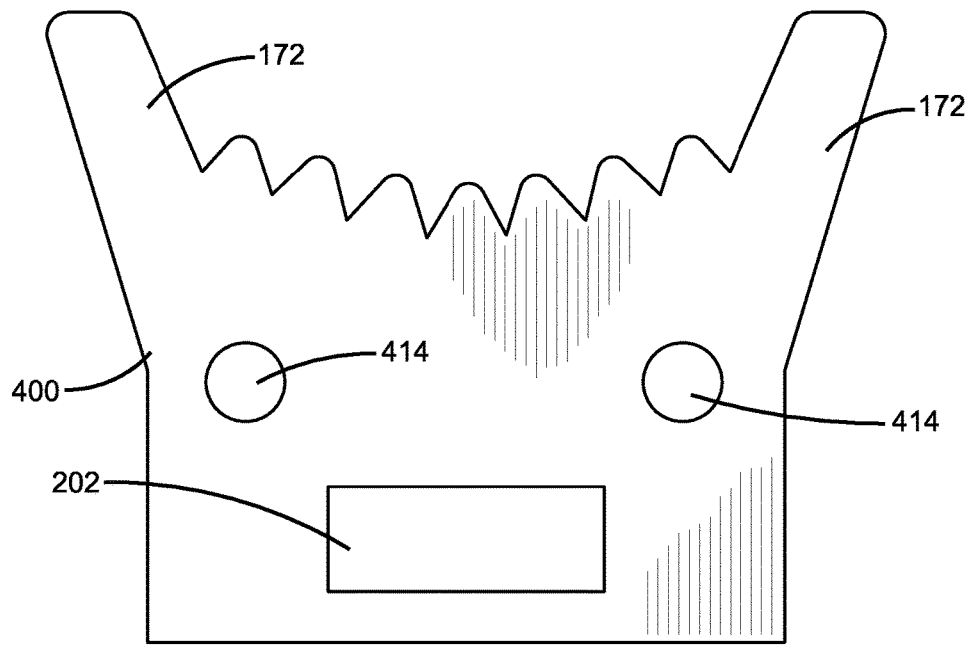
FIG. 57 is a plan view of the upper end plate of the base mounting bracket of FIG. 55.
Figure 58:
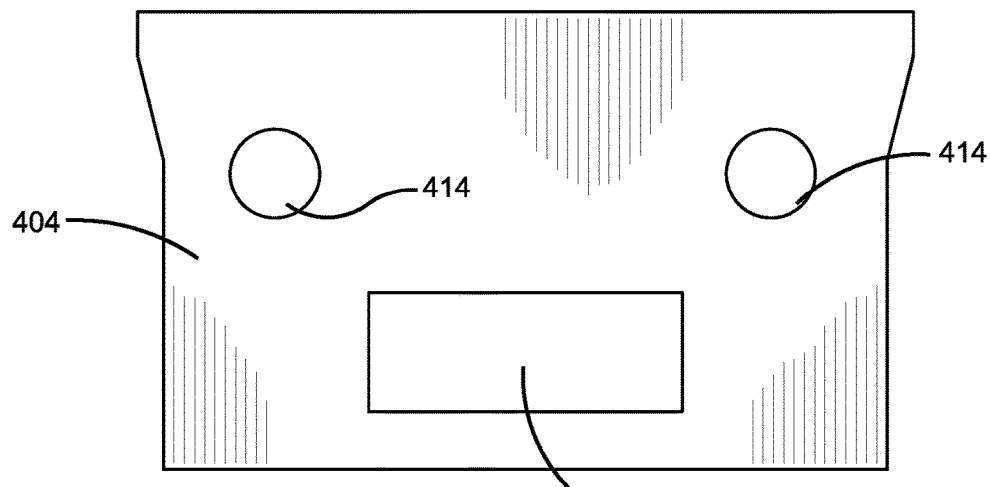
FIG. 58 is a plan view of the intermediate mounting plate of the base mounting bracket of FIG. 55.
Figure 59:
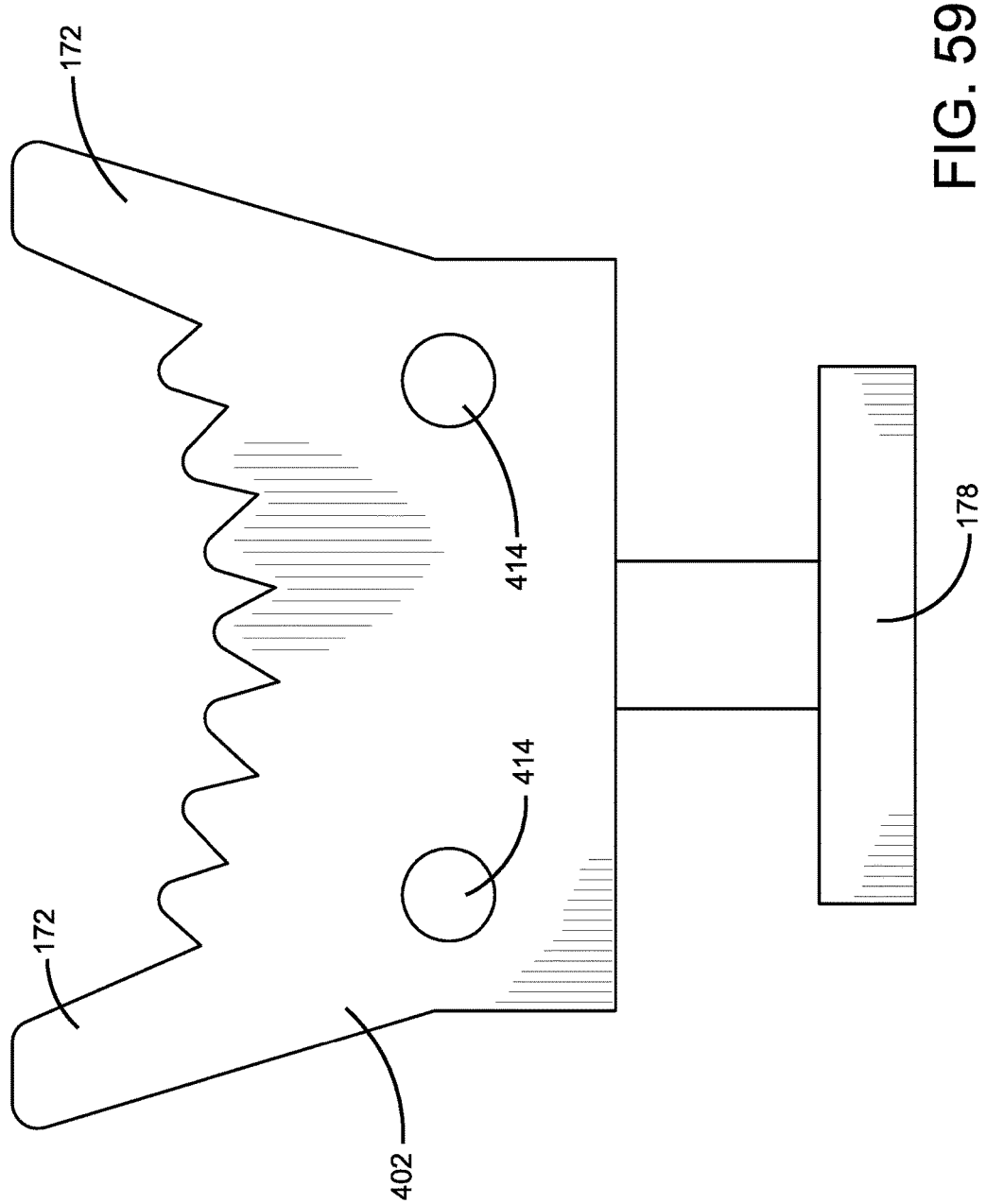
FIG. 59 is a plan view of the bottom plate of the base mounting bracket of FIG. 55.
Figure 60:
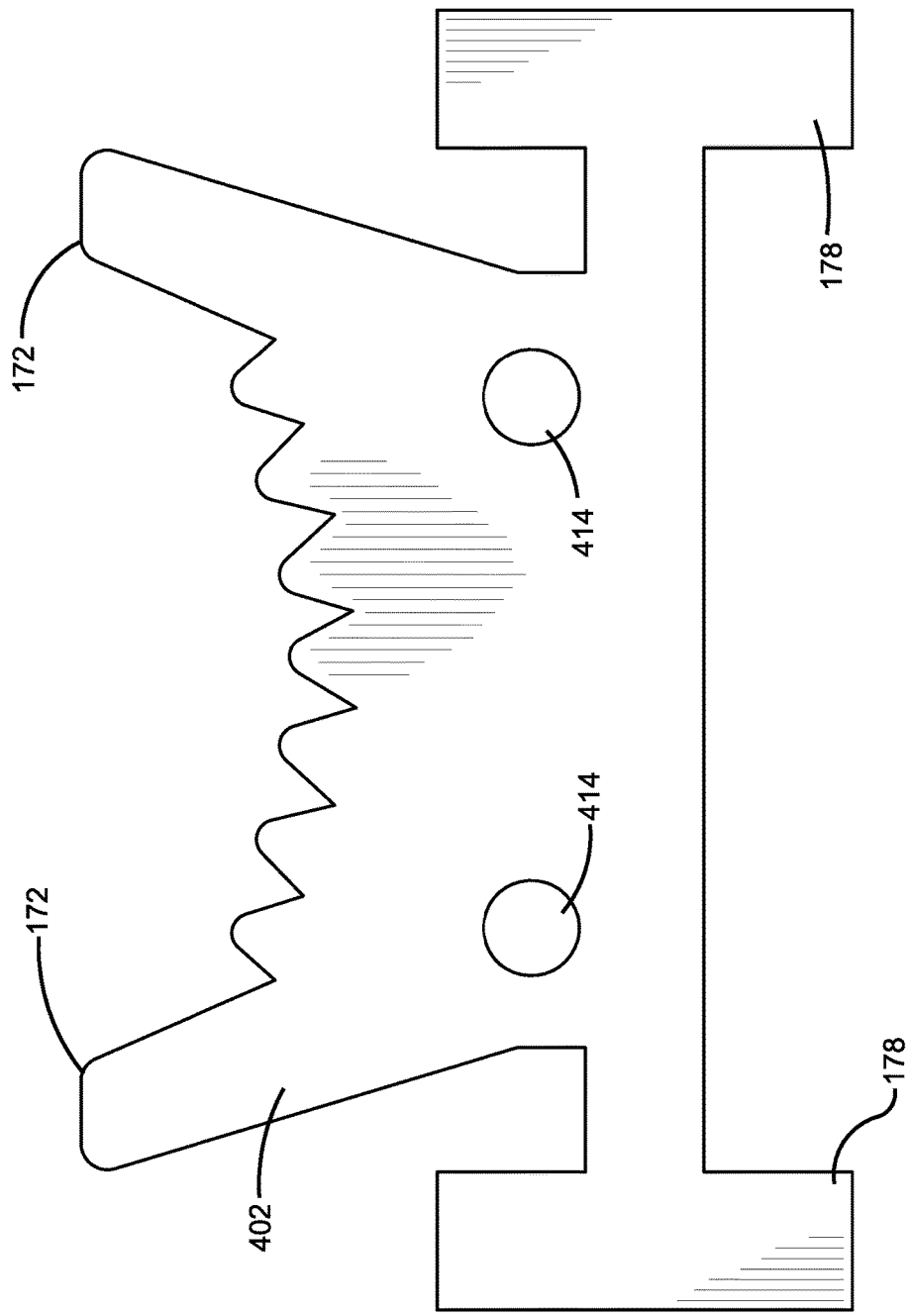
FIG. 60 is a plan view of an alternate bottom plate.
Figure 61:
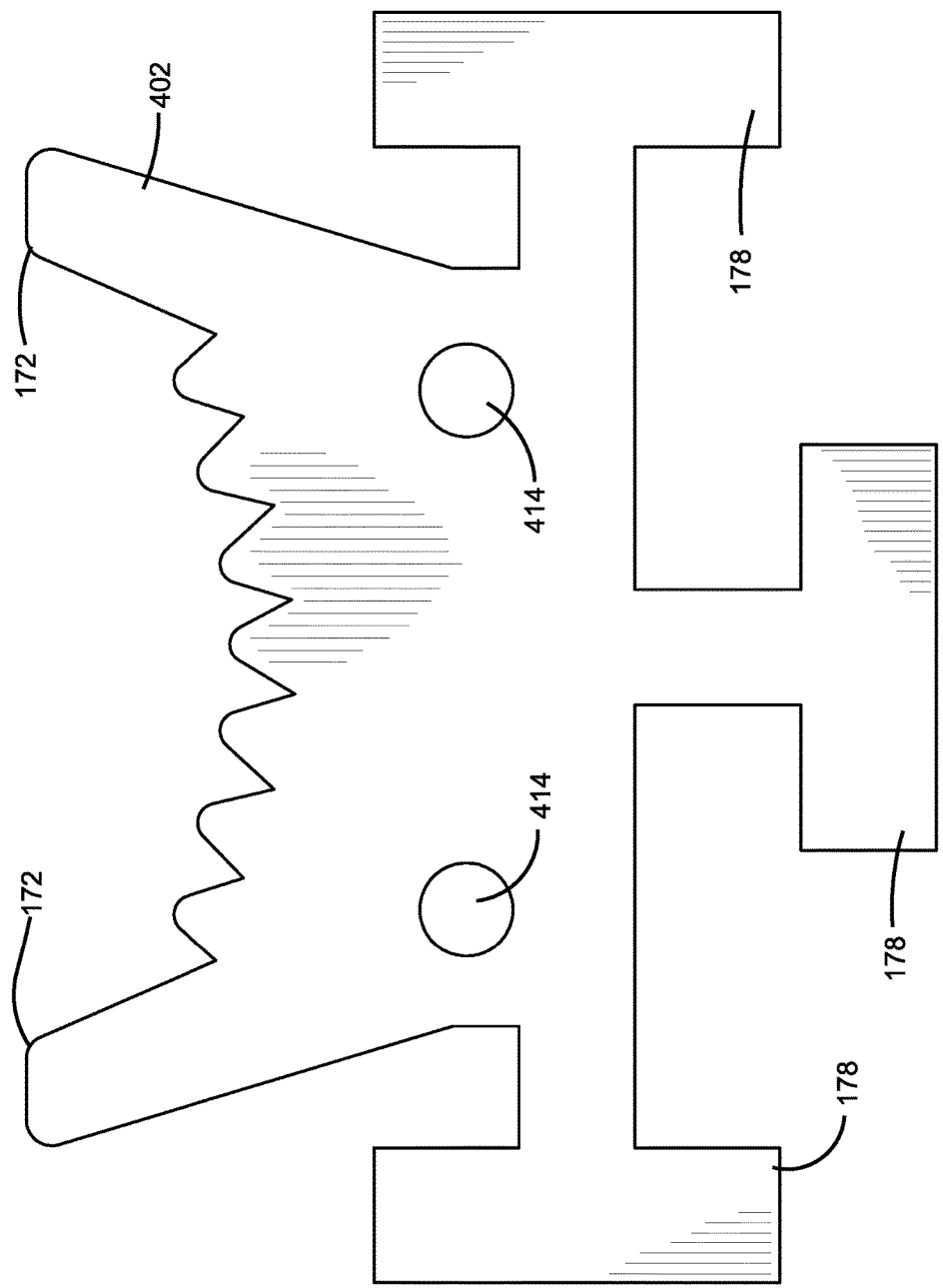
FIG. 61 is a plan view of another alternate bottom plate.

Anchor rod 134 slides down into an opening that complements the size of anchor rod 134 so that there is a sliding and rotating fit between anchor rod 134 and the portion of the ball joint that defines the opening that minimizes wobble. In the exemplary configuration, the wobble is minimized by making the opening slightly larger than the anchor rod. The diameter of opening 132 is 0.813 inches while the diameter of the lower unthreaded portion 302 of anchor rod 134 is 0.625 inches. These dimensions cooperate to allow anchor rod 134 to be mounted quickly and easily with minimal jamming while allowing anchor rod 134 to rotate with respect to the ball joint while also minimizing wobble. The upper threaded portion 304 of anchor rod 134 is stepped down to a 0.500 inch diameter to create a shoulder 306 that abuts the anchor insert 308 that is carried by the inner end 310 of first arm section 312. Upper threaded portion 304 is provided with a thread that matches a threaded opening 314 defined by anchor insert 308 which is aligned with an opening 316 defined by one side of inner end 310 of first arm section 312. As shown in FIG. 46, a flat flange 318 is defined around the mouth of threaded opening 314 so that the shoulder 306 abuts directly against flange 318 and be tightened against anchor insert 308. The flange has an outer diameter of 0.640 inches to receive shoulder 306 having an outer diameter of 0.625. Opening 316 defined by inner end 310 has an outer diameter of 0.641 inches. The threaded connection allows the two items to be disconnected for storage and transport or for when an electronic device is to be mounted directly to anchor rod 134. As an option, a locking device such as a polymer adhesive or a lock washer can be used at this location to secure anchor rod 134 to anchor insert 308.

Anchor insert 308 has a body 320 that defines threaded opening 314. Body 320 also defines an end flange 322 that abuts the end of arm section 312. The outer diameter of end flange 322 is 1.250 inches to match the outer diameter of first arm section 312. Body 320 also defines a plurality of parallel recessed rings 324 help retain anchor insert 308 within first end 310 of first arm section 312. Each of these recessed rings 324 can be filled with an adhesive such as an epoxy to secure anchor insert 308 to the inner surface of a hollow inner end 310 of first arm section 312. Another configuration provides deformable O-rings disposed in recessed rings 324 to define a frictional fit between anchor insert 308 and first arm section 312. In another embodiment, recessed rings 324 remain empty but provide sharp edge that frictionally engage the inner surface of inner end 310 to connect anchor insert 308 to first arm section 312.

In the exemplary configuration, first arm section 312 is hollow and made from carbon fiber. This configuration provides a strong, lightweight arm that can be used in cold weather. In this configuration, first arm section 312 has a length of fourteen to twenty inches and an outer diameter of 1.250 inches. The outer end 330 defines a through hole 332 having a diameter of 0.750 inches. Through hole 332 has an axis parallel to the axis of opening 316. Outer end 330 receives three elements 340, 350, and 352 to define a receptacle that receives the lower end of a joint pin 334 that supports the second arm section 336. When assembled, joint pin 334 is substantially parallel to anchor rod 134.

A joint insert 340 having a structure similar to anchor insert 308 is fit into the open second end 330 of first arm section 312. Joint insert 340 includes a body 320 defining flange 322 and recessed rings 324. Joint insert 340 defines an unthreaded through hole 342 that receives upper and lower bushing inserts 350 and 352 which are disposed through hole 332 defined by outer end 330. Upper and lower bushing inserts 350 and 352 are made from a polymer. Each bushing insert 350 and 352 defines a collar 354 that has a curved abutment surface that substantially matches and engages the outer surface of outer end 330. Each bushing insert 350 and 352 has a body that extends into outer end 330 with the body of each defining a through hole 356 that receives the lower portion of joint pin 334. When bushing inserts 350 and 352 are installed through outer end 330 and into joint insert 340, through holes 356 are aligned and can receive the lower portion of joint pin 334. Bushing inserts 350 and 352 can be made from plastic.

Joint pin 334 defines a lower portion 360 and an upper portion 362. Lower portion 362 has a threaded end portion 364 that can receive a nut 366 (see FIG. 44). Lower portion 362 has an outer diameter the same as or slightly smaller than the diameter of through holes 356 so there is a tight fit at this joint. Bushing inserts 350 and 352 are compliant enough to allow lower portion 360 to rotate when arm 104 is adjusted. A washer can be used between nut 366 and bushing 352.

Upper portion 362 is threaded so that it threadably engages the threaded opening 314 defined by another anchor insert 308 that is carried by the inner end 370 of second arm section 336. Upper portion 362 has the same diameter and thread configuration as the upper threaded portion 304 of anchor rod 134.

The outer end 372 of second arm section 336 defines an opening 374 disposed on the opposite side of second arm section 336 as the one that receives upper portion 362. A sleeve insert 380 is disposed in second end 372 with a threaded opening 382 of sleeve insert 380 being aligned with opening 374. Sleeve insert 380 includes flange 322 and recessed rings 324 as described above. Threaded opening 382 threadably receives a threaded sleeve 390 which includes a lower portion 392 having outer threads that engage the threads that define opening 382. Threaded sleeve defines a shoulder 394 and a stepped threaded bore 396. Sleeve 390 can receive a variety of mounts for electronic devices. When assembled in the configuration depicted in FIG. 25, arm 104 provides a light-weight, strong adjustable arm for a device mount 104. The joint configurations are easy to assemble without welding and can allow the device to be shipped in a disassembled state or partially disassembled with the end user completing the assembly.

Figure 62:
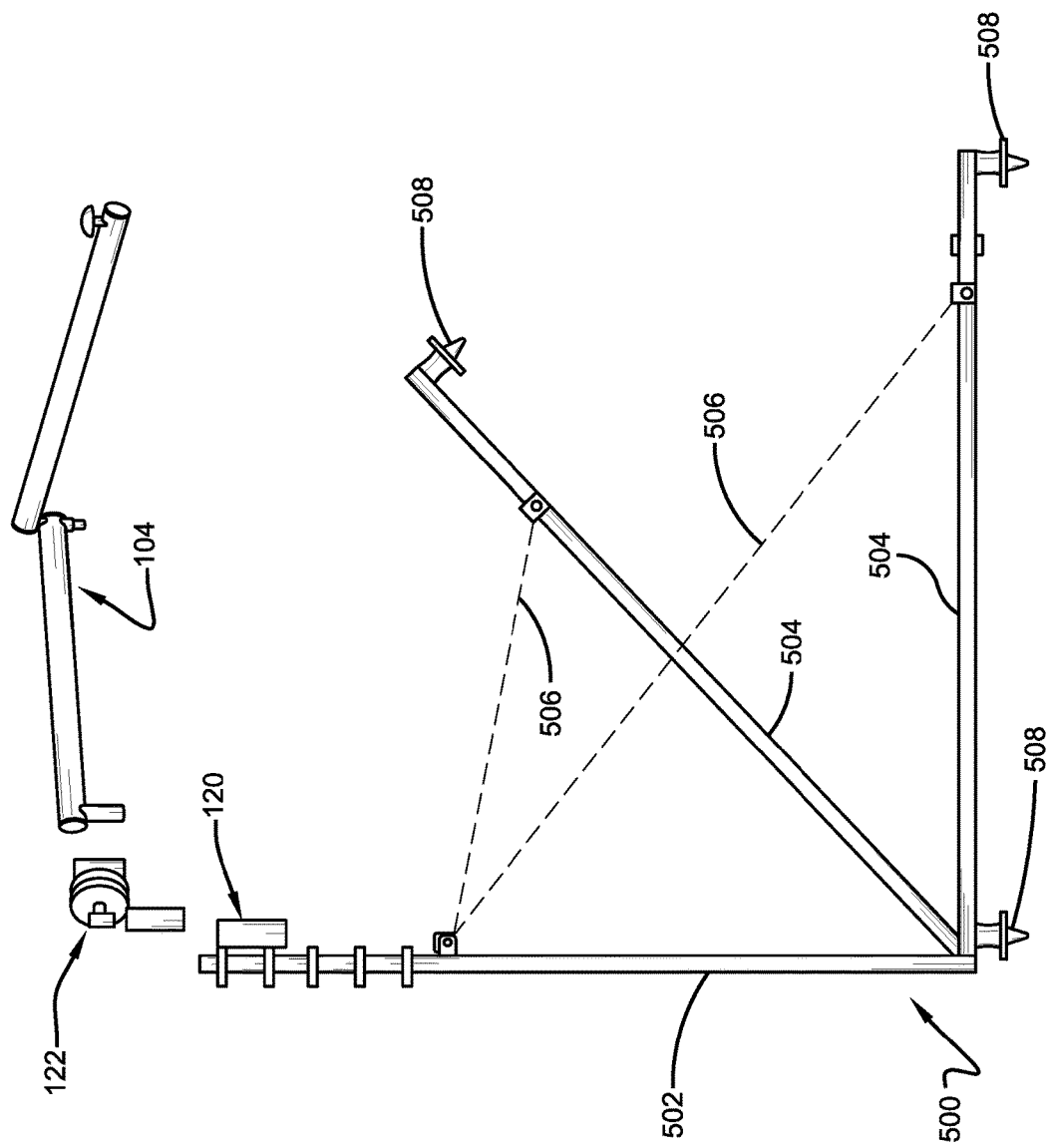
FIG. 62 is perspective view of a floor or ground mount.
Figure 63:
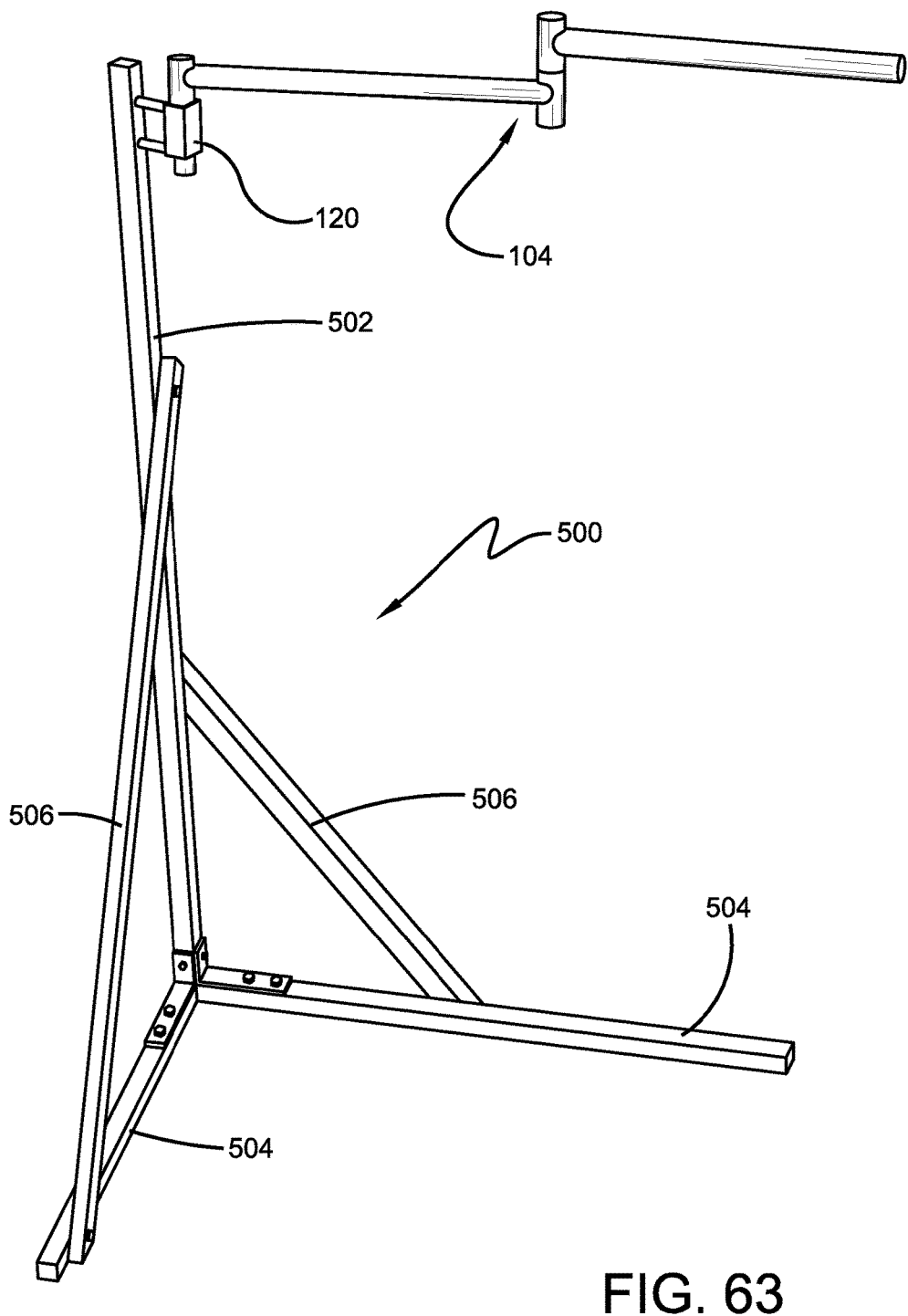
FIG. 63 is a photo of an exemplary floor or ground mount.
Figure 64:
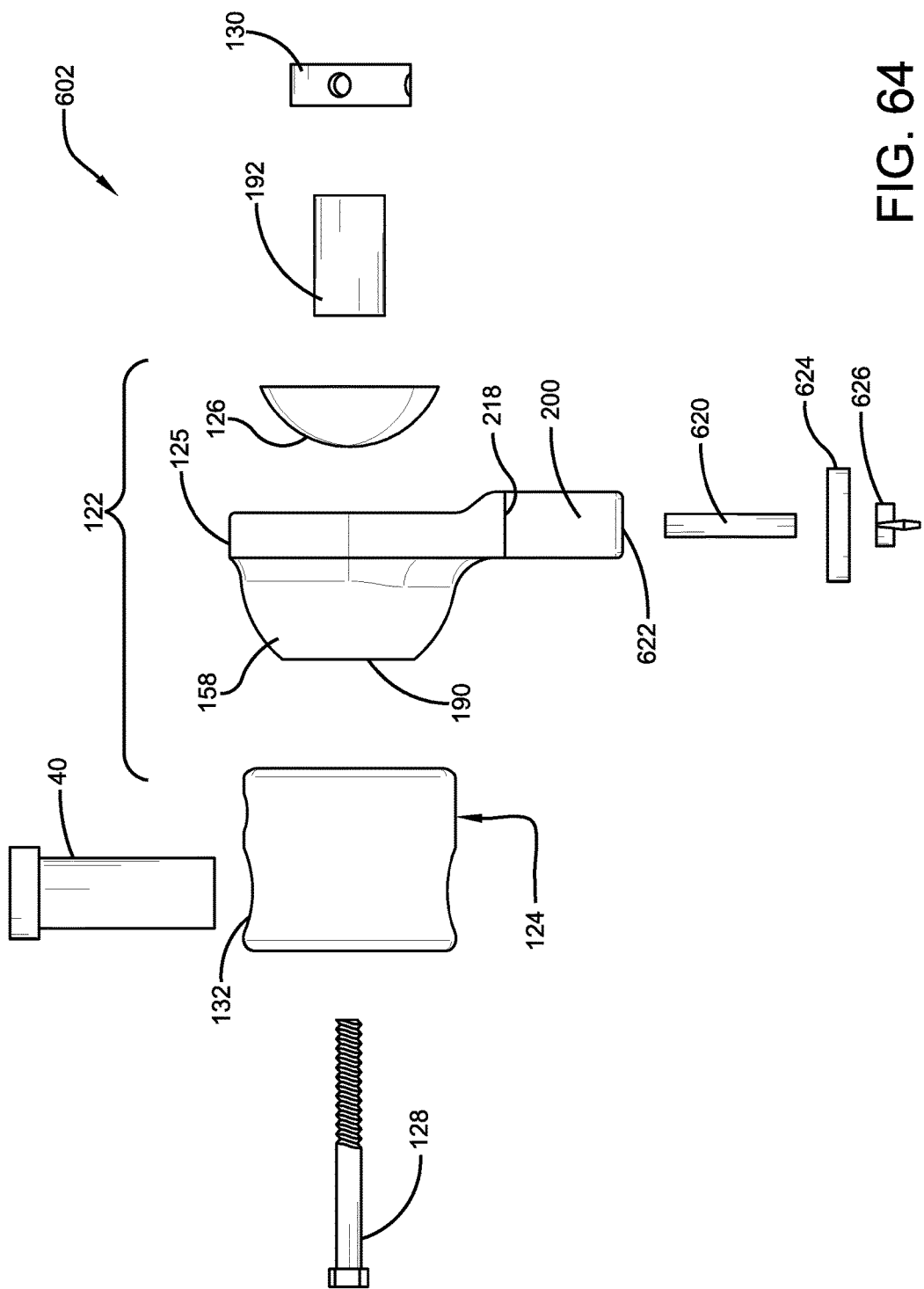
FIG. 64 is an exploded view of the third configuration of the adjustable utility mount.
Figure 65:
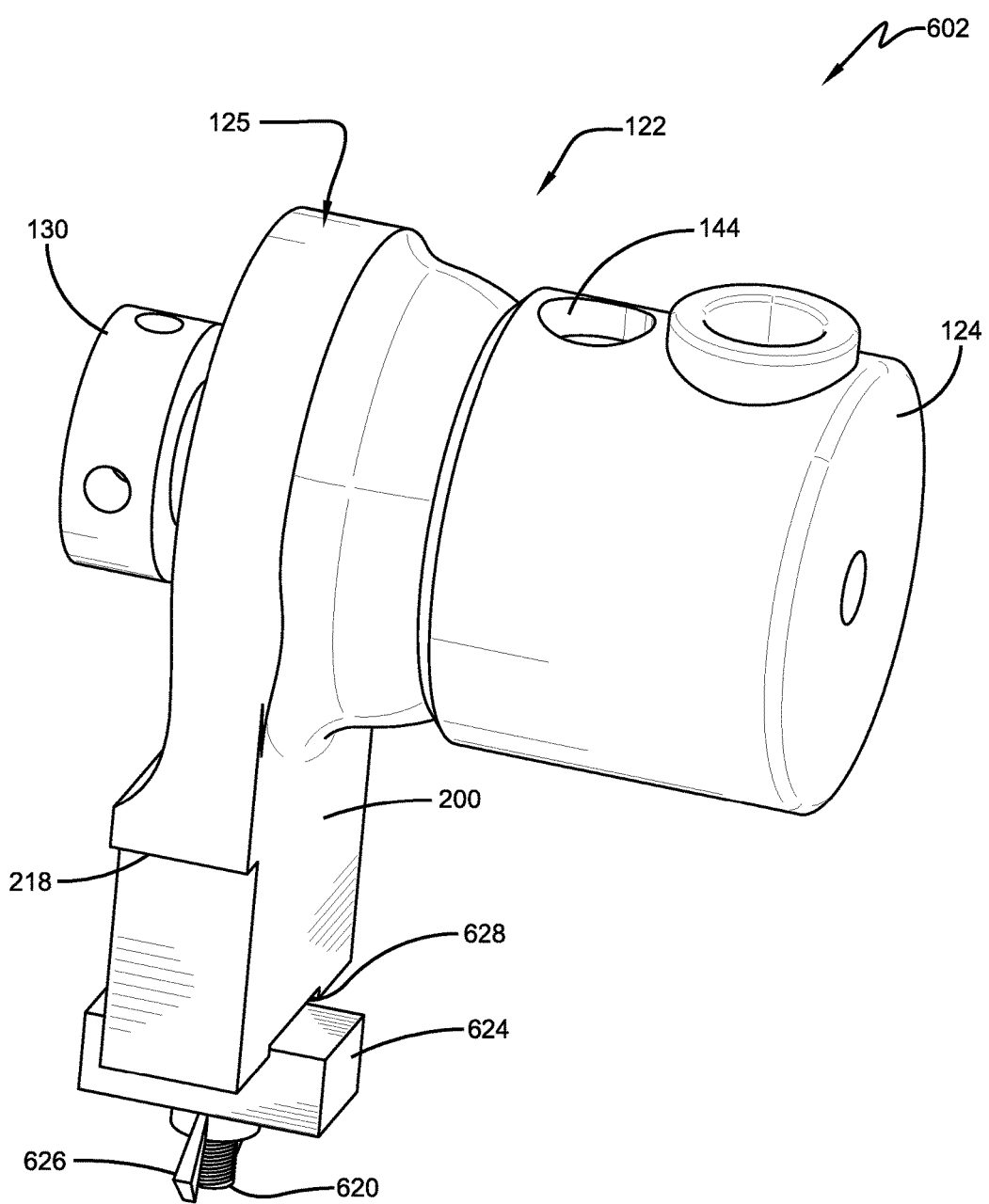
FIG. 65 is a perspective view of a third configuration of the adjustable utility mount.

FIGS. 62-63 depict a floor or ground stand 500 that can be used to mount electronic devices such as cameras. In the embodiment depicted in the drawings, a base mounting bracket 120 is carried near the top of stand 500 so that ball joint 122 and arm 104 can be mounted to stand 500. Stand 500 provides a plurality of mounting locations at different heights for a base mounting bracket 120.

Stand 500 includes a vertical support 502, a pair of legs 504, and angled braces 506 (shown schematically in dashed lines) that form triangular support configurations to hold the position of vertical support 502 upright with respect to legs 504. Braces 506 can be locked in place with pins, bolts, or latches. Each of these items can be provided in a telescoping configuration to allow the length of each to be adjusted as needed. Legs 504 can pivot with respect to vertical support 502 so stand 500 can be collapsed for transport. Locks, latches, or straps can be used to hold stand 500 with legs 504 against vertical support 502. When set up for use, legs 504 can be disposed ninety degrees with respect to each other and about ninety degrees to vertical support 502 which allows stand 500 to be placed at the corner (inner or outer) of a blind where it is out of the way of the hunter. Only arm 104 extends out from or into the corner. This allows a camera to be mounted for hands free operation in a desirable location inside or outside a blind without taking up the floor space required by a tripod. Feet 508 can be provided to allow stand 500 to be driven into the earth or as height adjustments for placing legs 504 on uneven ground.

Figure 66:
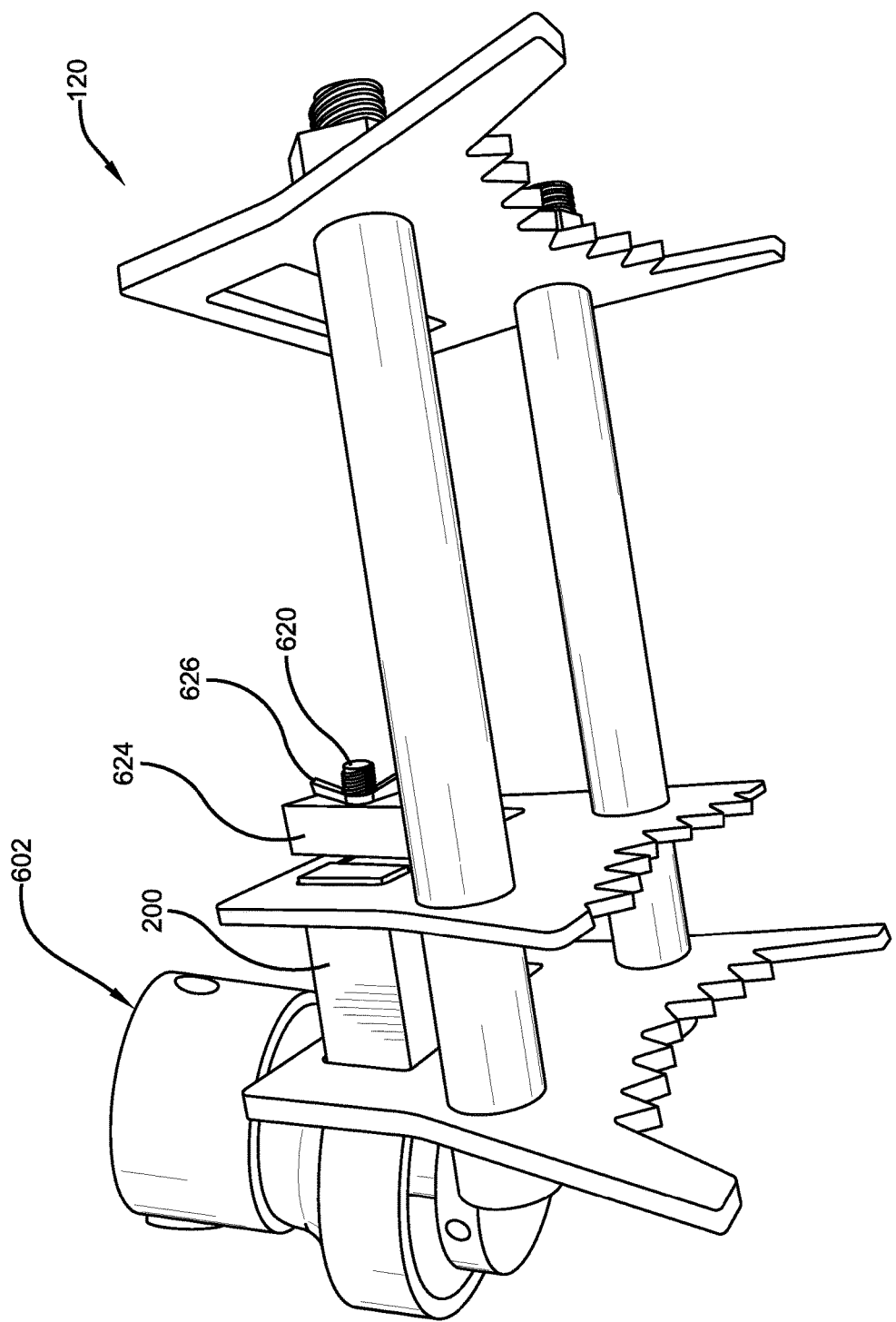
FIG. 66 is a perspective view of the third configuration of the adjustable utility mount secured to the base mounting bracket of FIG. 55.

FIGS. 64-67 depict a third exemplary configuration for the adjustable utility mount which is indicated generally by the reference numeral 602. Adjustable mount 602 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 602. Adjustable utility mount 602 can also be used to support camouflage, used as a gun rest, used as a bow rest, or to support other gear. Adjustable utility mount 602 has some elements that are the same as or substantially similar to the second configuration and the same reference numbers are used to identify these elements. Adjustable utility mount 602 is used, for example, with a base mounting bracket 120 as shown in FIG. 66 or a mount 604 that can be mounted to a flat surface. Adjustable utility mount 602 includes a ball joint 122 having an outer portion 124, a center portion or ball joint cup 125, and an inner portion 126. A clamping bolt 128 extends through outer portion 124, center portion 125, and inner portion 126 and threadedly engages a handle 130 that is used to tighten ball joint 122 to a clamped configuration. An option includes an inner ball joint portion that integrally includes the handle. The adjustability of the ball joint 122 allows base mounting bracket 120 to be mounted to a tree trunk or tree branch or other member that is disposed at essentially any angle and orientation to level because the combination of the ball joint 122 and the manner in mounting base mounting bracket 120 provides a large degree of adjustability for the electronic device 10 that is being carried by mount 102.

In this third exemplary configuration of utility mount 602, outer portion 124 of the ball joint 122 defines an opening 132 configured to directly receive anchor rod 134 of device mount 104 in a sliding and rotating configuration. Alternatively, outer portion 124 can be configured to receive insert 40 described above or an insert 40 that is free of the locking feet. A bubble level 142 can be carried in a recess 144 defined by outer portion 124 to allow the user to determine the position of outer portion 124 with respect to level.

As described above, ball joint 122 of utility mount 602 includes center portion 125 that defines a ball joint cup 158. Ball joint cup 158 has an inner surface that matches the rounded front surface of inner portion 126 of the ball joint. Ball joint cup 158 has an outer surface that matches the inner curved surface of outer portion 124 of the ball joint 122. Ball joint cup 158 defines a large opening 190 that allows clamping bolt 128 and ball joint portions 124 and 126 to be adjusted as defined above.

Inner portion 126 of the ball joint 122 includes a stem 192 that receives handle 130. In the configuration of utility mount 602, stem 192 is a separable from inner portion 126. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the ball joint. The end of stem 192 abuts washer 154 within handle 130. Stem 192 defines a recess 194 that can receive a ridge 96 (as with the first configuration) on handle 130 so that handle 130 can fully rotate about stem 192.

Center portion 125 includes neck 200 that extends down away from ball joint cup 158 to allow center portion to be removably and replaceably (selectively) mounted to base mounting bracket 120 by being received in openings 202. To mount center portion 125, neck 200 is slid down through aligned, spaced openings 202 defined by base mounting bracket 120. Neck 200 can be configured to frictionally engage bracket 120 or be loosely disposed in openings 202 until a clamp is tightened. In this configuration, neck 200 defines shoulders 218 on opposite sides sized to engage bracket 120 to stop neck 200 from moving through openings 202. A threaded rod 620 extends down from the lower end 622 of neck 200. Shoulders 218 position lower end 622 even with or just below the lower surface of intermediate plate 404 in the exemplary configuration (or a lower plate in the configuration of FIG. 67). A clamping block 624 is slidably carried on threaded rod 620 and is pushed up against mounting bracket 120 with a nut 626 such as the wingnut depicted in the drawings. Tightening nut 626 clamps a portion of bracket 120 between neck 200 and clamping block 624 to secure utility mount 602 in place. Lower end wall 622 defines a notch 628 that receives clamping block 624 as shown in FIG. 66 to allow clamping block 624 to engage mounting bracket 120 instead of being clamped against neck 200. Notch 628 has a width that is larger than the width of clamping block 624 and notch 628 extends entirely from front to back of neck 200 with clamping block 624 having a length longer than the thickness of neck 200.

Figure 67:
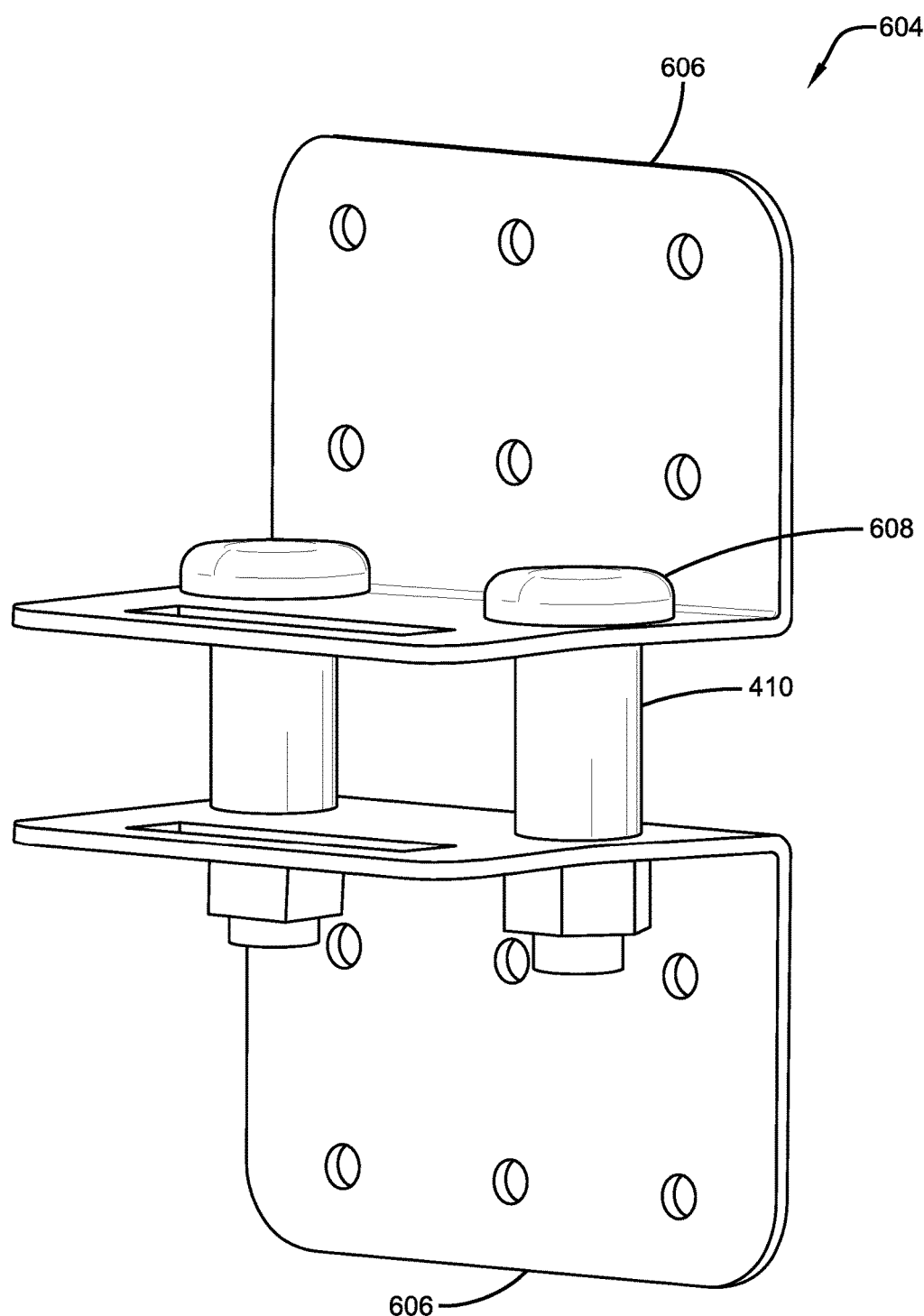
FIG. 67 is a perspective view of an alternate base mounting bracket.
Figure 68:
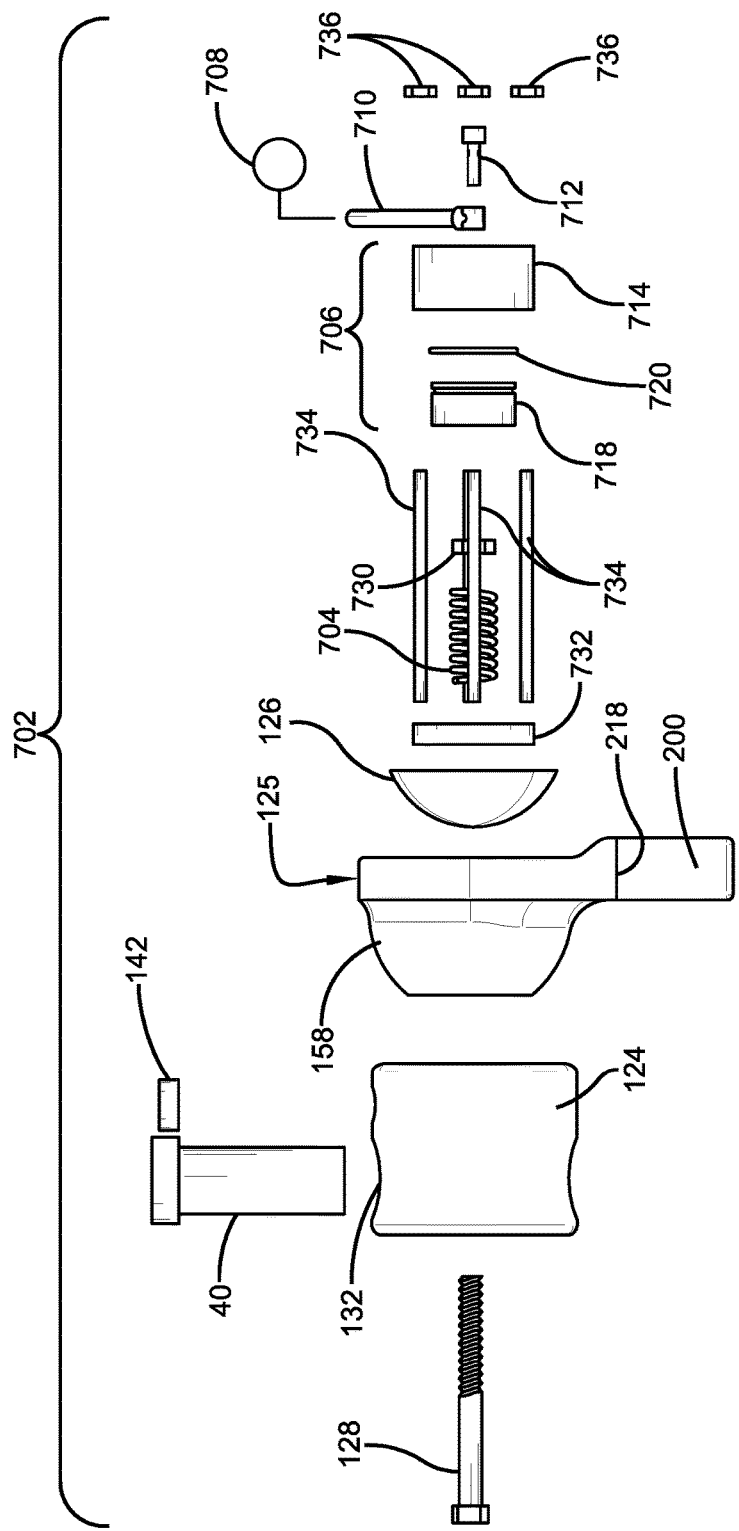
FIG. 68 is an exploded view of the fourth configuration of the adjustable utility mount.
Figure 69:
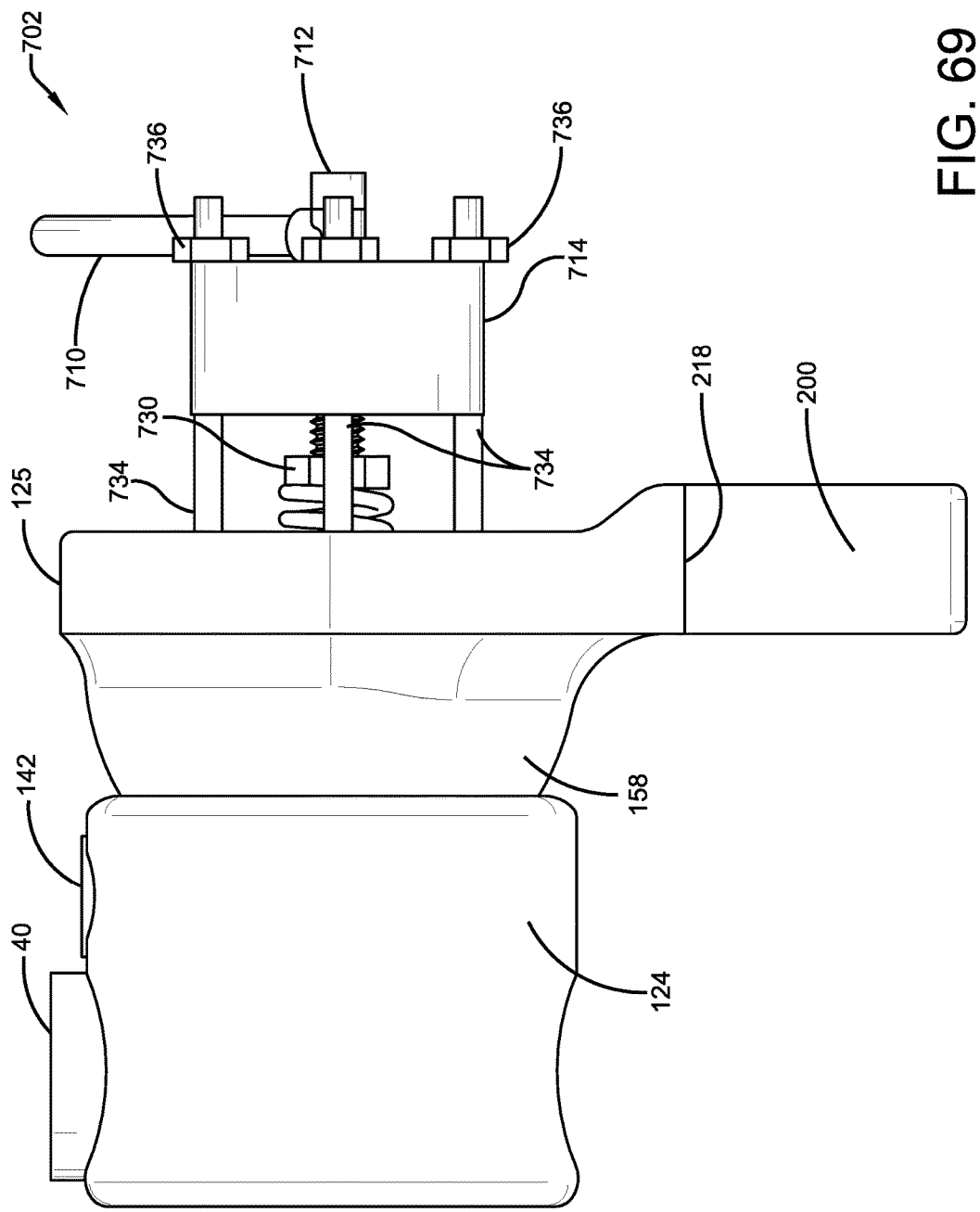
FIG. 69 is a side view of the fourth configuration of the adjustable utility mount.
Figure 70:
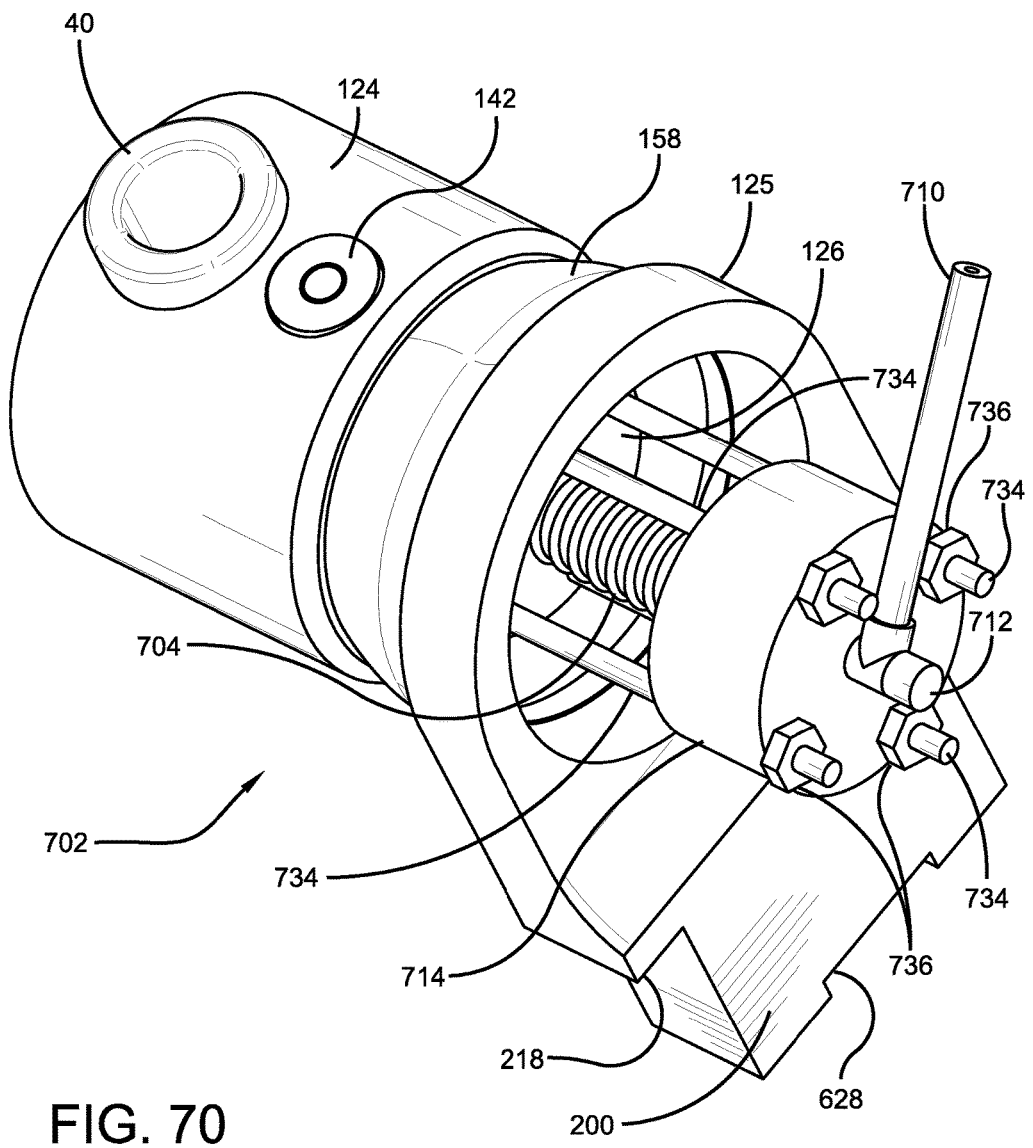
FIG. 70 is a rear perspective view of the fourth configuration of the adjustable utility mount.
Figure 71:
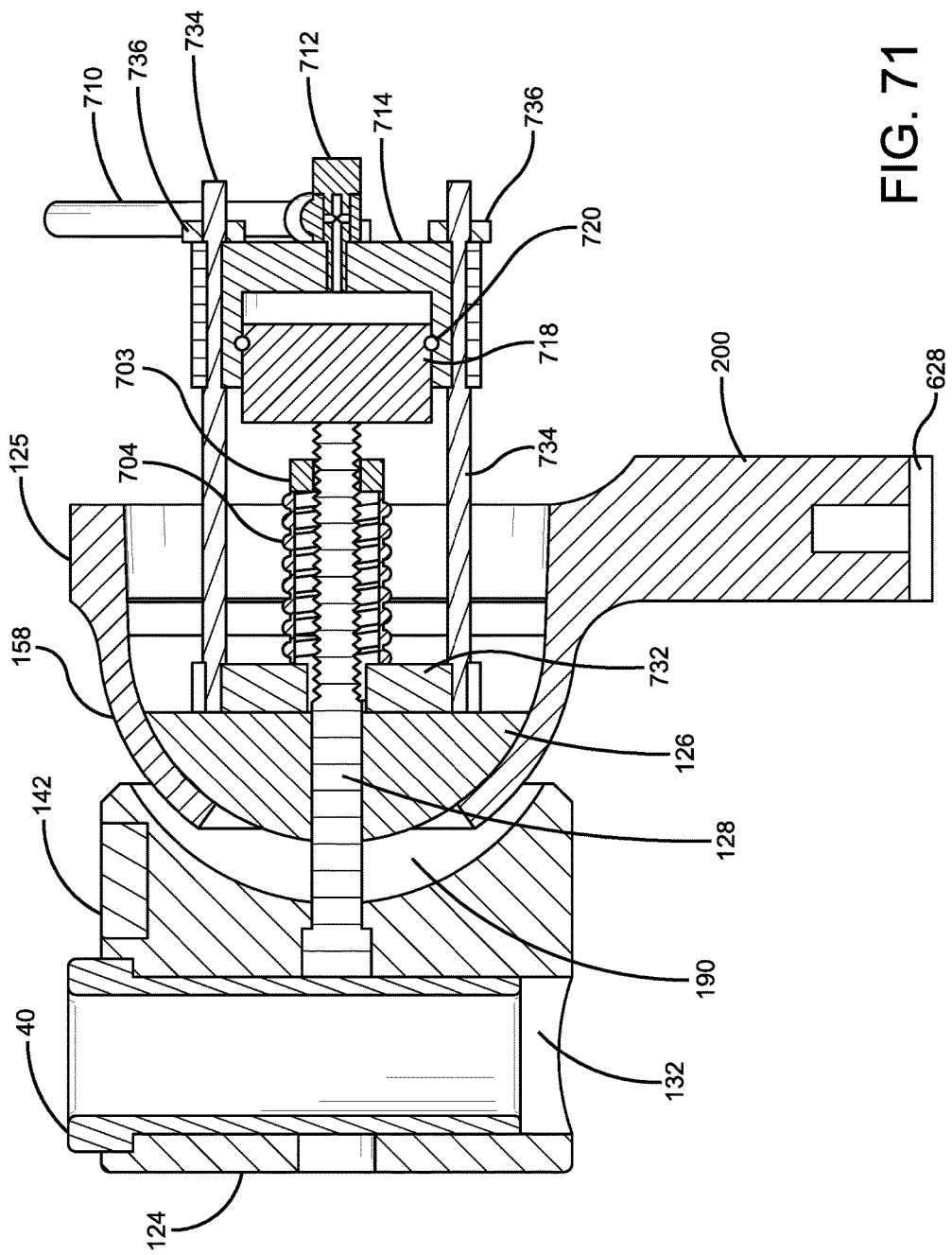
FIG. 71 is a section view of the fourth configuration in an unclamped configuration.

Neck 200 with shoulders 218 functions the same way with mounting bracket 604 shown in FIG. 67. Bracket 604 is configured to be mounted directly to a flat surface with fasteners such as screws. The surface could be the wall of the 2×4 lumber member. Bracket 604 includes two right-angled mounts 606 that each define an opening 202 that are aligned to receive neck 200. Bodies 606 are connected with bolt 608 and tube 410 configurations with tube 410 being based on the length of neck 200 under should 218.

This configuration allows utility mount 602 to be readily mounted to bracket 120 in a quick and quiet manner. Tightening nut 626 can be performed quickly and quietly to secure utility mount 602 in place.

Figure 72:
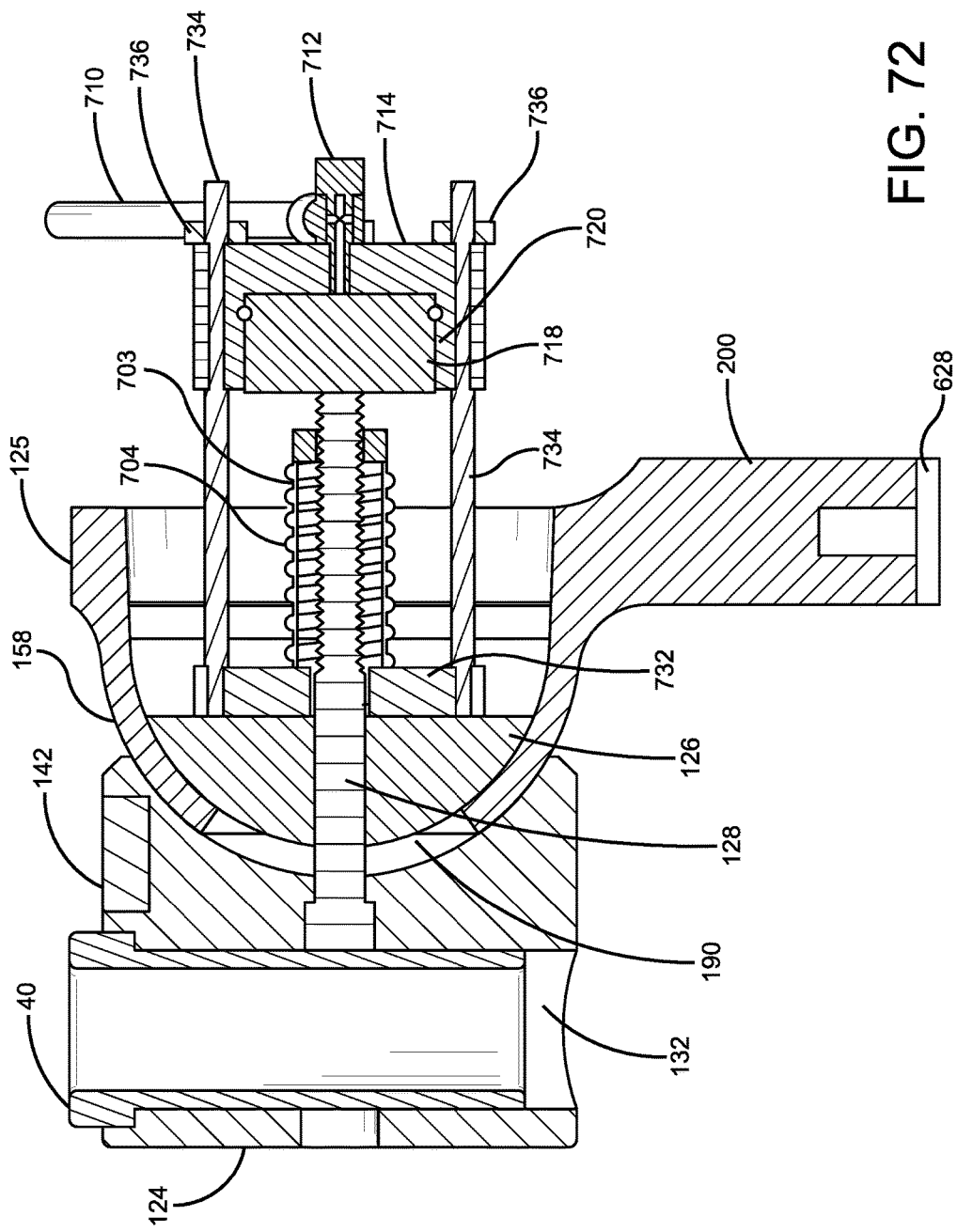
FIG. 72 is a section view of the fourth configuration in a clamped configuration.
Figure 73:
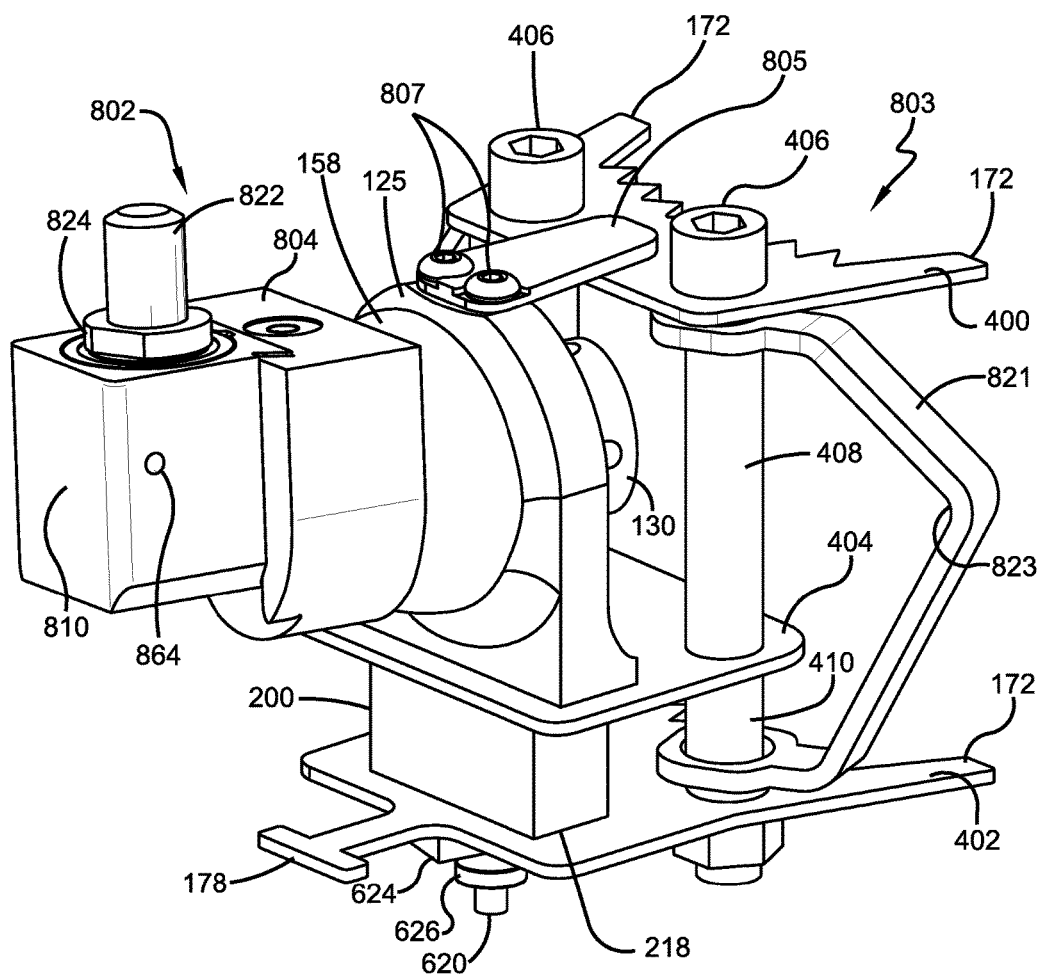
FIG. 73 is a perspective view of a fifth configuration of the adjustable utility mount secured to a modified base bracket based on the base mounting bracket of FIG. 55.
Figure 74:
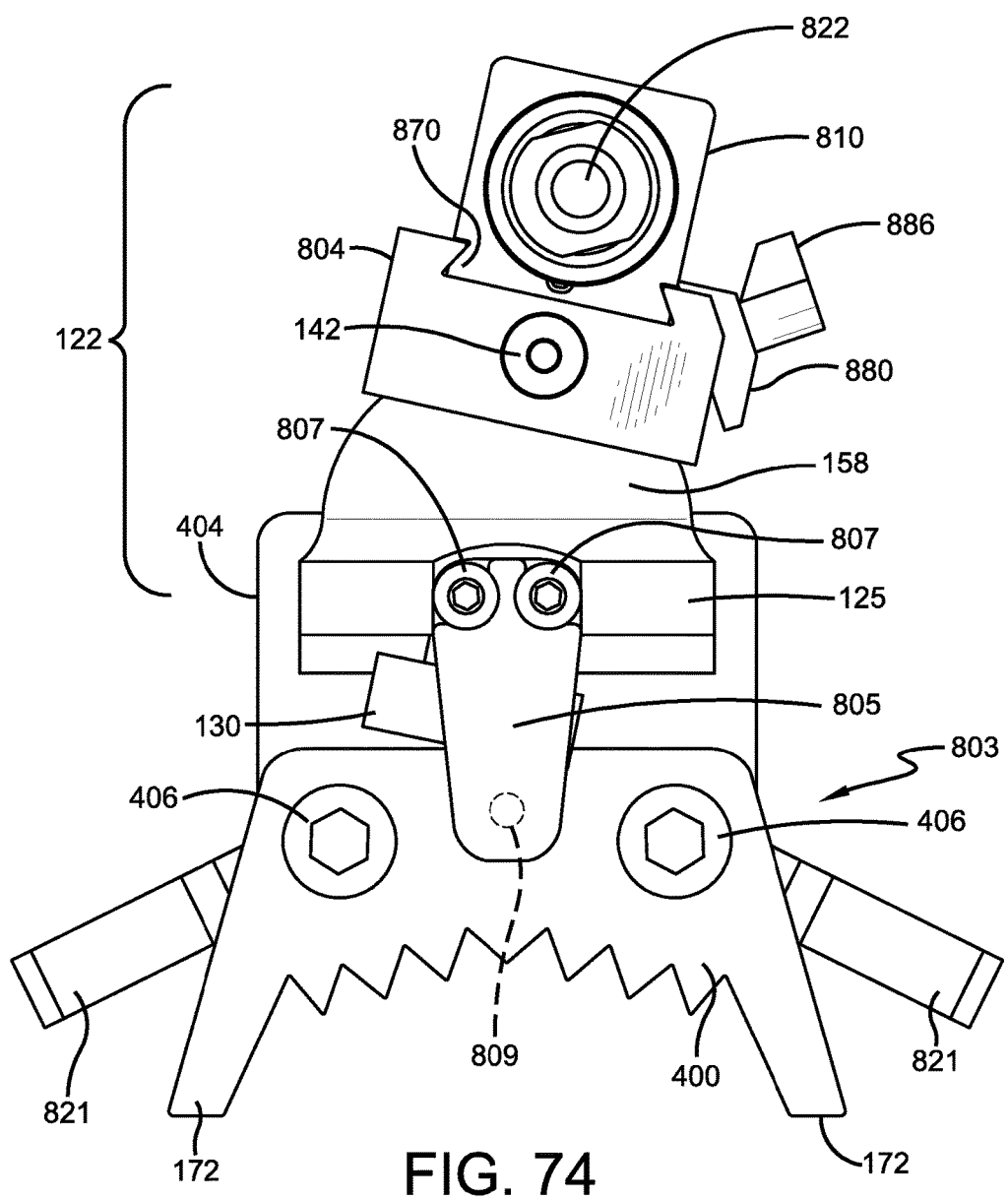
FIG. 74 is a top plan view of the utility mount of FIG. 73.
Figure 75:
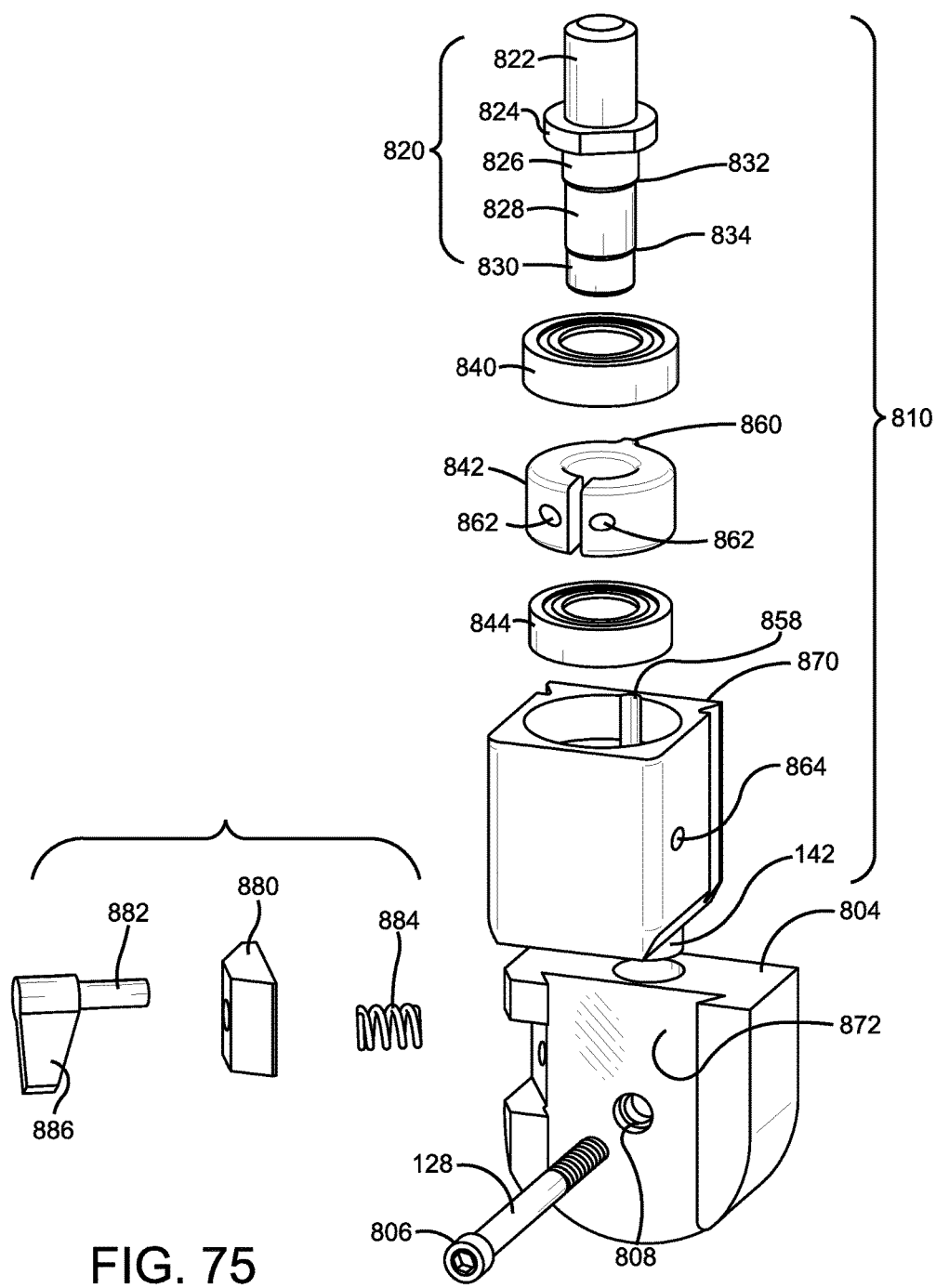
FIG. 75 is an exploded view of the outer portion and bearing block assembly elements of the utility mount of FIG. 73.
Figure 76:
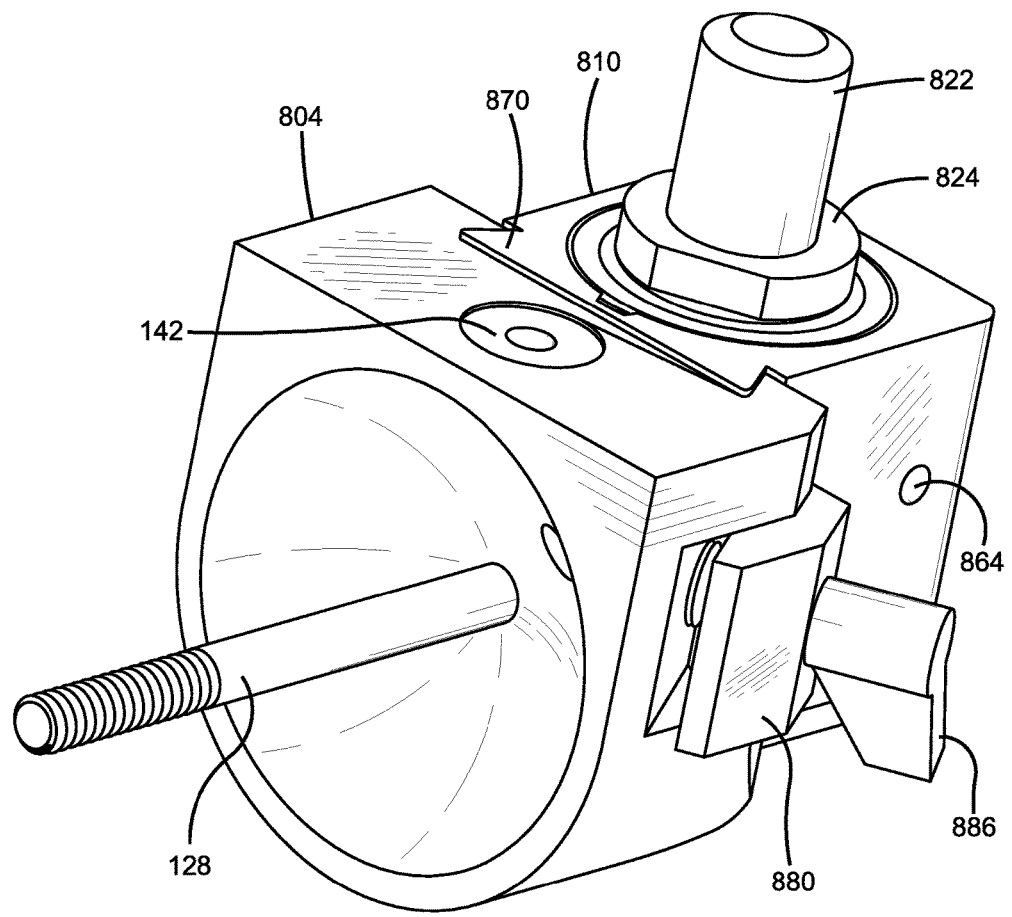
FIG. 76 is a perspective view of the assembled outer portion and bearing block assembly elements.
Figure 77:
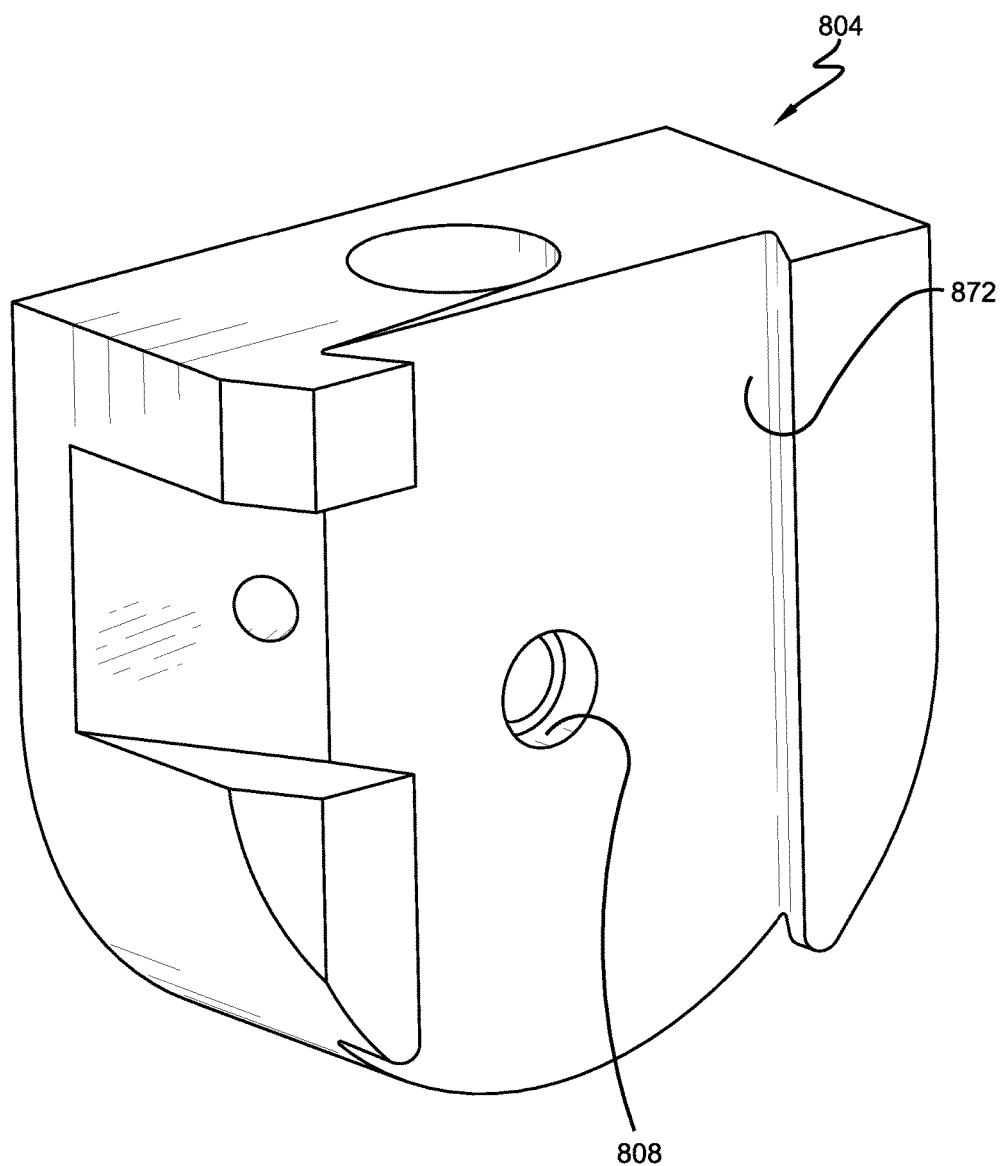
FIG. 77 is a perspective view of the outer portion.

The fourth configuration of the utility mount is indicated generally by the reference numeral 702 in FIGS. 68-72. The fourth configuration uses a spring 704 to provide the clamping force that holds outer portion 124 of the ball joint in place against center portion 125. In this condition, the clamp member is in a clamped condition. A piston cylinder unit 706 is used to compress spring 704 to allow the user to adjust the position of outer portion 124. When piston cylinder unit 706 compresses spring 704, then outer portion then the clamp member is in the unclamped condition. Unit 706 can be pneumatic or hydraulic. A pump such as a hand-held squeeze bulb 708 or a small electric pump is used to force the fluid through an inlet tube 710 into an adapter 712 which delivers the fluid through the end of cylinder 714 into a fluid chamber defined between a piston 718 and the inside of cylinder 714. A seal 720 is used to seal this chamber. Forcing the fluid into the chamber moves piston to the left in FIG. 71 to compress spring 704 to allow the position of outer portion 124 to be adjusted. When the pressure on the fluid is released, spring 704 forces piston 718 back to the closed position as shown in FIG. 72.

Piston 718 moves bolt 128 on which a nut 730 is carried and threadedly engages. When piston 718 moves, bolt 128 and nut 730 move to compress spring 704. Spring 704 is disposed around bolt 128 and is trapped between nut 730 and a spacer 732 which is connected to inner portion 126 with fasteners or connectors or is integrally formed with inner portion 126. Cylinder 714 is supported on threaded rods 734 which are threaded into spacer 732. Cylinder 714 can slide over rods 734 and be held on rods 734 with nuts 736.

FIGS. 73-81 depict a fifth exemplary configuration for the adjustable utility mount which is indicated generally by the reference numeral 802. Adjustable mount 802 is used with a device mount 104 (see, for example, FIG. 25) such as an articulating arm 106, a clamp-style holder (or combination of both), a unitary device holding stick, or a unitary arm. These devices can be configuration to hold a device 10 such as a camera, a motion detector, or a light that is being mounted with adjustable utility mount 802. Adjustable utility mount 802 can also be used to support camouflage, used as a gun rest, used as a bow rest, or to support other gear. The exemplary configuration of adjustable utility mount 802 has some elements that are the same as or substantially similar to the third configuration and the same reference numbers are used to identify these elements. Adjustable utility mount 802 is used, for example, with base mounting bracket 20, base mounting bracket 120 as shown in FIG. 66, a mount 604 (FIG. 67) that can be mounted to a flat surface, or the alternate configuration 803 of base mounting bracket depicted in FIGS. 73-74.

Adjustable utility mount 802 includes a ball joint 122 having an outer portion 804, a center portion 125 that defines ball joint cup 158, and an inner portion 126. A clamping bolt 128 extends through outer portion 804, center portion 125, and inner portion 126 and threadedly engages a handle 130 that is used to tighten ball joint 122 to a clamped configuration. An option includes an inner ball joint portion 126 that integrally includes handle 130. The adjustability of the ball joint 122 allows base mounting bracket 120, 604, or 803 to be mounted to a tree trunk or tree branch or other member that is disposed at essentially any angle and orientation to level because the combination of the ball joint 122 and the manner in mounting base mounting bracket 120, 604, or 803 provides a large degree of adjustability for the electronic device 10 that is being carried by mount 802.

Figure 78:
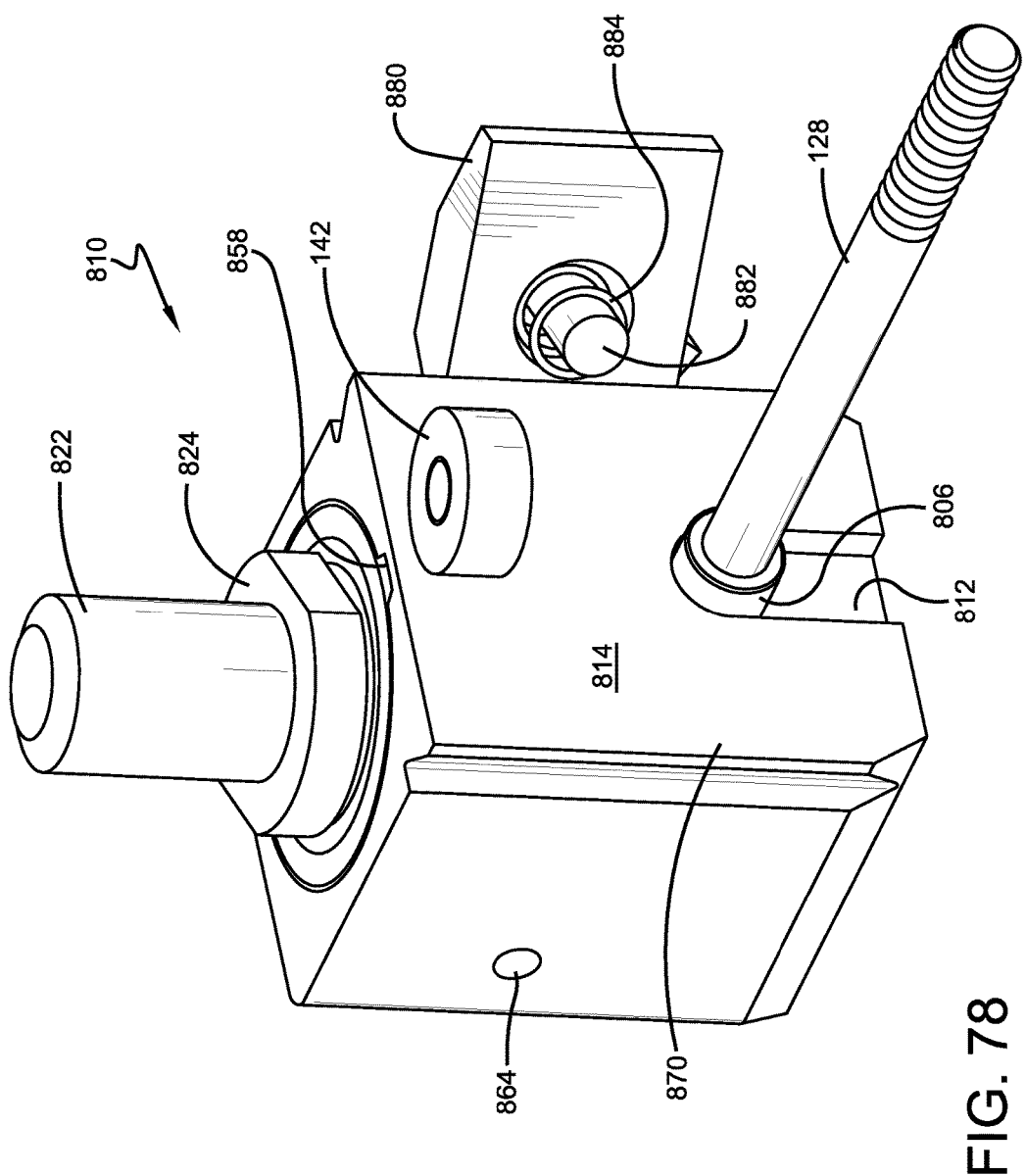
FIG. 78 is a perspective view of the bearing block assembly with the outer portion removed to show the bolt head disposed in the slot.
Figure 79:
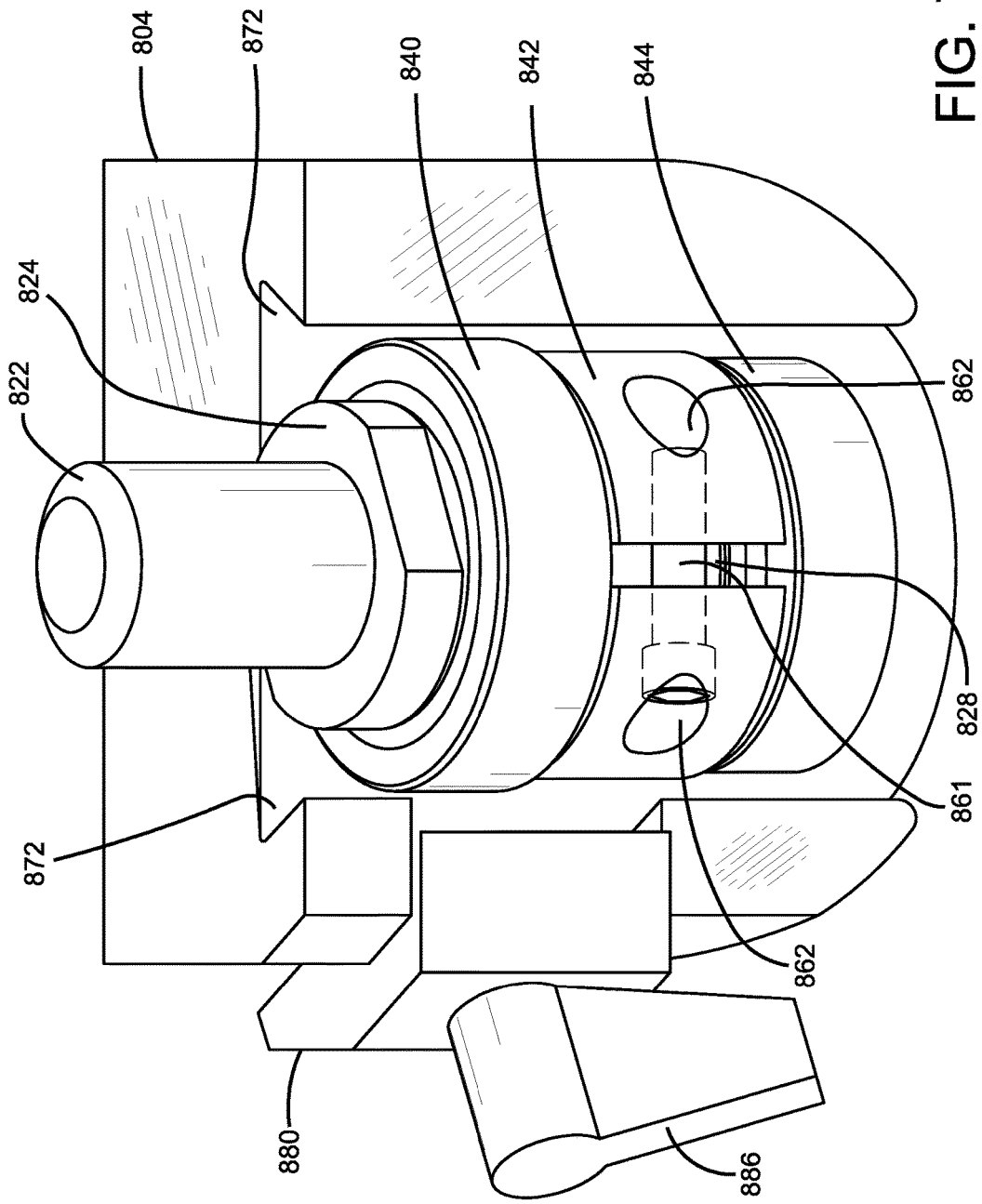
FIG. 79 is a perspective view of outer portion with the down post, ball bearing rings, and brake with the body of the bearing block assembly removed.
Figure 80:
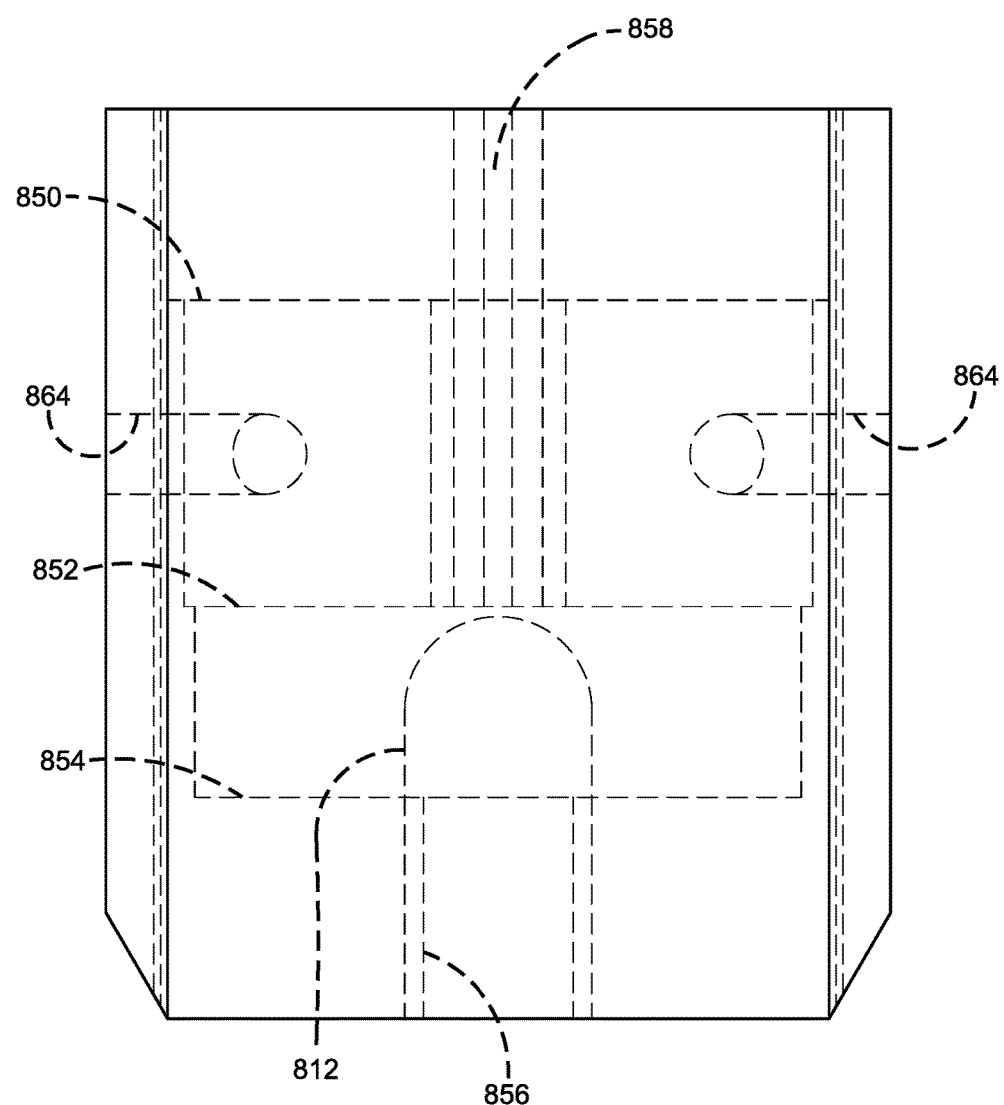
FIG. 80 is a front elevation of the body of the bearing block assembly.

In this configuration, clamping bolt 128 includes a bolt head 806 that is at least partially disposed outside of a bolt head cavity 808 defined by outer portion 804 to function as a stop for a bearing block assembly 810 which slides down onto outer portion 804 to connect device mount 104 to adjustable utility mount 802. A separate stop can be used that projects from outer portion 804 with bolt head 806 being disposed entirely within cavity 808. This engagement is depicted in FIG. 78 with outer portion 804 removed from view to depict bolt head 806 of clamping bolt 128 abutting the end of a slot 812 defined by the inner wall 814 of the body of bearing block assembly 810. About half of bolt head 806 is disposed in bolt head cavity 808 to provide friction between clamping bolt 128 and outer portion 804 when handle 130 is turned to tighten clamping bolt 128. Bolt head 806 defines a wrench opening at its end surface to allow clamping bolt 128 to be tightened when bearing block assembly is removed.

In this fifth exemplary configuration of utility mount 802, outer portion 804 of the ball joint 122 selectively carries bearing block assembly 810. Bearing block assembly 810 carries a down post 820 which has an upper portion 822 that projects out from the body of bearing block assembly 810 to engage a device that is being mounted to utility mount 802. Down post 820 can be configured to freely rotate about its longitudinal axis with respect to the body of bearing block assembly 810. It can also be locked or frictionally slowed by applying a brake as described below. Upper portion 822 of down post 820 can function as anchor rod 134 as described above which is inserted into anchor insert 308. Down post 820 includes a flange 824 and a lower portion which includes an upper bearing surface 826, a brake surface 828, and a lower bearing surface 830. Down post 820 has a larger diameter at surface 826 than at surface 828 and a larger diameter at surface 828 than at surface 830 to define upper 832 and lower 834 shoulders.

In other configurations, bearing block assembly 810 is provided without down post 820 and anchor rods 134 are provided that include flange 824 and surfaces 826, 828, and 830 to function with bearing block assembly 810. Alternatively, outer portion 804 can be configured to receive insert 40 described above or an insert 40 that is free of the locking feet. A bubble level 142 can be carried by outer portion 804 to allow the user to determine the position of outer portion 804 with respect to level.

The lower portion of down post 820 is disposed within the body of bearing block assembly 810 where it passes through an upper ball bearing ring 840, through a brake 842, and at least partially through a lower ball bearing ring 844. Upper ball bearing ring 840 is disposed about upper bearing surface 826. Brake 842 is disposed about brake surface 828. Lower ball bearing ring 844 is disposed about lower bearing surface 830. Each ball bearing ring 840 and 844 includes an outer bearing race, an inner bearing race, and a plurality of ball bearings. Upper ball bearing ring 840 has a larger diameter than brake 842 and brake 842 has a larger diameter than lower ball bearing ring 844. Brake 842 is made from a polymer or another material that provides braking properties and has first and second spaced portions that can be moved toward and away from each other. The body of assembly 810 defines its down post opening with an upper shelf 850 to receive upper ball bearing ring 840 and a lower shelf 852 to receive brake 842. The bottom 854 of the down post opening receives lower ball bearing ring 844. The body can define a lower opening 856 that extends from the bottom of the body to the down post opening.

The body also defines a locking tab recess 858 that extends down from the top surface of the body along the down post opening to lower shelf 852. A locking tab 860 extends from brake 842 and is positioned in recess 858 to prevent brake 842 from rotating. This allows first and second portions of brake 842 to be tightened against brake surface 828 to lock rotational movement of down post 820 or to provide friction to slow rotational movement of down post 820. Brake 842 thus controls the flow or speed of movement of down post 820 and thus the flow or speed of movement of the camera or camera arm carried by down post 820. The user controls the strength of the braking force by selectively tightening a threaded member 861 disposed between openings 862 defined by the first and second portions of brake 842. One opening 862 can be threaded (or can carry a threaded nut) with the other opening 862 engaging a head of threaded member 861. Rotation of threaded member 861 thus moves the first and second portions of brake 842 toward and away from each other to tighten and loosen brake 842. Threaded member 861 is accessed through brake openings 864 defined by the body of bearing block assembly 810 with a wrench, a nut driver, or a screwdriver.

Bearing block assembly 810 is selectively mounted to outer portion 804 through the engagement of a tab 870 in a corresponding slot 872. These can be dovetailed as shown in the drawings or other configurations of tabs and slots. In the exemplary configuration, tab 870 extends from the body of bearing block assembly 810 and slot 872 is defined by outer portion 804. The positions of these elements can be reversed. As noted above, bearing block assembly 810 slides down until bolt head 806 engages the top of slot 812. In another configuration, the tab and slot configuration is such that the stop is defined by the lower end of the slot. In a further configuration, the tab and slots are not parallel such that the tab wedges itself in place.

A grip 880 is used to selectively secure tab 870 within slot 872. In the exemplary configuration, grip 880 is carried on a threaded shaft 882 that threadedly engages a threaded opening defined by outer portion 804 with a spring 884 disposed around threaded shaft 882 to bias grip 880 outwardly towards its loose condition. Rotating shaft 882 clockwise pulls a handle 886 against grip 880 to push it against tab 870. In this exemplary configuration, grip 880 is disposed in a gap defined by outer portion 804 at a portion of dovetailed slot 872. Tightening grip 880 to its tightened condition stops bearing block assembly 810 from falling out of outer portion 804. Loosening grip 880 allows bearing block assembly 810 to be removed with the camera arm or other device that is being mounted. Another configuration selectively positions grip 880 above the body of bearing block assembly 810 to lock it in place.

As described above, ball joint 122 of utility mount 802 includes center portion 125 that defines ball joint cup 158. Center portion 125 can be integral to the base mounting bracket (such as with bracket 20) or removable therefrom. Ball joint cup 158 has an inner surface that is engaged by the front surface of inner portion 126 of the ball joint. These surfaces may complement each other to increase the surface contact area between the two. For example, both can be flat or curved. Ball joint cup 158 has an outer surface that matches the inner curved surface of outer portion 804 of ball joint 122. Ball joint cup 158 defines a large opening 190 that allows clamping bolt 128 and ball joint portions 804 and 126 to be adjusted as described above.

Inner portion 126 of the ball joint 122 includes a stem 192 that receives handle 130. In the configuration of utility mount 802, stem 192 is a separable from inner portion 126. In other configurations, stem 192 can be integral with inner portion 126 or handle 130. Handle 130 defines a threaded bore that threadedly engages the threaded end of clamping bolt 128. Rotation of handle 130 along clamping bolt 128 pulls outer portion 124 against ball joint cup 158 and pushes inner portion 126 into ball joint cup 158 to frictionally lock the position of ball joint 122.

Center portion 125 includes a top end and a neck 200 that extends down away from a lower end of ball joint cup 158 to allow center portion 125 to be removably and replaceably (selectively) mounted to base mounting bracket 120, 604, or 803 by being received in aligned openings 202. To mount center portion 125, neck 200 is slid down through aligned, spaced openings 202 defined by base mounting bracket 120, 604, or 803. Neck 200 can be configured to frictionally engage bracket 120, 604, or 803 or be loosely disposed in openings 202 until a clamp is tightened. In this configuration, neck 200 defines shoulders 218 on opposite sides sized to engage bracket 120, 604, or 803 to stop neck 200 from moving through openings 202. A threaded rod 620 extends down from the lower end 622 of neck 200. Shoulders 218 position lower end 622 even with or just below the lower surface of the lower plate. A clamping block 624 is slidably carried on threaded rod 620 and is pushed up against mounting bracket 120, 604, or 803 with a nut 626 such as the round nut depicted in FIG. 73. Tightening nut 626 clamps a portion or portions of bracket 120, 604, or 803 between neck 200 and clamping block 624 to secure utility mount 602 in place. Lower end wall 622 defines a notch 628 that receives clamping block 624 as shown in FIG. 66 to allow clamping block 624 to engage mounting bracket 120, 604, or 803 instead of being clamped against neck 200. Notch 628 has a width that is larger than the width of clamping block 624 and notch 628 extends entirely from front to back of neck 200 with clamping block 624 having a length longer than the thickness of neck 200.

A locking arm 805 is connected to the top end of center portion 125 and extends rearwardly above the upper portion of base mounting bracket 803. Locking arm 805 includes a locking finger 809 that is slid into a locking opening defined by base mounting bracket 803 when neck 200 is slid into openings 202. The distance between the lower surface of locking arm 805 and shoulder 218 is thus the same as the distance between the top surface of intermediate plate 404 and the top surface of upper end plate 400. Locking arm 805 stabilizes utility mount 802 with respect to base mounting bracket 803. Locking arm 805 can be integrally connected to center portion 125 or connected with another connection that does not allow locking arm 805 to pivot with respect to center portion 125. A pair of spaced threaded connectors 807 are used in the exemplary configuration.

Like base mounting bracket 120, base mounting bracket 803 is assembled by the user from components that can be shipped in a small flat container. In this configuration, base mounting bracket 803 includes upper 400 and lower 402 mounts in the form of end plates that each include spaced legs 172. Mounts can be provided in a variety of shapes and configurations. In the exemplary configuration, mounts 400 and 402 are in the form of flat plates which allows base mounting bracket to be stored in a flat configuration and transported in a compact configuration. Base mounting bracket 803 also includes an intermediate plate 404 that is positioned between upper 400 and lower 402 end plates. In this configuration, lower end plate 402 and intermediate plate 404 define aligned openings 202 that receive the neck 200 of the ball joint center portion 125. Upper end plate 400 is disposed level with the top of center portion 125 so that locking arm 805 rests on top of upper end plate 400 with locking finger 809 being disposed in an opening defined by upper end plate 400.

Plates 400, 402, and 404 are assembled to form base mounting bracket 803 with a plurality of connectors 406 and tubes 408 and 410. Tubes 408 and 410 function as spacers for plates 400, 402, and 404 while connectors 406 are disposed through tubes 408 and 410 to clamp the plates 400, 402, and 404 against and between tubes 408 and 410. Connectors 406 can be bolt and nut combinations. In the exemplary configuration, four tubes are used to define base mounting bracket 120 with tubes 410 being shorter than tubes 408. For example, tubes 408 can each be half inch to nine long and tubes 410 can each be zero (not used) to six inches long. In the exemplary configuration, tubes 410 are about one inch long and tubes 408 are about three inches long. For example, each bolt 406 can be four inches to ten inches long. Bolt 406 can be a half inch with 13 thread. Each tube 408 and 410 defines a through hole that receives the bolt portion of 406. Each plate 400, 402, and 404 defines holes 414 large enough for the bolts and smaller than the outer diameter of the tubes 408 and 410 so that each tube 408 and 410 abuts the plates. Tightening connectors 406 to clamp the plates onto the tubes creates base mounting bracket 803.

End plates 400 and 402 define toothed inset portions so that they can grip a tree trunk or branch. Lower plate 402 defines cleat 178 or one or a plurality of T-shaped hooks on which gear can be hung in a manner similar to hook 98.

A pair of strap mounts 821 are carried by one or a combination of tubes 408 and 410. In the exemplary configuration, each strap mount 821 is connected at one end to tube 408 and at a second end to tube 410. Strap 32 is connected to strap mounts 821 to secure base mounting bracket 804 to a structure such as tree 34. Strap mounts 821 pivot to a position aligned with the angle of strap 32 when strap 32 is tightened. One end of strap 32 is wrapped around mount 821 and held with a buckle or a ratchet. The other end of strap 32 can be connected to the other mount 821 with a hook. This allows strap 32 to be quickly connected to base mounting bracket 803. Each strap mount 821 has opposed ends with openings that are larger than the outer dimension of tubes 408 and 410 so that mount 821 pivots about tubes 408 and 410. Between the ends, each mount 821 defines a corner 823 wherein strap 32 settles when it is tightened.

This configuration allows the base mounting bracket 803 to be packaged and shipped in a flat configuration and allows it to be inexpensive so that the user can position multiple base mounting brackets 803 for use with ball joint 122.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A utility mount assembly for supporting a camera arm used to film a hunt from a stable structure; the utility mount assembly comprising:
   a base mounting bracket having a ball joint cup; the base mounting bracket adapted to be secured to the stable structure;
   a ball joint assembly having inner and outer portions selectively movable with respect to the ball joint cup; the inner and outer portions disposed on opposite sides of the ball joint cup;
   a clamp having a clamped condition that locks the position of the ball joint assembly with respect to the ball joint cup;
   a bearing block assembly removably and replaceably carried by the outer portion of the ball joint assembly; the bearing block assembly having a down post adapted to receive the camera arm; and
   the bearing block assembly including a first bearing assembly that engages the down post and a brake that selectively engages the down post.

2. The assembly of claim 1, wherein the ball joint cup is carried by a neck; the neck being selectively removable from the base mounting bracket.

3. The assembly of claim 1, wherein the bearing block assembly includes a second bearing assembly spaced from the first bearing assembly with the brake disposed between the first and second bearing assemblies.

4. The assembly of claim 3, wherein the brake includes a locking tab that is disposed in a locking tab recess defined by a body of the bearing block assembly to prevent the brake from rotating with the down post.

5. The assembly of claim 4, wherein the brake includes a threaded member that extends between first and second portions of the brake.

6. The assembly of claim 5, wherein the body of the bearing block assembly defines a brake opening aligned with the threaded member.

7. The assembly of claim 1, wherein the body of the bearing block assembly abuts a portion of the clamp.

8. The assembly of claim 7, wherein the clamp includes a bolt having a bolt head; the body of the bearing block assembly defining a slot; the bolt head of the bolt of the clamp disposed in the slot.

9. The assembly of claim 1, wherein the bearing block assembly and the outer portion are connected together with a tab received in a slot.

10. The assembly of claim 9, further comprising a grip that selectively engages the tab to secure the tab within the slot.

11. A utility mount assembly for supporting a camera arm used to film a hunt from a stable structure; the utility mount assembly comprising:
 a base mounting bracket adapted to be secured to the stable structure;
 a ball joint assembly having inner and outer portions selectively movable with respect to the base mounting bracket;
 a clamp having a clamped condition that locks the position of the ball joint assembly with respect to the ball joint cup;
 a bearing block assembly removably and replaceably carried by the outer portion of the ball joint assembly; the bearing block assembly having a down post adapted to receive the camera arm; and
 the bearing block assembly including a first bearing assembly that engages the down post and a brake that selectively engages the down post.

12. The assembly of claim 11, wherein the bearing block assembly includes a second bearing assembly spaced from the first bearing assembly with the brake disposed between the first and second bearing assemblies.

13. The assembly of claim 11, wherein the brake includes a locking tab that is disposed in a locking tab recess defined by a body of the bearing block assembly to prevent the brake from rotating with the down post.

14. The assembly of claim 11, wherein the brake includes a threaded member that extends between first and second portions of the brake.

15. The assembly of claim 14, wherein the body of the bearing block assembly defines a brake opening aligned with the threaded member.

16. A utility mount assembly for supporting a camera arm used to film a hunt from a stable structure; the utility mount assembly comprising:
 a base mounting bracket adapted to be secured to the stable structure;
 a ball joint assembly having inner and outer portions selectively movable with respect to the base mounting bracket;
 a clamp having a clamped condition that locks the position of the ball joint assembly with respect to the ball joint cup;
 a bearing block assembly removably and replaceably carried by the outer portion of the ball joint assembly; the bearing block assembly having a down post adapted to receive the camera arm;
 one of the bearing block assembly and the outer portion of the ball joint assembly having a tab and the other of the bearing block assembly and the outer portion of the ball joint assembly defining a slot; the tab being slidably disposed in the slot; and
 a grip selectively holding the bearing block assembly to the outer portion.

17. The assembly of claim 16, further comprising a stop disposed in the slot to limit the movement of the bearing block assembly.

18. The assembly of claim 17 wherein the stop is portion of clamp.

19. The assembly of claim 16, wherein the bearing block assembly includes a second bearing assembly spaced from the first bearing assembly with a brake disposed between the first and second bearing assemblies.

20. The assembly of claim 19, wherein the brake includes a locking tab that is disposed in a locking tab recess defined by a body of the bearing block assembly to prevent the brake from rotating with the down post.

21. The assembly of claim 19, wherein the brake includes a threaded member that extends between first and second portions of the brake.

22. The assembly of claim 21, wherein the body of the bearing block assembly defines a brake opening aligned with the threaded member.

* * * * *